US008476852B2

(12) United States Patent
Hawker et al.

(10) Patent No.: US 8,476,852 B2
(45) Date of Patent: Jul. 2, 2013

(54) CONTROLLER FOR A BRUSHLESS MOTOR

(75) Inventors: David John Hawker, Malmesbury (GB); Hanping Dai, Malmesbury (GB)

(73) Assignee: Dyson Technology Limited, Malmesbury (GB)

( * ) Notice: Subject to any disclaimer, the term of this patent is extended or adjusted under 35 U.S.C. 154(b) by 341 days.

(21) Appl. No.: 13/086,070

(22) Filed: Apr. 13, 2011

(65) Prior Publication Data
US 2011/0257791 A1    Oct. 20, 2011

(30) Foreign Application Priority Data

Apr. 16, 2010 (GB) .................................. 1006392.3

(51) Int. Cl.
*H02P 23/12* (2006.01)
*H02P 6/06* (2006.01)

(52) U.S. Cl.
USPC ............. 318/400.14; 318/254.1; 318/400.04; 318/276; 318/400.03

(58) Field of Classification Search
USPC ............... 318/400.14, 254.1, 400.03, 400.04, 318/276
See application file for complete search history.

(56) References Cited

U.S. PATENT DOCUMENTS

| 3,737,748 | A | | 6/1973 | Teders |
| 3,781,620 | A | * | 12/1973 | Toth .............................. 388/819 |
| 3,809,984 | A | | 5/1974 | Hoge |
| 3,908,158 | A | | 9/1975 | Studtmann |
| 4,039,913 | A | | 8/1977 | Clegg |
| 4,250,435 | A | * | 2/1981 | Alley et al. .............. 318/400.03 |
| 4,266,177 | A | * | 5/1981 | Nola ............................ 318/810 |
| 4,323,835 | A | | 4/1982 | Lee |
| 4,413,217 | A | | 11/1983 | Green et al. |
| 4,465,957 | A | | 8/1984 | Crockett |
| 4,486,700 | A | | 12/1984 | Kawate et al. |
| 4,556,827 | A | | 12/1985 | Erdman |
| 4,558,264 | A | * | 12/1985 | Weischedel .............. 318/400.03 |
| 4,746,844 | A | | 5/1988 | MacKelvie et al. |
| 4,875,148 | A | | 10/1989 | Roe et al. |
| 5,008,608 | A | | 4/1991 | Unsworth et al. |

(Continued)

FOREIGN PATENT DOCUMENTS

| EP | 0 613 234 | 8/1994 |
| EP | 1 473 823 | 11/2004 |

(Continued)

OTHER PUBLICATIONS

GB Search Report dated Sep. 14, 2010, directed to GB Patent Application No. 1006392.3; 1 page.

(Continued)

*Primary Examiner* — Paul Ip
(74) *Attorney, Agent, or Firm* — Morrison & Foerster LLP

(57) ABSTRACT

A controller for a brushless motor that includes a processor, a first timer, a second timer, a compare register, a comparator, an input, and one or more outputs. The processor starts the first timer in response to a signal at the input. The first timer then generates an interrupt after a first period. In response to the interrupt, the processor generates a first control signal at the outputs. The processor also loads the compare register and starts the second timer in response to either the input signal or the interrupt. The comparator then generates a second control signal at the outputs when the second timer and the compare register correspond. Additionally, a motor system that includes the controller.

13 Claims, 25 Drawing Sheets

U.S. PATENT DOCUMENTS

| | | | |
|---|---|---|---|
| 5,055,751 A | 10/1991 | MacKelvie | |
| 5,156,005 A | 10/1992 | Redlich | |
| 5,187,419 A | 2/1993 | DeLange | |
| 5,334,922 A | 8/1994 | Manini | |
| 5,420,492 A | 5/1995 | Sood et al. | |
| 5,448,141 A | 9/1995 | Kelley et al. | |
| 5,577,235 A * | 11/1996 | Mitra | 713/600 |
| 5,581,169 A | 12/1996 | Kerkman et al. | |
| 5,652,493 A | 7/1997 | Hendershot, Jr. | |
| 5,739,652 A * | 4/1998 | Sriram | 318/400.04 |
| 5,986,417 A | 11/1999 | Nicolai et al. | |
| 6,087,654 A | 7/2000 | Durham, III | |
| 6,181,583 B1 | 1/2001 | Okui et al. | |
| 6,194,852 B1 | 2/2001 | Lovatt et al. | |
| 6,198,238 B1 | 3/2001 | Edelson | |
| 6,208,113 B1 | 3/2001 | Lelkes et al. | |
| 6,221,291 B1 | 4/2001 | Van Ert et al. | |
| 6,236,179 B1 | 5/2001 | Lawler et al. | |
| 6,263,450 B1 * | 7/2001 | Predko | 713/502 |
| 6,320,275 B1 * | 11/2001 | Okamoto et al. | 307/10.1 |
| 6,323,609 B1 | 11/2001 | Lopez | |
| 6,621,291 B2 | 9/2003 | Lee et al. | |
| 6,803,741 B2 | 10/2004 | Messersmith | |
| 6,847,186 B1 | 1/2005 | Kerlin | |
| 6,885,161 B2 | 4/2005 | de Nanclares et al. | |
| 6,901,212 B2 | 5/2005 | Masino | |
| 6,906,503 B2 * | 6/2005 | Lopez-Santillana et al. | 323/283 |
| 7,030,582 B2 | 4/2006 | Masino | |
| 7,034,498 B2 | 4/2006 | Kerlin | |
| 7,042,183 B2 | 5/2006 | Fitzgibbon et al. | |
| 7,079,758 B2 * | 7/2006 | Sunaga et al. | 388/804 |
| 7,102,303 B2 | 9/2006 | Brotto | |
| 7,141,949 B2 | 11/2006 | Harwood | |
| 7,239,098 B2 | 7/2007 | Masino | |
| 7,459,878 B2 | 12/2008 | Wang et al. | |
| 7,477,034 B2 | 1/2009 | MacKay | |
| 7,489,094 B2 | 2/2009 | Steiner et al. | |
| 7,589,486 B2 | 9/2009 | Yamada et al. | |
| 7,646,155 B2 | 1/2010 | Woods et al. | |
| 7,671,549 B2 | 3/2010 | Steiner et al. | |
| 7,688,018 B2 | 3/2010 | Goto et al. | |
| 7,692,395 B2 | 4/2010 | Brown | |
| 7,714,529 B2 * | 5/2010 | Chen et al. | 318/712 |
| 7,750,595 B2 * | 7/2010 | Yamada et al. | 318/801 |
| 7,834,566 B2 | 11/2010 | Woods et al. | |
| 7,894,216 B2 | 2/2011 | Melanson | |
| 7,928,673 B2 | 4/2011 | Woods et al. | |
| 8,018,184 B2 | 9/2011 | Takeuchi | |
| 8,044,623 B2 | 10/2011 | Takeuchi et al. | |
| 8,093,858 B1 | 1/2012 | Kadah et al. | |
| 8,098,035 B2 | 1/2012 | Sekimoto et al. | |
| 2001/0011879 A1 | 8/2001 | Erdman | |
| 2002/0171388 A1 | 11/2002 | Seki | |
| 2002/0185986 A1 | 12/2002 | Seki | |
| 2003/0034793 A1 | 2/2003 | Lee et al. | |
| 2003/0052632 A1 | 3/2003 | Wissmach et al. | |
| 2003/0053323 A1 | 3/2003 | Kimura et al. | |
| 2003/0201739 A1 | 10/2003 | Horng et al. | |
| 2003/0230999 A1 | 12/2003 | de Nanclares et al. | |
| 2003/0231875 A1 | 12/2003 | Masino | |
| 2004/0027085 A1 * | 2/2004 | Berroth et al. | 318/439 |
| 2004/0047166 A1 * | 3/2004 | Lopez-Santillana et al. | 363/89 |
| 2004/0051494 A1 | 3/2004 | Messersmith | |
| 2004/0070356 A1 | 4/2004 | Masino | |
| 2004/0131342 A1 | 7/2004 | Masino | |
| 2004/0217721 A1 | 11/2004 | Brotto | |
| 2004/0227486 A1 | 11/2004 | Kerlin | |
| 2005/0099148 A1 * | 5/2005 | DuLaney | 318/276 |
| 2005/0189891 A1 | 9/2005 | Kurosawa et al. | |
| 2005/0225275 A1 | 10/2005 | Eskritt et al. | |
| 2005/0237011 A1 | 10/2005 | Woods et al. | |
| 2005/0248306 A1 * | 11/2005 | Chen et al. | 318/712 |
| 2006/0273751 A1 | 12/2006 | DeJonge et al. | |
| 2007/0103840 A1 | 5/2007 | Asada et al. | |
| 2007/0114963 A1 | 5/2007 | Steiner et al. | |
| 2007/0126380 A1 * | 6/2007 | Beifus | 318/254 |
| 2007/0241703 A1 | 10/2007 | Yamada et al. | |
| 2008/0034532 A1 | 2/2008 | Yang | |
| 2008/0150460 A1 | 6/2008 | Rosskamp | |
| 2008/0180049 A1 | 7/2008 | Yang | |
| 2008/0200702 A1 | 8/2008 | Gurumurthy et al. | |
| 2008/0211450 A1 * | 9/2008 | Yamada et al. | 318/801 |
| 2008/0273360 A1 | 11/2008 | Goto | |
| 2008/0290761 A1 | 11/2008 | Eckert et al. | |
| 2009/0072775 A1 | 3/2009 | Steiner et al. | |
| 2009/0174350 A1 | 7/2009 | Kuroda et al. | |
| 2009/0251086 A1 | 10/2009 | Sekimoto et al. | |
| 2009/0302682 A1 | 12/2009 | Hammond et al. | |
| 2010/0065293 A1 | 3/2010 | Lohr | |
| 2010/0079097 A1 | 4/2010 | Woods et al. | |
| 2010/0079098 A1 | 4/2010 | Woods et al. | |
| 2010/0109597 A1 | 5/2010 | Steiner et al. | |
| 2010/0237813 A1 | 9/2010 | Seki et al. | |
| 2010/0244757 A1 * | 9/2010 | Tsai et al. | 318/434 |
| 2010/0249757 A1 | 9/2010 | Chen | |
| 2010/0251509 A1 | 10/2010 | Clothier | |
| 2010/0251511 A1 | 10/2010 | Clothier et al. | |
| 2010/0251512 A1 | 10/2010 | Clothier et al. | |
| 2010/0253250 A1 | 10/2010 | Marvelly et al. | |
| 2010/0253257 A1 | 10/2010 | Clothier et al. | |
| 2010/0253258 A1 | 10/2010 | Fabis et al. | |
| 2010/0253261 A1 | 10/2010 | Dawe et al. | |
| 2010/0253262 A1 | 10/2010 | Celik | |
| 2010/0253263 A1 | 10/2010 | Clothier et al. | |
| 2010/0253264 A1 | 10/2010 | Clothier et al. | |
| 2010/0253265 A1 | 10/2010 | Clothier et al. | |
| 2010/0253274 A1 | 10/2010 | Clothier et al. | |
| 2010/0254685 A1 | 10/2010 | Dai | |
| 2010/0256782 A1 | 10/2010 | Dai | |
| 2010/0259206 A1 | 10/2010 | Joachimsmeyer | |
| 2010/0295490 A1 | 11/2010 | Kuroshima et al. | |
| 2010/0295516 A1 | 11/2010 | Matt et al. | |
| 2010/0320956 A1 * | 12/2010 | Lumsden et al. | 318/799 |
| 2011/0057601 A1 * | 3/2011 | Hiltbold | 318/729 |
| 2011/0058288 A1 | 3/2011 | Vanko et al. | |
| 2011/0080130 A1 | 4/2011 | Venkataraman | |
| 2011/0234134 A1 | 9/2011 | Ramu | |
| 2011/0254476 A1 | 10/2011 | Clothier et al. | |
| 2011/0254480 A1 | 10/2011 | Chen et al. | |
| 2011/0254481 A1 | 10/2011 | Chen et al. | |
| 2011/0254482 A1 | 10/2011 | Dai | |
| 2011/0254483 A1 | 10/2011 | Chen et al. | |
| 2011/0254484 A1 | 10/2011 | Dai | |
| 2011/0254485 A1 | 10/2011 | Clothier et al. | |
| 2011/0254486 A1 | 10/2011 | Celik | |
| 2011/0254487 A1 | 10/2011 | Clothier et al. | |
| 2011/0254488 A1 | 10/2011 | Clothier et al. | |
| 2011/0254489 A1 | 10/2011 | Greetham | |
| 2012/0081064 A1 | 4/2012 | Leaver et al. | |
| 2013/0038360 A1 * | 2/2013 | Takahashi | 327/141 |

FOREIGN PATENT DOCUMENTS

| | | |
|---|---|---|
| EP | 1 786 093 | 5/2007 |
| EP | 1 816 739 | 8/2007 |
| EP | 2 151 917 | 2/2010 |
| GB | 2 305 033 | 3/1997 |
| GB | 2 380 873 | 4/2003 |
| GB | 2469132 | 10/2010 |
| JP | 10-191679 | 7/1998 |
| JP | 11-223558 | 8/1999 |
| JP | 11-285285 | 10/1999 |
| JP | 2000-308385 | 11/2000 |
| JP | 2001-231287 | 8/2001 |
| WO | WO-96/01521 | 1/1996 |
| WO | WO-97/08818 | 3/1997 |
| WO | WO-01/80414 | 10/2001 |
| WO | WO-2005/008878 | 1/2005 |

OTHER PUBLICATIONS

Clothier et al., U.S. Office Action mailed Mar. 12, 2013, directed to U.S. Appl. No. 13/081,290; 16 pages.

Celik, T., U.S. Office Action mailed Apr. 23, 2013, directed to U.S. Appl. No. 13/082,166; 11 pages.

Clothier et al., U.S. Office Action mailed Apr. 25, 2013, directed to U.S. Appl. No. 13/087,109; 9 pages.

Clothier et al., U.S. Office Action mailed Feb. 3, 2012, directed to U.S. Appl. No. 13/081,290; 8 pages.

Atmel Corporation, (2005) "AVR440: Sensorless Control of Two-Phase Brushless DC Motor," *8-bit AVR® Microcontrollers, AVR440 Application Note*; 16 pages.

Atmel Corporation, (2006) "AVR443: Sensor-based Control of Three Phase Brushless DC Motor," 8-bit AVR® Microcontrollers, *AVR443 Application Note*; 7 pages.

Atmel Corporation, (2011) "8-bit AVR® with 8KBytes In-System Programmable Flash," *ATmega8L Datasheet*: pp. 69-120.

International Search Report and Written Opinion mailed Sep. 13, 2012, directed to International Application No. PCT/GB2011/050734; 8 pages.

Clothier et al., U.S. Office Action mailed Aug. 23, 2012, directed to U.S. Appl. No. 13/081,290; 11 pages.

\* cited by examiner

| Control signals | | | | Power switches | | | | Condition |
|---|---|---|---|---|---|---|---|---|
| TRIP# | DIR1 | DIR2 | FREE WHEEL# | Q1 | Q2 | Q3 | Q4 | |
| 0 | X | X | X | 0 | 0 | 0 | 0 | Disabled |
| 1 | 0 | 0 | X | 0 | 0 | 0 | 0 | Off |
| 1 | 1 | 0 | 1 | 1 | 0 | 0 | 1 | Drive Left-to-Right |
| 1 | 0 | 1 | 1 | 0 | 1 | 1 | 0 | Drive Right-to-Left |
| 1 | 1 | 0 | 0 | 0 | 0 | 0 | 1 | Freewheel Left-to-Right |
| 1 | 0 | 1 | 0 | 0 | 0 | 1 | 0 | Freewheel Right-to-Left |
| 1 | 1 | 1 | X | - | - | - | - | Illegal |

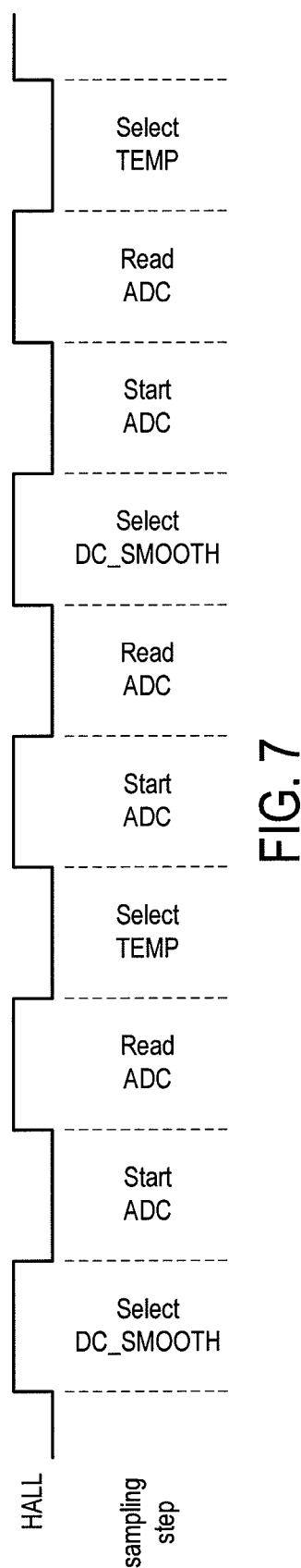

| Mode | Speed | Description |
|---|---|---|
| Initialisation | n/a | Setup and initial speed detection |
| Stationary | $0 < \omega <$ SPEED_STATIONARY | Initial drive to start rotation |
| Low-Speed Acceleration | SPEED_STATIONARY $< \omega \leq$ SPEED_ADV | Synchronous communication, multi-switch mode |
| High-Speed Acceleration | SPEED_ADV $< \omega \leq$ SPEED_SINGLE | Advanced communication, multi-switch mode |
| Running | SPEED_SINGLE $< \omega \leq$ SPEED_MAX | Advanced communication, single-switch mode |
| Fault | n/a | Inverter off |

FIG. 8

| Motor Direction | HALL | Drive Direction | Control signals | |
|---|---|---|---|---|
| | | | DIR1 | DIR2 |
| Forward | 0 | Left-to-Right | 1 | 0 |
| Forward | 1 | Right-to-Left | 0 | 1 |
| Reverse | 0 | Right-to-Left | 0 | 1 |
| Reverse | 1 | Left-to-Right | 1 | 0 |

FIG. 9

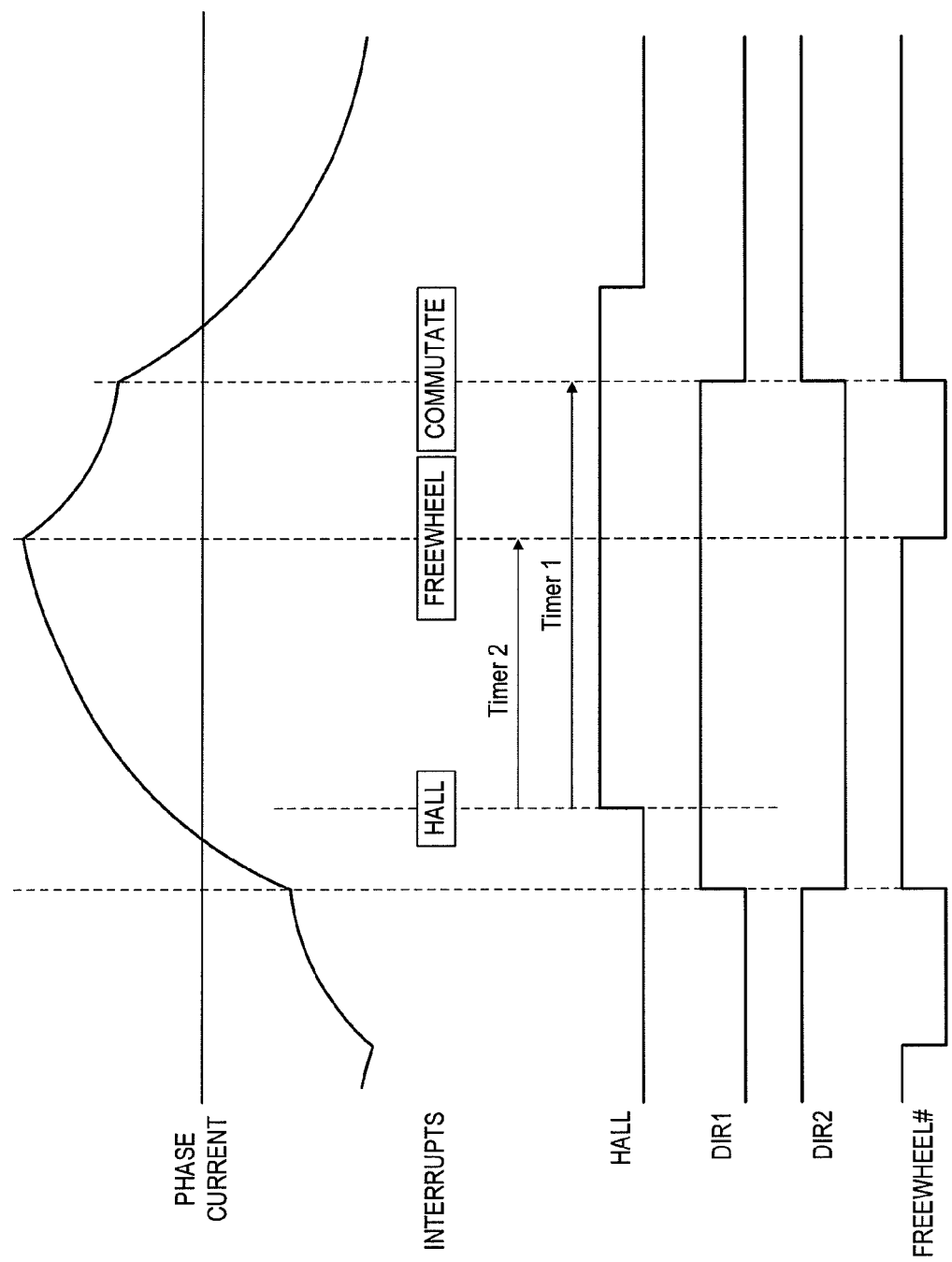

| Component | Value | Description |
| --- | --- | --- |
| AC supply | 230V +/- 10% 50Hz | Mains power supply |
| C1 | 4.4μF | DC link capacitor |
| L1 | 2.2mH | DC link inductor |
| R1 & R2 | 30mΩ | Shunt resistors used to generate I_SENSE_1 and I_SENSE_2 |
| R3, R4 | 1MΩ, 1kΩ | Voltage divider used to generate DC_LINK |
| R5, R6, C2 | 1MΩ, 8.2kΩ, 22μF | Voltage divider and smoothing generator used to generate DC_SMOOTH |
| R8 & R9, C3 & C4 | 1kΩ, 1nF | RC filters operating on I_SENSE_1 and I_SENSE_2 |
| Controller | PIC16F690 | Microcontroller manufactured by Microchip Technology Inc. |

FIG. 19

| Label | Value | Description |
|---|---|---|
| SPEED_STATIONARY | 1000 rpm | Speed below which the rotor is considered stationary |
| SPEED_ADV | 10000 rpm | Speed at which the controller changes from synchronous to advanced communication mode |
| SPEED_SINGLE | 50000 rpm | Speed at which the controller changes from multi-switch to overcurrent single-switch mode |
| SPEED_UFW | 85034 rpm | Speed at which the controller changes from overcurrent to unlimited-freewheel single-switch mode |
| SPEED_MIN | 80645 rpm | Minimum operating speed |
| SPEED_MAX | 106232 rpm | Maximum operating speed |
| SPEED_TRIP | 108692 rpm | Maximum permissible speed. Fault generated if rotor speed exceeds SPEED_TRIP |
| SPEED_CP_MIN | 85034 rpm | Minimum speed at which constant power is achieved |
| SPEED_CP_MAX | 106235 rpm | Maximum speed at which constant power is achieved |
| T_DT | 2.4 μs | Dead time. The minimum time between the changing of two control signals |
| T_RD | 10 ms | The time over which the controller drives the motor in reverse during Stationary Mode |
| T_FD | 52 ms | The time over which the controller drives the motor forward during Stationary Mode |
| T_US | 3 s | Maximum time that the rotor can remain below SPEED_MIN before a fault is generated |
| T_OS | 3 s | Maximum time that the rotor can remain above SPEED_MAX before a fault is generated |
| V_MIN | 200 V | Minimum operating voltage |
| V_MAX | 260 V | Maximum operating voltage |
| V_CP_MIN | 220 V | Minimum voltage at which constant power is achieved |
| V_CP_MAX | 258 V | Maximum voltage at which constant power is achieved |
| I_MAX | 34.7 A | Maximum permissible phase current |
| T_MIN | 0 °C | Minimum operating temperature |
| T_MAX | 40 °C | Maximum operating temperature |

FIG. 20

| Mode | Speed | Description |
|---|---|---|
| Initialisation | n/a | Setup and initial speed/voltage detection |
| Stationary | $0 < \omega <$ SPEED_STATIONARY | Initial drive to start rotation |
| Low-Speed Acceleration | SPEED_STATIONARY $< \omega \leq$ SPEED_ADV | Synchronous communication, multi-switch mode |
| Mid-Speed Acceleration | SPEED_ADV $< \omega \leq$ SPEED_SINGLE | Advanced communication, multi-switch mode |
| High-Speed Acceleration | SPEED_ADV $< \omega \leq$ SPEED_UFW | Advanced communication, overcurrent single-switch mode |
| Running | SPEED_UFW $< \omega \leq$ SPEED_MAX | Advanced communication, unlimited-freewheel single-switch mode |
| Fault | n/a | Inverter off |

FIG. 23

| Speed (rpm) | T_FW (μs) | T_TO (μs) | T_ADV (μs) | A_FW (deg) | A_TO (deg) | A_ADV (deg) |
|---|---|---|---|---|---|---|
| 0 ≤ ω < 3000 | 500 | 30 | - | 10.0 | 0.7 | - |
| 3000 ≤ ω < 5000 | 450 | 30 | - | 10.0 | 1.1 | - |
| 5000 ≤ ω < 10000 | 260 | 30 | - | 10.0 | 1.8 | - |
| 10000 ≤ ω < 20000 | 80 | 70 | 62.4 | 10.0 | 8.4 | 10.0 |
| 20000 ≤ ω < 30000 | 70 | 70 | 59.0 | 17.0 | 16.8 | 17.0 |
| 30000 ≤ ω < 40000 | 40 | 70 | 43.6 | 18.0 | 25.2 | 18.0 |
| 40000 ≤ ω < 450000 | 30 | 70 | 47.2 | 24.0 | 33.6 | 24.0 |
| 45000 ≤ ω < 500000 | 30 | 70 | 48.2 | 27.5 | 37.8 | 27.5 |
| 50000 ≤ ω < 550000 | 30 | 70 | 47.6 | 30.0 | 42.0 | 30.0 |

Low-Speed Acceleration: rows 1–3
Mid-Speed Acceleration: rows 4–9

FIG. 24

|  | Speed (rpm) | T_ADV (μs) | T_OVR (μs) | A_ADV (deg) | A_OVR (deg) |
|---|---|---|---|---|---|
| High-Speed Acceleration | 55000 ≤ ω < 60000 | 47.8 | 40 | 27.5 | 33.0 |
| | 60000 ≤ ω < 60777 | 50.2 | 45 | 32.6 | 36.5 |
| | 60777 ≤ ω < 61576 | 50.4 | 50 | 36.7 | 37.0 |
| | 61576 ≤ ω < 62396 | 50.4 | 50 | 37.2 | 37.5 |
| | 62396 ≤ ω < 63237 | 50.4 | 50 | 37.7 | 38.0 |
| | ⋮ | ⋮ | ⋮ | ⋮ | ⋮ |
| | 77962 ≤ ω < 79281 | 50.0 | 56 | 50.3 | 45.0 |
| | 79281 ≤ ω < 80645 | 50.2 | 56 | 51.1 | 46.0 |
| | 80645 ≤ ω < 82056 | 49.6 | 57 | 52.9 | 46.2 |
| | 82056 ≤ ω < 83518 | 49.8 | 58 | 54.7 | 47.0 |
| | 83518 ≤ ω < 85034 | 50.0 | 59 | 56.6 | 48.0 |

FIG. 25

| Speed (rpm) | Voltage (V) | | | | | | |
|---|---|---|---|---|---|---|---|
| | 218.75 | 221.25 | 223.75 | ... | 251.25 | 253.75 | 256.25 |
| $85034 \leq \omega < 86605$ | 10.0 | 8.4 | 6.8 | ... | 3 | 1.2 | -0.4 |
| $86605 \leq \omega < 88235$ | 9.2 | 7.6 | 6.0 | ... | 2 | 0.2 | -1.4 |
| $88235 \leq \omega < 89928$ | 8.6 | 6.8 | 5.2 | ... | 2 | 0.2 | -1.4 |
| ⋮ | ⋮ | ⋮ | ⋮ | | ⋮ | ⋮ | ⋮ |
| $99469 \leq \omega < 101626$ | 1.8 | 1.8 | 1.8 | ... | -6.6 | -6.6 | -6.6 |
| $101626 \leq \omega < 103878$ | 1.0 | 1.0 | 1.0 | ... | -7.8 | -7.8 | -7.8 |
| $103878 \leq \omega < 106232$ | 0.0 | 0.0 | 0.0 | ... | -7.8 | -7.8 | -7.8 |

FIG. 26

| Speed (rpm) | Voltage (V) | | | | | | |
|---|---|---|---|---|---|---|---|
| | 218.75 | 221.25 | 223.75 | ... | 251.25 | 253.75 | 256.25 |
| $85034 \leq \omega < 86605$ | 10.4 | 8.8 | 7.2 | ... | -10.4 | -12.0 | -13.6 |
| $86605 \leq \omega < 88235$ | 9.6 | 8.0 | 6.4 | ... | -11.2 | -12.8 | -14.4 |
| $88235 \leq \omega < 89928$ | 8.8 | 7.2 | 5.6 | ... | 12.0 | -13.6 | -15.2 |
| ⋮ | ⋮ | ⋮ | ⋮ | | ⋮ | ⋮ | ⋮ |
| $99469 \leq \omega < 101626$ | 4.0 | 2.4 | 0.8 | ... | -16.8 | -18.4 | -20.0 |
| $101626 \leq \omega < 103878$ | 3.2 | 1.6 | 0.0 | ... | -17.6 | -19.2 | -20.8 |
| $103878 \leq \omega < 106232$ | 2.4 | 0.8 | -0.8 | ... | -18.4 | -20.0 | -21.6 |

FIG. 27

| Speed (rpm) | Voltage (V) | | | | | | |
|---|---|---|---|---|---|---|---|
| | 218.75 | 221.25 | 223.75 | ... | 251.25 | 253.75 | 256.25 |
| $85034 \leq \omega < 86605$ | -12 | -8 | -4 | ... | -10 | -8 | -5 |
| $86605 \leq \omega < 88235$ | -10 | -6 | -3 | ... | -11 | -6 | -4 |
| $88235 \leq \omega < 89928$ | -7 | -5 | -1 | ... | -8 | -7 | -6 |
| ⋮ | ⋮ | ⋮ | ⋮ | | ⋮ | ⋮ | ⋮ |
| $99469 \leq \omega < 101626$ | 3 | 1 | -1 | ... | -3 | -5 | -4 |
| $101626 \leq \omega < 103878$ | 2 | 0 | 1 | ... | -4 | -5 | -3 |
| $103878 \leq \omega < 106232$ | 1 | 2 | 0 | ... | -4 | -5 | -2 |

FIG. 28

| Time (s) | T_CD_SINE (μs) |
|---|---|
| 0.000000 | 8.0 |
| 0.000051 | 7.2 |
| 0.000102 | 5.6 |
| 0.000153 | 4.0 |
| ⋮ | ⋮ |
| 0.009849 | 11.2 |
| 0.009900 | 10.4 |
| 0.009951 | 8.8 |
| 0.010002 | 8.0 |

FIG. 29

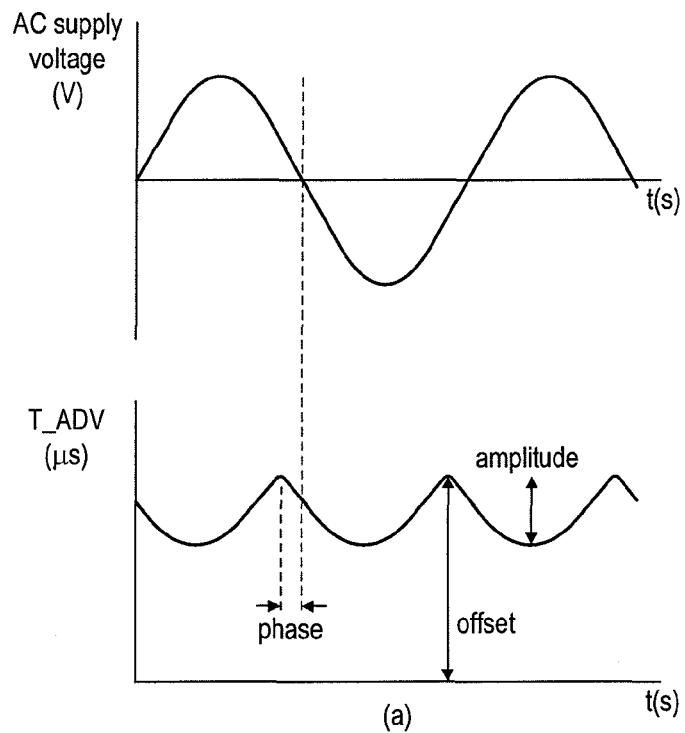
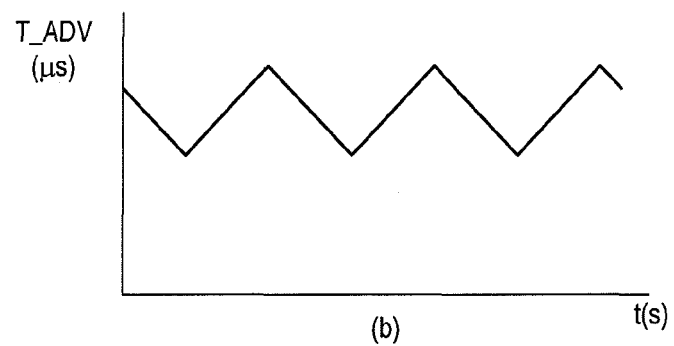
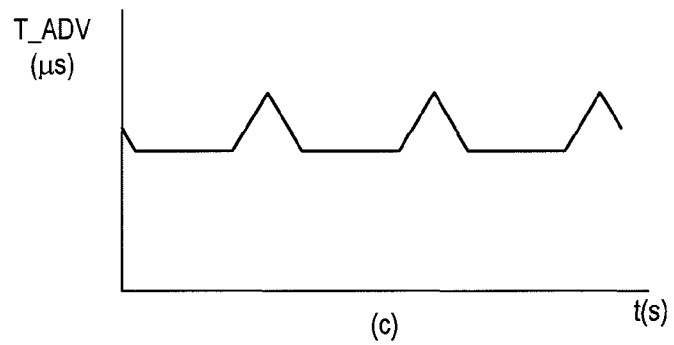
FIG. 31

CONTROLLER FOR A BRUSHLESS MOTOR

REFERENCE TO RELATED APPLICATIONS

This application claims the priority of United Kingdom Application No. 1006392.3, filed Apr. 16, 2010, the entire contents of which are incorporated herein by reference.

FIELD OF THE INVENTION

The present invention relates to a controller for a brushless motor.

BACKGROUND OF THE INVENTION

The control system of a brushless motor typically includes a controller that generates control signals for exciting and freewheeling phase windings of the motor. The controller will often use interrupts and timers to generate the control signals at times relative to edges of a rotor signal. For example, each edge of the rotor signal may generate a first interrupt. In response to the first interrupt, the controller may load a first timer with a first value and a second timer with a second value. When the first timer overflows a second interrupt is generated, which causes the controller to generate a control signal for exciting the phase winding. When the second timer overflows a third interrupt is generated, which causes the controller to generate a control signal for freewheeling the phase winding.

Each interrupt requires a particular period of time to be serviced, during which time the controller is unable to service other interrupts. It is therefore possible for interrupts to clash. When two interrupts clash, the servicing of one of the interrupts will be delayed. This delay may in turn adversely affect the performance of the motor system.

SUMMARY OF THE INVENTION

In a first aspect, the present invention provides a controller for a brushless motor, the controller comprising a processor, a first timer, a second timer, a compare register, a comparator, an input, and one or more outputs, wherein: the processor starts the first timer in response to a signal at the input; the first timer generates an interrupt after a first period; the processor generates a first control signal at the outputs in response to the interrupt; the processor loads the compare register and starts the second timer in response to one of the input signal and the interrupt; and the comparator compares the second timer and the compare register and generates a second control signal at the outputs when the second timer and the compare register correspond.

One of the control signals may be used to excite or commutate a winding of the brushless motor and the other of the control signals may be used to freewheel the winding. More particularly, the first control signal may be used to excite or commutate the winding and the second control signal may be used to freewheel the winding. Since the second control signal is generated without the need for an interrupt, the likelihood of interrupt clashing is reduced. Indeed, interrupt clashing may be avoided altogether.

Reference to starting the first timer should be understood to mean that the registers employed by the timer (e.g. prescaler and timer registers) are loaded with values that ensure that an interrupt is generated after the first period has elapsed. The interrupt may be generated in response to an overflow, underflow or output compare operation. Likewise reference to starting the second timer should be understood to mean that the registers employed by the timer are loaded with values that ensure that the comparator generates the second control signal after a second period has elapsed. Typically, the second timer is reset and the second period of time is dictated by the value loaded into the compare register.

The compare register may be loaded and the second timer may be started in response to the input signal or the interrupt generated by the first timer. In the former, both the first timer and the second timer are started concurrently in response to the input signal. The processor may start both timers in response to each edge of the input signal. Consequently, when the control signals are used to excite and freewheel the winding, both excitation and freewheeling must occur before the next edge of the input signal. In the latter, the first timer is started in response to the input signal. The second timer, however, is started in response to the interrupt generated by the first timer. Accordingly, while the first control signal is then generated before the next edge of the input signal, the second control signal may be generated before, after or at the same time as the next edge of the input signal.

The input signal may be a position-sensor signal that provides a measure of the angular position of a rotor of the motor. The control signals are then generated at times defined by the angular position of the rotor. As a result, accurate synchronization of excitation and freewheeling with rotor position may be achieved.

The first period may be less than the interval between successive edges of the input signal. Accordingly, when the first control signal is used to excite or commutate the winding of the motor, the winding is excited in advance of each edge of the input signal. Should each edge of the input signal correspond to an unaligned rotor position, the winding is then excited in advance of unaligned rotor positions. As a result, more power may be driven into the winding over each electrical half-cycle.

The sum of the first period and the time required by the processor to service the interrupt and generate the first control signal may be less than the interval between successive edges of the input signal. Consequently, the processor services the interrupt before the next edge of the input signal. The processor is therefore able to respond immediately to the next edge of the input signal, i.e. there is no potential clash between servicing the interrupt and the edges of the input signal.

The processor may start the first timer in response to edges of the input signal. The second timer and the compare register may then correspond at a time when the first timer is counting, i.e. the second control signal is generated while the first timer is counting the first period. When the second timer is started in response to an edge of the input signal, both the first timer and the second timer are started in response to the same edge. The compare register is then loaded with a value that ensures that the second period is then shorter than the first period. Consequently, the second control signal is generated while the first timer is still counting the first period. When the second timer is started in response to the interrupt, the first timer has already stopped counting and has generated an interrupt. The compare register is then loaded with a value that ensures that the second timer and compare register correspond at a time after the next edge of the input signal. As a result, the first timer is restarted in response to the next edge of the input signal and is counting when the second timer and the compare register correspond. Irrespective of whether the second timer is started in response to the input signal or the interrupt, the second control signal is generated while the first timer is counting the first period. Consequently, when the first control signal is used to commutate the winding and the second control signal is used to freewheel the winding, the winding is freewheeled before commutation.

The first control signal may be used to commutate the winding and the second control signal may be used to freewheel the winding. The second period is then ideally less than the first period. Consequently, when both timers are started in response to the input signal, the winding is freewheeled prior to commutation.

One or more of the first period and the second period may vary with time. For example, in response to a first edge of the input signal, the processor may set the timer to generate an interrupt after a particular period of time. In response to a second edge of the input signal, the processor might then set the timer to generate an interrupt after a different period of time. Accordingly, a control signal may be generated relative to an edge of the input signal by an interval that varies with time. This level of control may then be used to achieve a particular performance (e.g. power or efficiency) for the motor, to shape the waveform of current drawn from a power supply, or to shape the envelope of the magnetic flux density of the motor.

The processor may load the compare register with a value that varies with time. That is to say that the processor selects a value that depends on time. Once the value has been loaded into the compare register, the value does not then vary with time. The second control signal may then be generated relative to the interrupt or an edge of the input signal by an interval that varies with time. Again, this may be used to achieve a particular performance for the motor, to shape the waveform of current drawn from a power supply, or to shape the envelope of the magnetic flux density of the motor.

The input signal may set a register or flag within the controller, which the controller then periodically polls. Alternatively, the input signal may generate a further interrupt. In response to the further interrupt, the processor then sets the first timer and, if necessary, the second timer and the compare register. By employing a further interrupt, the processor acts promptly to the input signal.

The comparator may form part of a dedicated comparator module within the controller. The second timer is then coupled to the comparator and effectively operates in output compare mode. Alternatively, the controller may comprise a PWM module and the comparator forms part of the PWM module. A duty-cycle register of the PWM module is then used as the compare register. Accordingly, in the event that the controller does not have comparator module coupled to a timer, or the controller is unable to utilize the comparator module to generate the second control signal, the PWM module may instead be used in a novel manner to generate the second control signal.

In a second aspect, the present invention provides a motor system comprising a brushless motor and a controller as described in any one of the preceding paragraphs, wherein the brushless motor comprises a winding and the control signals are used to excite and freewheel the winding.

The motor system may comprise a position sensor coupled to the input of the controller. The position sensor senses the position of a rotor of the brushless motor and outputs a position-sensor signal. As a result, accurate synchronization of excitation and freewheeling with rotor position may be achieved.

In a third aspect, the present invention provides a motor system comprising a control system and a brushless motor, the brushless motor comprising a rotor and a stator having a winding, and the control system comprising a position sensor for sensing the position of the rotor and outputting a position-sensor signal, and a controller for generating a first control signal to excite the winding and a second control signal to freewheel the winding, wherein the controller comprises a processor, a first timer, a second timer, a compare register, a comparator, an input receiving the position-sensor signal, and one or more outputs, wherein: the processor starts the first timer in response to an edge of the position-sensor signal; the first timer generates an interrupt after a first period; the processor generates the first control signal at the outputs in response to the interrupt; the processor loads the compare register and starts the second timer in response to one of the edge of the position-sensor signal and the interrupt; and the comparator compares the second timer and the compare register and generates the second control signal at the outputs when the second timer and the compare register correspond.

BRIEF DESCRIPTION OF THE DRAWINGS

In order that the present invention may be more readily understood, embodiments of the invention will now be described, by way of example, with reference to the accompanying drawings, in which:

FIG. 7 illustrates a three-step process used by the controller when measuring analog input signals;

FIG. 8 details the various operating modes of the motor system;

FIG. 9 details the direction in which the motor is driven in response to control signals issued by the controller;

FIG. 18 illustrates various waveforms and interrupts of the motor system when operating in limited-freewheel single-switch mode;

FIG. 19 details the values of various hardware components for a particular embodiment of motor system in accordance with the present invention;

FIG. 20 details various constants and thresholds employed by the controller of the particular motor system;

FIG. 23 details the various operating modes of the particular motor system;

FIG. 24 details a map of control values used by the controller of the particular motor system when operating in multi-switch mode;

FIG. 25 details a map of control values used by the controller of the particular motor system when operating in over-current single-switch mode;

FIG. 26 details a portion of the advance lookup table used by the controller of the particular motor system when operating in unlimited-freewheel single-switch mode;

FIG. 27 details a portion of the offset lookup table used by the controller of the particular motor system when operating in unlimited-freewheel single-switch mode;

FIG. 28 details a portion of the phase lookup table used by the controller of the particular motor system when operating in unlimited-freewheel single-switch mode;

FIG. 29 details a portion of the sine map used by the controller of the particular motor system when operating in single-switch mode;

FIG. 31 illustrates possible waveforms for the advance period of an alternative motor system in accordance with the present invention.

DETAILED DESCRIPTION OF THE INVENTION

Figure 1:
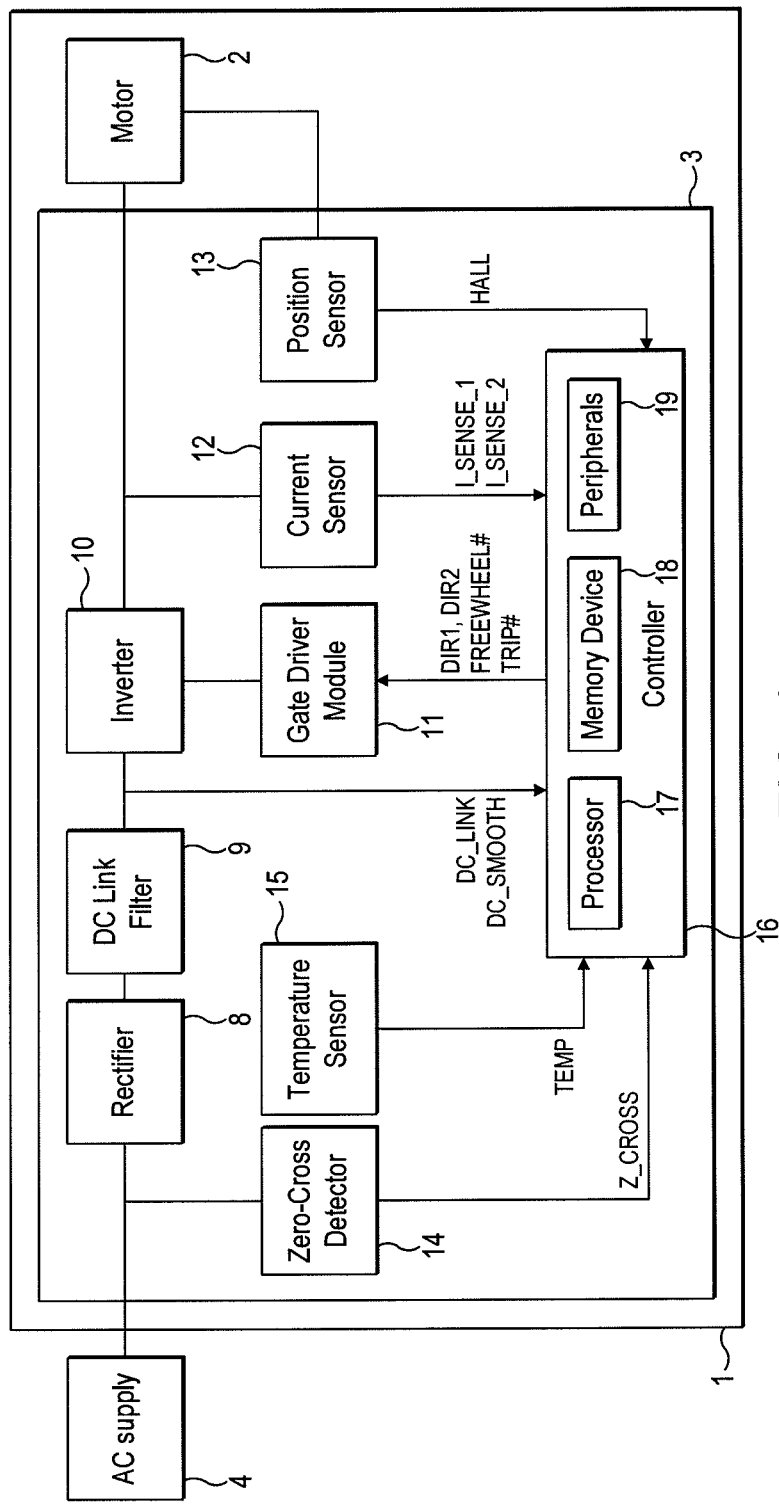
FIG. 1 is a block diagram of a motor system in accordance with the present invention.
Figure 2:
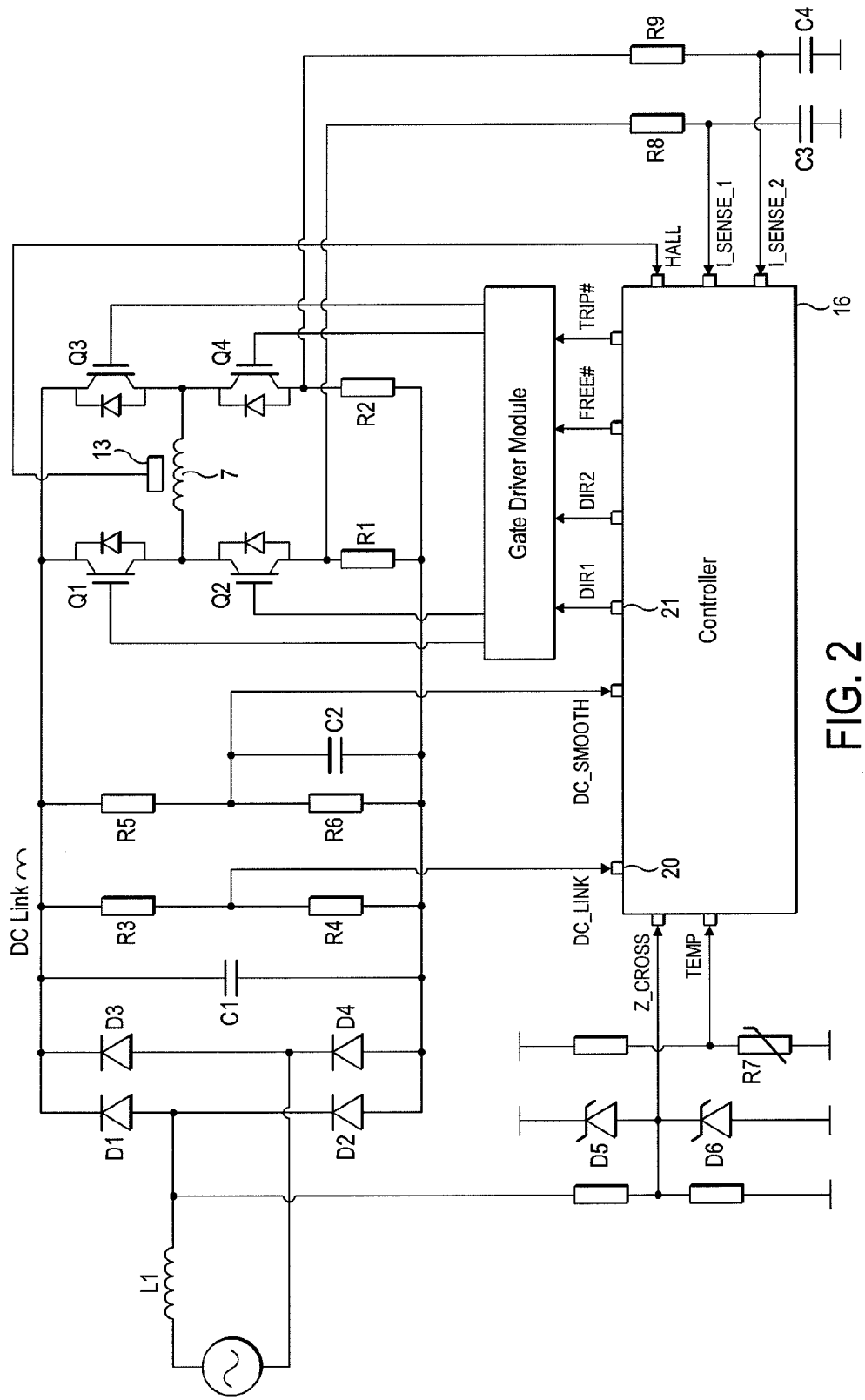
FIG. 2 is a schematic diagram of the motor system.
Figures 3, 4:
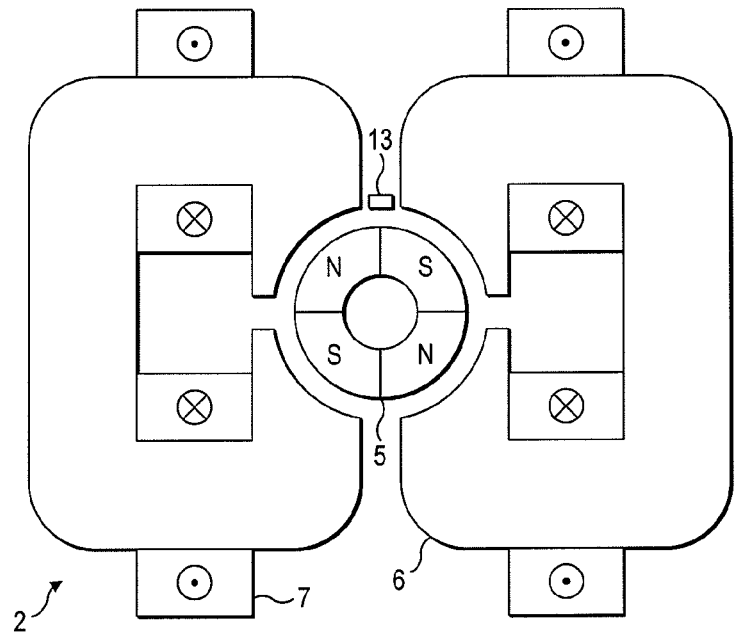
FIG. 3 is a sectional view of the motor of the motor system.
FIG. 4 details the allowed states of the inverter in response to control signals issued by the controller of the motor system.

The motor system 1 of FIGS. 1 to 3 comprises a brushless motor 2 and a control system 3. Power to the motor system 1 is provided by an AC supply 4. The AC supply 4 is intended to be a domestic mains supply, though other power supplies capable of providing an alternating voltage might equally be used.

The motor 2 comprises a four-pole permanent-magnet rotor 5 that rotates relative to a stator 6. The stator 6 comprises a pair of c-shaped cores that define four stator poles. Conductive wires are wound about the stator 6 and are coupled together to form a single phase winding 7.

The control system 3 comprises a rectifier 8, a DC link filter 9, an inverter 10, a gate driver module 11, a current sensor 12, a position sensor 13, a zero-cross detector 14, a temperature sensor 15, and a controller 16.

The rectifier 8 is a full-wave bridge D1-D4 that rectifies the output of the AC supply 4 to provide a DC voltage.

The DC link filter 9 comprises a link capacitor C1 and a link inductor L1. The link capacitor C1 acts to smooth the relatively high-frequency ripple that arises from inverter switching. As described below in more detail, the link capacitor C1 is not required to smooth the rectified DC voltage at the fundamental frequency. Consequently, a link capacitor of relatively low capacitance may be used. The link inductor L1 acts to smooth any residual current ripple that arises from inverter switching. Again, since the link inductor L1 is intended to reduce ripple at the switching frequency of the inverter 10, an inductor of relatively low inductance may be used. In order that saturation is avoided, the link inductor L1 has a saturation point that exceeds the peak current drawn from the AC supply 4 during normal operation of the motor system 1.

The inverter 10 comprises a full bridge of four power switches Q1-Q4 that couple the DC link voltage to the phase winding 7. Each power switch Q1-Q4 is an IGBT, which is capable of operating at the voltage level typically of most mains power supplies. Other types of power switch, such as BJTs or MOSFETs, might alternatively be used depending on the rating of the power switch and the voltage of the AC supply 4. Each of the switches Q1-Q4 includes a flyback diode, which protects the switch against voltage spikes that arise during inverter switching.

The gate driver module 11 drives the opening and closing of the switches Q1-Q4 of the inverter 10 in response to control signals received from the controller 16.

The current sensor 12 comprises a pair of shunt resistors R1,R2, each resistor located on a lower arm of the inverter 10. The resistance of each shunt resistor R1,R2 is ideally as high as possible without exceeding dissipation limits during normal operation of the motor system 1. The voltage across each shunt resistor R1,R2 is output to the controller 16 as a current sense signal, I_SENSE_1 and I_SENSE_2. The first current sense signal, I_SENSE_1, provides a measure of the current in the phase winding 7 when driven from right to left (as is described below in more detail). The second current sense signal, I_SENSE_2, provides a measure of the current in the phase winding 7 when driven from left to right. In locating the shunt resistors R1,R2 on the lower arms of the inverter 10, current in the phase winding 7 continues to be sensed during freewheeling (again, as is described below in more detail).

The position sensor 13 is a Hall-effect sensor that outputs a digital signal, HALL, that is logically high or low depending on the direction of magnetic flux through the sensor 13. By locating the position sensor 13 adjacent the rotor 5, the HALL signal provides a measure of the angular position of the rotor 5. More particularly, each edge of the HALL signal indicates a change in the polarity of the rotor 5. When rotating, the permanent-magnet rotor induces a back EMF in the phase winding 7. Consequently, each edge of the HALL signal also represents a change in the polarity of the back EMF in the phase winding 7.

The zero-cross detector 14 comprises a pair of clamping diodes D5,D6 that output a digital signal, Z_CROSS, that is logically high when the voltage of the AC supply 4 is positive and logically low when the voltage of the AC supply 4 is negative. Each edge of the Z_CROSS signal thus represents a point in time at which the voltage of the AC supply 4 crosses zero.

The temperature sensor 15 comprises a thermistor R7 that outputs an analog signal, TEMP, that provides a measure of the temperature within the motor system 1.

The controller 16 comprises a microcontroller having a processor 17, a memory device 18, a plurality of peripherals 19 (e.g. ADC, comparators, timers etc.), a plurality of input pins 20, and a plurality of output pins 21. The memory device 18 stores software instructions for execution by the processor 17. The memory device 18 also stores a plurality of lookup tables, which are indexed by the processor 17 during operation of the motor system 1.

The controller 16 is responsible for controlling the operation of the motor system 1. In response to signals at the input pins 20, the controller 16 generates control signals at the output pins 21. The output pins 21 are coupled to the gate drive module 11, which controls the opening and closing of the switches Q1-Q4 of the inverter 10 in response to the control signals.

Seven signals are received at the input pins 20 of the controller 16: I_SENSE_1, I_SENSE_2, HALL, Z_CROSS, TEMP, DC_LINK and DC_SMOOTH. I_SENSE_1 and I_SENSE_2 are the signals output by the current sensor 12. HALL is the signal output by the position sensor 13. Z_CROSS is the signal output by the zero-cross detector 14. TEMP is the signal output by the temperature sensor 15. DC_LINK is a scaled-down measure of the DC link voltage, which is obtained by a potential divider R3,R4 located between the DC link line and the zero volt line. DC_S-

MOOTH is a smoothed measure of the DC link voltage, obtained by a potential divider R5,R6 and smoothing capacitor C2.

In response to the signals received at the inputs, the controller 16 generates and outputs four control signals: TRIP#, DIR1, DIR2, and FREEWHEEL#.

TRIP# is a failsafe control signal. When TRIP# is pulled logically low, the gate driver module 11 opens all switches Q1-Q4 of the inverter 10. As described below in more detail, the controller 16 pulls TRIP# logically low in the event that current through the phase winding 7 exceeds a failsafe threshold.

DIR1 and DIR2 control the direction of current through the inverter 10 and thus through the phase winding 7. When DIR1 is pulled logically high and DIR2 is pulled logically low, the gate driver module 11 closes switches Q1 and Q4, and opens switches Q2 and Q3, thus causing current to be driven through the phase winding 7 from left to right. Conversely, when DIR2 is pulled logically high and DIR1 is pulled logically low, the gate driver module 11 closes switches Q2 and Q3, and opens switches Q1 and Q4, thus causing current to be driven through the phase winding 7 from right to left. Current in the phase winding 7 is therefore commutated by reversing DIR1 and DIR2. If both DIR1 and DIR2 are pulled logically low, the gate drive module 11 opens all switches Q1-Q4.

FREEWHEEL# is used to disconnect the phase winding 7 from the DC link voltage and allow current in the phase winding 7 to re-circulate or freewheel around the low-side loop of the inverter 10. Accordingly, in response to a FREEWHEEL# signal that is pulled logically low, the gate driver module 11 causes both high-side Q1,Q2 switches to open. Current then freewheels around the low-side loop of the inverter 10 in a direction defined by DIR1 and DIR2.

FIG. 4 summarizes the allowed states of the switches Q1-Q4 in response to the control signals of the controller 16. Hereafter, the terms 'set' and 'clear' will be used to indicate that a signal has been pulled logically high and low respectively.

When a particular control signal changes, there is a short delay between the changing of the control signal and the physical opening or closing of a power switch. If a further control signal were changed during this delay period, it is possible that both switches on a particular arm of the inverter (i.e. Q1,Q3 or Q2,Q4) may be closed at the same time. This short-circuit, or shoot-through as it is often termed, would damage the switches on that particular arm of the inverter 10. Accordingly, in order to prevent shoot-through, the controller 16 employs a dead time, T_DT, between the changing of two control signals. So, for example, when commutating the phase winding 7, the controller 16 first clears DIR1, waits for the dead time, T_DT, and then sets DIR2. The dead time is ideally kept as short as possible so as to optimize performance while ensuring that the gate driver module 11 and the power switches Q1-Q4 have sufficient time to respond.

Commutation

The controller 16 commutates the phase winding 7 in response to edges of the HALL signal. Commutation involves reversing DIR1 and DIR2 (i.e. clearing DIR1 and setting DIR2, or clearing DIR2 and setting DIR1) so as to reverse the direction of current through the phase winding 7. The phase winding 7 may be freewheeling at the point of commutation. Accordingly, in addition to reversing DIR1 and DIR2, the controller 16 sets FREEWHEEL#.

Synchronous Commutation

Below a predetermined speed threshold, SPEED_ADV, the controller 16 commutates the phase winding 7 in synchrony with the edges of the HALL signal. Each edge of the HALL signal represents a change in the polarity of back EMF in the phase winding 7. Consequently, at speeds below SPEED_ADV, the controller 16 commutates the phase winding 7 in synchrony with the zero-crossings of back EMF.

As the rotor 5 accelerates, the period of each electrical half-cycle decreases and thus the time constant (L/R) associated with the inductance of the phase winding 7 becomes increasingly important. Additionally, the magnitude of back EMF in the phase winding 7 increases, which then influences the rate at which current rises in the phase winding 7. Consequently, if the controller 16 continued to commutate the phase winding 7 in synchrony with the edges of the HALL signal, a speed would be reached at which it would be no longer possible to drive additional current into the phase winding 7 over each electrical half-cycle. Accordingly, on reaching SPEED_ADV, the controller 16 switches from synchronous commutation to advanced commutation. By commutating the phase winding 7 in advance of the edges of the HALL signal, the voltage used to excite the phase winding 7 is boosted by the back EMF. As a result, the direction of current through the phase winding 7 may be more quickly reversed. Additionally, phase current may be caused to lead the back EMF, which then helps to compensate for the slower rate of current rise. Although this then generates a short period of negative torque, this is normally more than compensated by the subsequent gain in positive torque.

Advanced Commutation

At speeds at or above the speed threshold, SPEED_ADV, the controller 16 commutates the phase winding 7 in advance of each edge of the HALL signal by an advance period, T_ADV. Since the electrical half-cycle period decreases and the back EMF increases with rotor speed, the electrical angle at which commutation occurs in advance of the edges of the HALL signal ideally increases with rotor speed. For a particular advance period, T_ADV, the corresponding advance angle, A_ADV, may be defined as:

$$A\_ADV \text{ (elec. deg)} = T\_ADV \text{ (sec)} * \{\omega \text{ (rpm)}/60\} * 360 \text{ (mech. deg)} * n/2$$

where A_ADV is the advance angle in electrical degrees, T_ADV is the advance period in seconds, ω is the rotor speed in rpm, and n is the number of rotor poles. From this equation, it can be seen that the advance angle is directly proportional to the rotor speed. Consequently, even for a fixed advance period, the advance angle increases with rotor speed. However, better control over acceleration, power and efficiency may be achieved by employing different advance periods at different rotor speeds. The controller 16 therefore comprises an advance lookup table that stores an advance period for each of a plurality of rotor speeds.

In response to an edge of the Z_CROSS signal, the controller 16 selects from the advance lookup table an advance period, T_ADV, corresponding to the speed of the rotor 5. The speed of the rotor 5 is determined from the interval, T_HALL, between two successive edges of the HALL signal. This interval will hereafter be referred to as the Hall period. The speed of the rotor 5 is then defined by:

$$\omega \text{ (rpm)} = 60/\{n*T\_HALL \text{ (sec)}\}$$

where ω is the speed of the rotor in rpm, T_HALL is the Hall period in seconds, and n is the number of poles of the rotor. The controller 16 uses the selected advance period to commutate the phase winding 7 in advance of the edges of the HALL signal. The same advance period, T_ADV, is then used by the controller 16 until such time as a further edge of the Z_CROSS signal is detected. In response to the further edge of the Z_CROSS signal, the controller 16 selects from the advance lookup table a new advance period corresponding to the speed of the rotor 5. The advance period is therefore updated only when the voltage of the AC supply 4 crosses zero, and is constant over each half-cycle of the AC supply 4.

In order to commutate the phase winding 7 in advance of a particular edge of the HALL signal, the controller 16 acts in response to the preceding edge of the HALL signal. In response to an edge of the HALL signal, the controller 16 subtracts the advance period, T_ADV, from the Hall period, T_HALL, in order to obtain a commutation period, T_COM:

$$T\_COM = T\_HALL - T\_ADV$$

The controller 16 then commutates the phase winding 7 at a time, T_COM, after the edge of the HALL signal. As a result, the phase winding 7 is commutated in advance of the subsequent edge of the HALL signal by the advance period, T_ADV.

As noted above, the advance period, T_ADV, remains fixed over each half-cycle of the AC supply 4. However, the speed of the rotor 5 varies over each half-cycle of the AC supply 4 owing to the sinusoidal increase and decrease in DC link voltage. The Hall period, T_HALL, therefore varies over each half-cycle of the AC supply 4. Consequently, in contrast to the advance period, the controller 16 calculates the commutation period, T_COM, for each edge of the HALL signal.

Current Control

A number of the peripherals 19 of the controller 16 are configured to define a current regulator 22. The current regulator 22 monitors and regulates current in the phase winding 7. The current regulator 22 performs two functions. First, the current regulator 22 clears TRIP# in the event that current in the phase winding 7 exceeds a failsafe threshold. Second, the current regulator 22 generates an overcurrent signal in the event that current in the phase winding 7 exceeds an overcurrent threshold.

Figure 5:
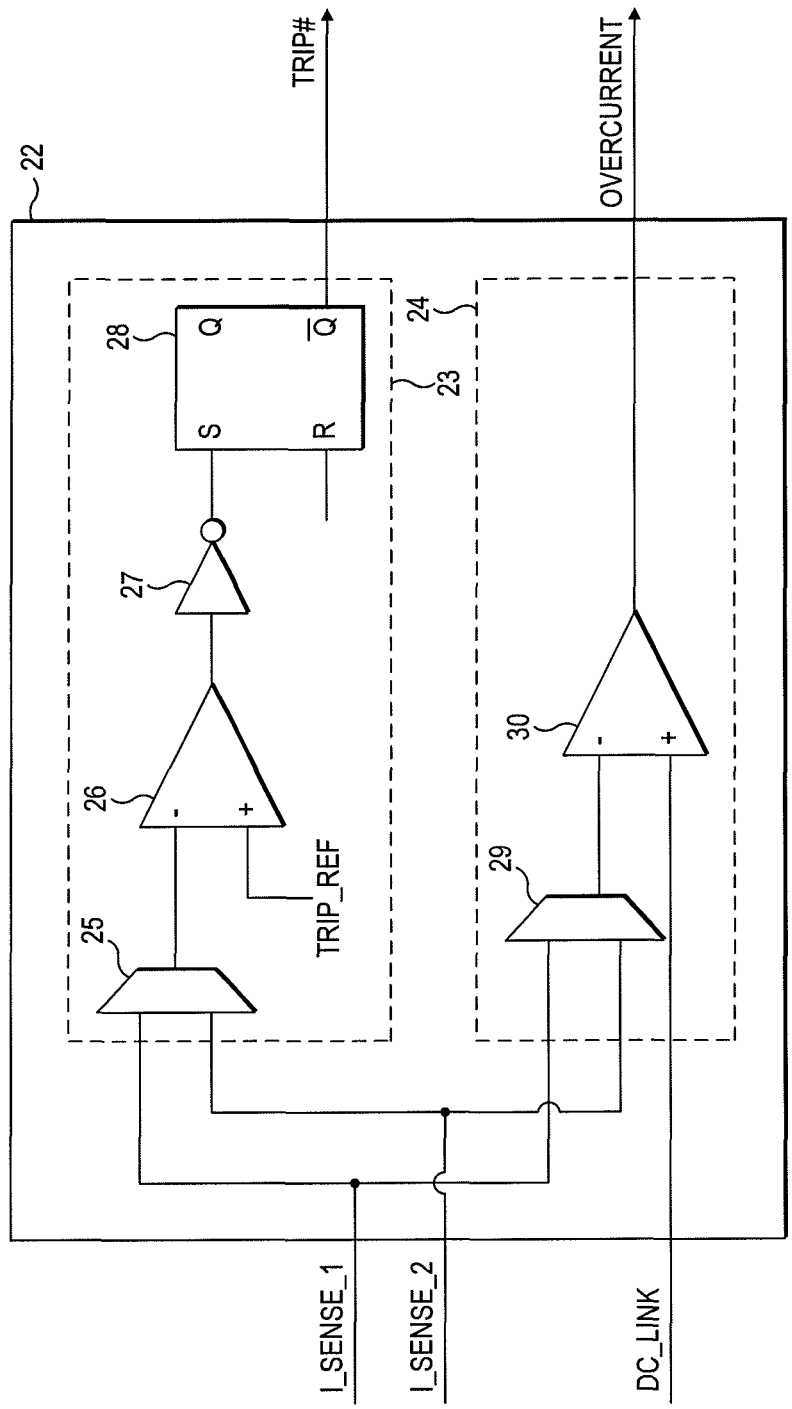
FIG. 5 is a schematic diagram of the current regulator of the motor system.

As illustrated in FIG. 5, the current regulator 22 comprises a failsafe module 23 and an overcurrent module 24.

The failsafe module 23 comprises a multiplexer 25, a comparator 26, a NOT gate 27, and an SR latch 28. The multiplexer 25 has two inputs for selecting one of the two current-sense signals, I_SENSE_1 and I_SENSE_2. The selection made by the multiplexer 25 is controlled by the processor 17 in response to the direction of current through the phase winding 7. In particular, when DIR1 is set, the multiplexer 25 is caused to select I_SENSE_1, and when DIR2 is set, the multiplexer is caused to select I_SENSE_2. The output of the multiplexer 25 is delivered to the comparator 26, which compares the voltage of the selected current-sense signal against a predetermined failsafe voltage, TRIP_REF. TRIP_REF is set such that the output of the comparator 26 is pulled logically high when current through the selected shunt resistor R1,R2 is greater than a predetermined failsafe threshold, I_MAX. TRIP_REF is thus defined by I_MAX and the resistances of the shunt resistors R1,R2. The output of the comparator 26 is delivered to the NOT gate 27, the output of which is delivered to the S-input of the SR latch 28. The Q# output of the SR latch 28 is output by the current regulator 22 as the TRIP# signal. Consequently, when the voltage of the current-sense signal, I_SENSE_1 or I_SENSE_2, is greater than TRIP_REF, TRIP# is cleared.

As noted above, the gate driver module 11 opens all switches Q1-Q4 of the inverter 10 in response to a cleared TRIP# signal. The failsafe module 23 of the current regulator 22 thus prevents current in the phase winding 7 from exceeding a failsafe threshold, I_MAX, above which the switches Q1-Q4 may be damaged and/or the rotor 5 may be demagnetized. By employing hardware to clear the TRIP# signal, the current regulator 22 responds relatively quickly when current in the phase winding 7 exceeds the failsafe threshold. If software executed by the processor 17 were instead employed to clear the TRIP# signal, a delay might arise between current exceeding the failsafe threshold and the clearing of the TRIP# signal, during which time current may rise to a level that damages the switches Q1-Q4 or demagnetizes the rotor 5.

The processor 17 polls the TRIP# signal in response to each edge of the HALL signal. If the TRIP# signal is clear for five successive HALL edges, the processor 17 writes a 'Failsafe Exceeded' error to the memory device 18 and enters Fault Mode, which is described below in more detail. Monitoring the TRIP# signal in this manner ensures that the controller 16 does not inadvertently enter Fault Mode due to transient noise in the TRIP# signal.

The overcurrent module 24 comprises a multiplexer 29 and a comparator 30. The multiplexer 29, like that of the failsafe module 23, has two inputs for selecting one of the two current-sense signals, I_SENSE_1 and I_SENSE_2. Again, the selection made by the multiplexer 29 is controlled by the processor 17 in response to the direction of current through the phase winding 7. Consequently, when DIR1 is set, the multiplexer 29 selects I_SENSE_1, and when DIR2 is set, the multiplexer 29 selects I_SENSE_2. The output of the multiplexer 29 is delivered to the comparator 30, which compares the voltage of the current-sense signal against the voltage of the DC_LINK signal. When the current-sense signal, I_SENSE_1 or I_SENSE_2, is greater than DC_LINK, the output of the comparator 30 is pulled logically low. The overcurrent module 24 thus outputs an overcurrent signal that is pulled logically low when current in the phase winding 7 exceeds an overcurrent threshold that is proportional to the DC link voltage.

The output of the overcurrent module 24 is coupled to the processor 17, which executes an overcurrent routine in response to a low overcurrent signal. Since the overcurrent threshold is proportional to the DC link voltage, the overcurrent threshold varies as a rectified sinusoid across each cycle of the AC supply 4, the benefits of which are explained in more detail below.

The resistances of the potential divider R3,R4 are selected such that the peak voltage of the DC_LINK signal does not exceed TRIP_REF. Consequently, the current regulator 22 triggers an overcurrent event before current in the phase winding 7 exceeds the failsafe threshold. The overcurrent module 24 and the processor 17 are thus expected to regulate current in the phase winding 7. The failsafe module 23 is expected to clear TRIP# only in the unlikely event of a fault within the processor 17 (e.g. a software fault) or if the current in the phase winding 7 rises at such a rate that the failsafe threshold, I_MAX, is reached before the processor 17 is able to respond to the overcurrent event.

In response to an overcurrent event, the controller 16 performs a different series of actions depending on the speed of the rotor 5. At speeds below a predetermined threshold, SPEED_SINGLE, the controller 16 operates in a 'multi-switch mode'. At speeds at or above the predetermined threshold, the controller 16 operates in a 'single-switch mode'.

Multi-Switch Mode

In response to an overcurrent event in multi-switch mode, the controller 16 freewheels the phase winding 7 by clearing FREEWHEEL#. Freewheeling continues for a freewheel period, T_FW, during which time current in the phase winding 7 is expected to decay to a level below the overcurrent threshold. If current in the phase winding 7 continues to exceed the overcurrent threshold, the controller 16 again freewheels the phase winding 7 for the freewheel period, T_FW. If, on the other hand, current in the phase winding 7 has dropped below the overcurrent threshold, the controller 16 resumes excitation of the phase winding 7 by setting FREE-WHEEL#.

For a particular freewheel period, T_FW, the corresponding electrical angle, A_FW, may be defined as:

$$A\_FW(\text{elec. deg}) = T\_FW(\text{sec}) * \{\omega\,(\text{rpm})/60\} * 360\,(\text{mech. deg}) * n/2$$

where A_FW is the freewheel angle in electrical degrees, T_FW is the freewheel period in seconds, ω is the rotor speed in rpm, and n is the number of rotor poles. Consequently, for a fixed freewheel period, the corresponding freewheel angle increases with rotor speed. However, as the freewheel angle increases, the remaining period over which current and thus power is driven into the phase winding 7 decreases. The controller 16 therefore employs a freewheel period, T_FW, that decreases with increasing rotor speed such that the corresponding freewheel angle, A_FW, does not become excessively large as the rotor 5 accelerates.

The controller 16 comprises a freewheel lookup table that stores a freewheel period for each of a plurality of rotor speeds. In response to an edge of the Z_CROSS signal, the controller 16 selects from the freewheel lookup table a freewheel period, T_FW, corresponding to the speed of the rotor 5. The controller 16 then uses the selected freewheel period to freewheel the phase winding 7 in response to an overcurrent event. The same freewheel period, T_FW, is used by the controller 16 until such time as a further edge of the Z_CROSS signal is detected. In response to the further edge of the Z_CROSS signal, the controller 16 selects from the freewheel lookup table a new freewheel period corresponding to the speed of the rotor 5. Consequently, as with the advance period, the freewheel period is updated only when the voltage of the AC supply 4 crosses zero, and remains constant over each half-cycle of the AC supply 4.

The controller 16 operates in multi-switch mode only while the rotor 5 accelerates from stationary to SPEED_SINGLE. As such, the length of time spent by the controller 16 in multi-switch mode is relatively short. A relatively coarse speed resolution may therefore be used for the freewheel lookup table without adversely affecting the power or efficiency of the motor system 1. Indeed, one might conceivably use a fixed freewheel period, so long as the corresponding freewheel angle does not become excessively large as the rotor 5 approaches SPEED_SINGLE.

At relatively low rotor speeds, the back EMF induced in the phase winding 7 by the rotor 5 is relatively small. Consequently, current in the phase winding 7 rises to the overcurrent threshold relatively quickly. Owing to the relatively short period of time taken for the current to reach the overcurrent threshold, the controller 16 will typically switch the phase winding 7 between excitation and freewheel multiple times during each electrical half-cycle of the motor 2. It is for this reason that the controller 16 is said to operate in a multi-switch mode at speeds below SPEED_SINGLE. As the rotor speed increases, the Hall period naturally decreases. Additionally, the back EMF increases and thus the time taken for current in the phase winding 7 to reach the overcurrent threshold increases. Consequently, the controller 16 switches the phase winding 7 between excitation and freewheel less frequently as the rotor 5 accelerates. Eventually, the speed of the rotor 5 rises to a level at which the controller 16 switches the phase winding 7 only once between excitation and freewheel during each electrical half-cycle of the motor 2.

Single-Switch Mode

In response to an overcurrent event in single-switch mode, the controller 16 does not immediately freewheel the phase winding 7. Instead, the controller 16 continues to excite the phase winding 7 for an overrun period, T_OVR. After the overrun period has elapsed, the controller 16 freewheels the phase winding 7 by clearing FREEWHEEL#. Freewheeling then continues indefinitely until such time as the controller 16 commutates the phase winding 7. The controller 16 thus switches the phase winding 7 from excitation to freewheel only once during each electrical half-cycle of the motor 2.

Figure 6:
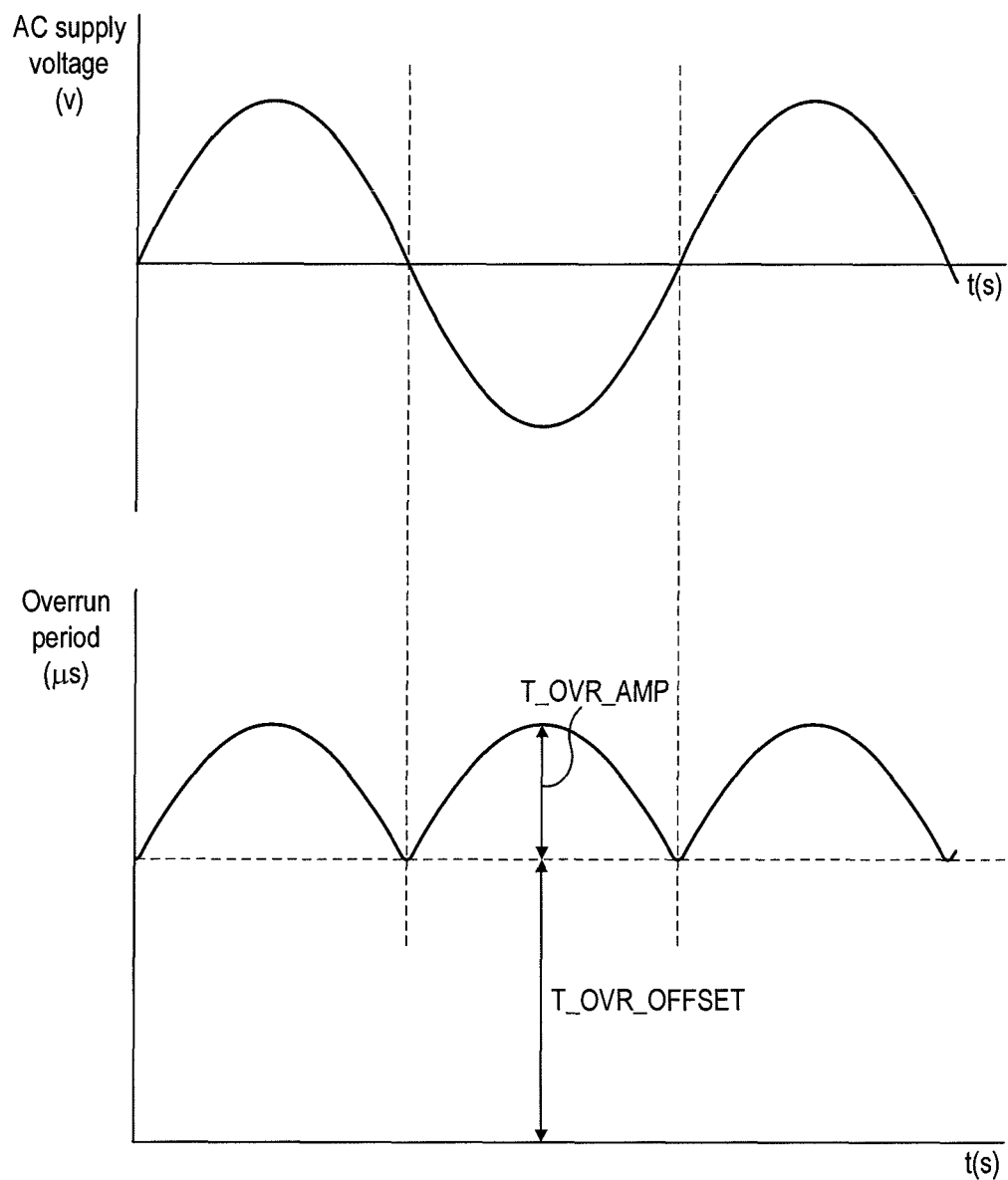
FIG. 6 illustrates the overrun period used by the controller when operating in single-switch mode.

Referring now to FIG. 6, the overrun period, T_OVR, is defined by the equation:

$$T\_OVR = T\_OVR\_OFFSET + T\_OVR\_AMP * abs\{\sin(\theta)\}$$

where T_OVR_OFFSET is an offset value, T_OVR_AMP*abs{sin(θ)} is a rectified sine wave having an amplitude defined by T_OVR_AMP, and θ is the angle in the voltage cycle of the AC supply 4.

The angle θ may be expressed as a time interval from a zero-crossing in the voltage of the AC supply 4:

$$\theta(\text{deg}) = t(\text{sec}) * f(\text{Hz}) * 360(\text{deg})$$

where t is the time elapsed in seconds since a zero-crossing in the AC supply 4, and f is the frequency in Hertz of the AC supply 4. The overrun period may then be defined as:

$$T\_OVR = T\_OVR\_OFFSET + T\_OVR\_AMP * abs\{\sin(t * f * 360\,\text{deg})\}$$

More simply, the overrun period, T_OVR, may be regarded as the sum of two components:

$$T\_OVR = T\_OVR\_OFFSET + T\_OVR\_SINE$$

where T_OVR_OFFSET is an overrun offset value that is independent of time, and T_OVR_SINE is an overrun sine value that is dependent on time.

T_OVR_SINE is stored by the controller 16 as an overrun sine lookup table. The overrun sine lookup table comprises an overrun sine value, T_OVR_SINE, for each of a plurality of times. In response to an edge of the HALL signal, the controller 16 determines the period of time, t, that has elapsed since the last edge of the Z_CROSS signal. The controller 16 then selects from the overrun sine lookup table an overrun sine value, T_OVR_SINE, corresponding to the elapsed period of time. The controller 16 then sums the overrun offset value, T_OVR_OFFSET, and the overrun sine value, T_OVR_SINE, to obtain the overrun period, T_OVR.

As is described below in more detail, by selecting appropriate values for the advance period, T_ADV, the overrun offset, T_OVR_OFFSET, and the overrun amplitude, T_OVR_AMP, the efficiency of the motor system 1 may optimized for a specific average input power or average output power. Moreover, appropriate values may be selected such that the waveform of current drawn from the AC supply 4 complies with harmonic standards set by governing bodies.

Timeout

Irrespective of rotor speed, an overcurrent event is expected to occur at least once during each electrical half-cycle of the motor 2. Should an overcurrent event fail to occur, the controller 16 would continue to excite the phase winding 7 and thus current in the phase winding 7 would continue to rise. At relatively high rotor speeds, the magnitude of back EMF in the phase winding 7 is relatively large. As a result, current in the phase winding 7 is unlikely to reach an excessive level even in the absence of an overcurrent event. However, at relatively low rotor speeds, the back EMF induced in the phase winding 7 is relatively small. As a result, current in the phase winding 7 may rise to an excessive level in the absence of an overcurrent event. Indeed, the current may rise to the failsafe threshold, I_MAX, which would then cause the controller 16 to enter Fault Mode. Consequently, when operating in multi-switch mode, the controller 16 automatically executes the overcurrent routine after the phase winding 7 has been excited constantly in the same direction for a timeout period, T_TO. The timeout period thus acts as a failsafe mechanism by ensuring that the maximum period of time over which the phase winding 7 can be excited is limited.

As the speed of the rotor 5 increases, the magnitude of back EMF induced in the phase winding 7 also increases. Consequently, the rate at which current rises in the phase winding 7 decreases with increasing rotor speed. Put another way, the electrical angle over which current in the phase winding 7 rises to the overcurrent threshold increases with rotor speed. The controller 16 therefore employs a timeout angle, A_TO, that increases with rotor speed. For a particular timeout period, T_TO, the corresponding timeout angle, A_TO, may be defined as:

$$A\_TO \text{ (elec. deg)} = T\_TO \text{ (sec)} * \{\omega \text{ (rpm)}/60\} * 360 \text{ (mech. deg)} * n/2$$

where A_TO is the timeout angle in electrical degrees, T_TO is the timeout period in seconds, ω is the rotor speed in rpm, and n is the number of rotor poles. Consequently, for a fixed timeout period, the corresponding timeout angle increases linearly with rotor speed. The controller 16 may therefore use a fixed timeout period, T_TO. However, better control may be achieved if the controller 16 uses a different timeout period for different rotor speeds. The controller 16 therefore comprises a timeout lookup table that stores a timeout period, T_TO, for each of a plurality of rotor speeds.

In response to an edge of the Z_CROSS signal, the controller 16 selects from the timeout lookup table a timeout period, T_TO, corresponding to the speed of the rotor 5. The same timeout period is then used by the controller 16 until such time as a further edge of the Z_CROSS signal is detected. In response to the further edge of the Z_CROSS signal, the controller 16 selects from the timeout lookup table a new timeout period corresponding to the speed of the rotor 5. Accordingly, as with the advance period and the freewheel period, the timeout period is updated only when the voltage of the AC supply 4 crosses zero, and remains constant over each half-cycle of the AC supply 4.

Constant Power

The controller 16 operates primarily in advanced commutation, single-switch mode. Within this mode, the speed of the rotor 5 varies as the rotor 5 experiences different loads. As the rotor speed varies, so too does the magnitude of back EMF induced in the phase winding 7. If the controller 16 were to employ a fixed advance period and overrun period, the average input power and the average output power of the system 1 would vary with rotor speed. However, there may be applications for which it is desirable to have a motor system 1 that maintains constant average input or output power over a particular speed range.

The average input and output power of the motor system 1 are also dependent upon the RMS voltage of the AC supply 4. However, the RMS voltage may not be regular. Again, there may be applications for which it is desirable to have a motor system 1 that maintains constant average input or output power irrespective of changes in the voltage of the AC supply 4. Additionally, the mains power supply in two different countries may differ in RMS voltage but not in frequency. It would be therefore be advantageous if the same performance were achieved by the motor system 1 in both countries.

Consequently, in order to maintain constant average power (input or output) over a particular speed range and/or voltage range, the controller 16 adjusts the advance period and the overrun period in response to changes in rotor speed and/or RMS voltage of the AC supply 4.

The advance lookup table therefore stores an advance period, T_ADV, for each of a plurality of rotor speeds and a plurality of voltages. The controller 16 also comprises an overrun offset lookup table that stores an overrun offset value, T_OVR_OFFSET, for each of a plurality of rotor speeds and a plurality of voltages. Each lookup table is thus two-dimensional and is indexed by rotor speed and voltage. As described below in more detail, the controller 16 samples the DC_SMOOTH signal to obtain a measure of the RMS voltage of the AC supply 4, which is then used by the controller 16 to index each of the lookup tables.

As with the advance period, the controller 16 updates the overrun offset value in response to edges of the Z_CROSS signal. In particular, the controller 16 selects from the overrun offset lookup table an overrun offset value, T_OVR_OFFSET, corresponding to the rotor speed and RMS voltage of the AC supply 4. The overrun offset is thus updated only when the voltage of the AC supply 4 crosses zero, and remains constant over each half-cycle of the AC supply 4.

In response to each edge of the HALL signal, the controller 16 selects from the overrun sine lookup table an overrun sine value, T_OVR_SINE, corresponding to the period of time, t, that has elapsed since the previous zero-crossing in the AC supply 4. The controller 16 then sums the overrun offset value, T_OVR_OFFSET, and the overrun sine value, T_OVR_SINE, to obtain the overrun period, T_OVR.

The advance period, T_ADV, and the overrun period, T_OVR, may therefore defined as:

$$T\_ADV = T\_ADV\_TABLE[speed, voltage]$$

$$T\_OVR = T\_OFFSET\_TABLE[speed, voltage] + T\_OVR\_SINE\_TABLE[t]$$

The advance period and the overrun period are thus adjusted in response to changes in the rotor speed and the RMS voltage of the AC supply 4 so as to ensure that constant average power (input or output) is achieved. One might also adjust the overrun amplitude, T_OVR_AMP, in response to changes in rotor speed and/or RMS voltage. For example, the controller 16 might store an overrun amplitude lookup table that stores an overrun amplitude value, T_OVR_AMP, for each of a plurality of rotor speeds and/or voltages. The controller 16 would then update the overrun amplitude value in response to each edge of the Z_CROSS signal. The overrun sine value, T_OVR_SINE, would then be obtained by multiplying the overrun amplitude value, T_OVR_AMP, with the value obtained from the sine lookup table. However, the multiplication of two numbers increases the number of instructions executed by the controller 16. Additionally, a controller 16 having a higher bit-resolution would be needed in order to handle the multiplication. Accordingly, in order that a relatively simple and cheap microcontroller might be used for the controller 16, the overrun amplitude is not adjusted. Nevertheless, should it prove necessary or desirable to do so, the overrun amplitude might also be adjusted.

Constant average power is maintained over a speed range bounded by SPEED_CP_MIN and SPEED_CP_MAX, and over a voltage range bounded by V_CP_MIN and V_CP_MAX.

Beyond these ranges, the controller 16 does not attempt to maintain constant average power. The reasons for this may vary depending on the particulars of the motor system 1. For example, at voltages below V_CP_MIN, it may not be possible to drive sufficient current into the phase winding 7 over each electrical half-cycle of the motor 2 in order to maintain constant average power. Alternatively, the efficiency of the motor system 1 may drop-off significantly at voltages below V_CP_MIN or maintaining constant average power below this voltage may result in excessive current harmonics.

While constant average power is maintained over a specific speed range and voltage range, the motor system 1 is nevertheless able to operate effectively at speeds and voltages beyond these ranges. The motor system 1 therefore has an operating speed range defined by SPEED_MIN and SPEED_MAX, and an operating voltage range defined by V_MIN and V_MAX. The advance lookup table and the overrun offset lookup table store values covering the full operating speed and voltage ranges of the motor system 1. However, constant average power is achieved only at speeds between SPEED_CP_MIN and SPEED_CP_MAX, and at voltages between V_CP_MIN and V_CP_MAX.

Voltage and Temperature Measurement

The peripherals 19 of the controller 16 include an analog-to-digital converter (ADC) having a plurality of channels. A first channel of the ADC is coupled to the input pin of the DC_SMOOTH signal, and a second channel of the ADC is coupled to the input pin of the TEMP signal.

In order to measure the RMS voltage of the AC supply 4, the processor 17 selects the first channel of the ADC and samples the DC_SMOOTH signal using the ADC. The time constant of the R6,C2 circuit is sufficiently long that the DC_SMOOTH signal appears relatively constant over each half-cycle of the AC supply 4. The DC_SMOOTH signal thus provides a measure of the peak voltage of the AC supply 4. Since the peak voltage is directly proportional to the RMS voltage, DC_SMOOTH also provides a measure of the RMS voltage. Although the DC_SMOOTH signal is relatively constant over each half-cycle of the AC supply 4, the signal nevertheless has a small degree of high-frequency ripple that arises from switching of the inverter 10. Accordingly, in order to compensate for this ripple, the processor 17 samples the DC_SMOOTH signal numerous times over each cycle of the AC supply 4. The processor 17 then takes the average of the samples in order to obtain a measure of the RMS voltage of the AC supply 4.

In order to measure the temperature, the processor 17 selects the second channel of the ADC and samples the TEMP signal using the ADC. Again, the processor 17 samples the TEMP signal numerous times and determines the average in order to obtain a measure of the temperature. By taking the average of numerous samples, the controller 16 does not inadvertently react to spurious noise in the TEMP signal or transient temperature changes within the motor system 1.

When operating at relatively high rotor speeds, the time required by the ADC to select a channel and sample the relevant input signal may delay the execution of other routines. As explained below in more detail, any delay is likely to adversely affect the performance of the motor system 1. Accordingly, when sampling DC_SMOOTH or TEMP, the sampling process is broken-up into three distinct steps, each of which is executed in turn in response to an edge of the HALL signal.

In response to a first edge of the HALL signal, the processor 17 selects the appropriate channel of the ADC. In response to a second edge, the processor 17 starts the ADC. In response to a third edge, the processor 17 reads the output register of the ADC. The output read by the processor 17 thus represents a single sample of the selected input signal, i.e. DC_SMOOTH or TEMP. The sample read by the processor 17 is then stored to the memory device 18. This three-step process is then repeated to obtain a further sample of the input signal, which is then added to the value already stored in the memory device 18. The value stored in the memory device 18 thus corresponds to the sum of the individual samples read by the processor 17. The three-step process is repeated a predetermined number of times. The processor 17 then divides the value stored in the memory device 18 by the predetermined number to obtain an average measure of the input signal.

By breaking up the sampling process into three distinct steps, the time necessary to sample the input signal is spread across three electrical half-cycles of the motor 2. Consequently, the time spent by the controller 16 in sampling the input signal during each electrical half-cycle of the motor 2 is significantly reduced and thus the possibility of event clashing is reduced.

The controller 16 samples the DC_SMOOTH and TEMP signals concurrently. As illustrated in FIG. 7, the controller 16 performs the three-step process on the DC_SMOOTH signal to obtain a single sample of the RMS voltage of the AC supply 4. The controller 16 then performs the three-step process on the TEMP signal to obtain a single sample of the temperature. This process of alternately sampling DC_SMOOTH and TEMP is then repeated a predetermined number of times. The memory device 18 thus stores a first value corresponding to the sum of the samples of the RMS voltage of the AC supply 4, and a second value corresponding to the sum of the samples of the temperature.

Rather than sampling the DC_SMOOTH and TEMP signals concurrently, the controller 16 may instead sample the two input signals sequentially. In particular, the controller 16 may sample the DC_SMOOTH signal a predetermined number of times before then sampling the TEMP signal a predetermined number of times. By sampling the two input signals sequentially rather than concurrently, the channel of the ADC is changed only once for each set of samples. As a result, the step of selecting a channel may be dropped from all but the very first sample. A two-step process (i.e. start ADC and read ADC) may then be used to sample all but the very first of the samples. Accordingly, a greater number of samples may be collected over a particular time period. However, a drawback with sampling the two input signals sequentially is that, for each signal, there is a period during which the signal is not being measured.

The controller 16 has only one ADC, which is required to sample two input signals, namely DC_SMOOTH and TEMP. It is for this reason that the sampling process includes the step of selecting an ADC channel. If the temperature sensor 15 were omitted from the control system 3, the RMS voltage of the AC supply 4 could be sampled without the need for channel selection. Alternatively, if the peripherals 19 of the controller 16 included an additional ADC, each input signal could be sampled by a dedicated ADC and thus the step of selecting a channel could again by omitted. Nevertheless, in both instances, the sampling process continues to be broken into two steps, such that the time necessary to sample an input signal is spread across two electrical half-cycles of the motor 2.

In the particular embodiment illustrated in FIG. 7, each step of the sampling process is executed in response to a successive edge of the HALL signal. This then has the advantage that each sample is obtained relatively quickly, i.e. after three edges of the HALL signal. Nevertheless, it is not essential that each step is executed in response to successive edges of the HALL signal. For example, each step of the sampling process may be executed in response to every second or third edge of the HALL signal. While this then requires a longer period of time to obtain each sample, the controller 16 may use the time when it is not addressing the ADC to execute other routines.

Rather than using the average of the various samples as a measure of the input signal, the controller 16 might alternatively use the sum of the samples. Alternatively, the controller 16 might use the peak value of the samples as a measure of the input signal. For example, after reading a sample from the output register of the ADC, the processor 17 might compare the sample against a value stored in the memory device 18. If the sample is greater than the value stored in the memory device 18, the processor 17 overwrites the value with that of the sample. The steps of comparing and overwriting are then repeated for each of the predetermined number of samples. After all samples have been collected, the value stored in the memory device 18 represents the peak value of the samples. When measuring the peak value, it is not essential that the input signal representing the voltage of the AC supply 4 is smooth, so long as the samples span at least one half-cycle of the AC supply 4. Consequently, the smoothing capacitor C2 may be omitted or the capacitance might be significantly reduced so as to reduce the size and/or cost of the control system 3.

In addition to measuring the voltage of the AC supply 4 and temperature when operating at speed, the controller 16 also measures the voltage and temperature during initial power up. This initial check is made in order to ensure that the RMS voltage of the AC supply 4 and the temperature within the motor system 1 lie within safe operating limits. During this initial stage, the time spent by the controller 16 in sampling the input signal is not critical. Consequently, during initial power up, the controller 16 samples the voltage and the temperature without breaking the process into three steps.

Lookup Tables

The memory device 18 of the controller 16 stores a number of lookup tables, each having a particular speed and/or voltage resolution. The resolution of each lookup table need not be the same as that of other lookup tables and may vary across the lookup table. For example, the advance lookup table may store an advance period every 10 krpm at relatively low speeds, which gradually increases to 1 krpm at relatively high speeds.

Advanced commutation is employed in both multi-switch mode and single-switch mode. In single-switch mode, the advance period is adjusted in response to changes in both rotor speed and RMS voltage of the AC supply 4 in order to maintain constant average power. In multi-switch mode, it is not necessary to adjust the advance period in response to changes in voltage. Accordingly, in order to minimize the amount of memory required to store the advance lookup table, the memory device 18 stores two advance lookup tables: a one-dimensional lookup table that is indexed by rotor speed when operating at speeds below SPEED_SINGLE, and a two-dimensional lookup table that is indexed by rotor speed and voltage at speeds at or above SPEED_SINGLE.

Rather than storing absolute values, each lookup table may instead store difference values. The controller 16 then stores a reference value to which the difference values are applied. Consequently, when updating a particular parameter, the controller 16 indexes the relevant lookup table to select a difference value, and applies the difference value to the reference value to obtain the parameter. So, for example, the controller 16 may employ advance periods of 47 μs, 50 μs and 52 μs for the rotor speeds 85 krpm, 90 krpm and 95 krpm. The controller 16 might then store 50 μs as the reference value. The advance lookup table would then store −2 μs, 0 μs, and 1 μs for each of the three speeds. Storing a difference value typically requires less memory than an absolute value. As a result, the lookup tables may be stored more efficiently. A higher resolution for the lookup tables might then be achieved for a given amount of memory. Alternatively or additionally, a cheaper controller having a smaller memory capacity may be used. In a more general sense, therefore, each lookup table may be said to store a control value (e.g. an absolute or difference value) that is used by the controller 16 to determine the relevant parameter, e.g. advance period, overrun offset etc.

In order to reduce the number of instructions executed by the controller 16, the controller 16 only updates those parameters that are required for the relevant mode of operation. For example, when operating in synchronous commutation mode, the controller 16 has no need to select or update an advance period. Similarly, when operating in single-switch mode, the controller 16 has no need to select or update a freewheel period. As a consequence of updating only those parameters required for a particular mode of operation, the controller 16 does not immediately change from multi-switch mode to single-switch mode when the rotor reaches SPEED_SINGLE. If the controller 16 were to immediately change from multi-switch to single-switch mode, the controller 16 would not know what period of time had elapsed since the previous zero-crossing in the voltage of the AC supply 4. As a result, the controller 16 would not know what overrun period to use. Accordingly, when the rotor speed reaches SPEED_SINGLE, the controller 16 waits until the next edge of the Z_CROSS signal before changing from multi-switch mode to single-switch mode.

As the motor 2 accelerates from stationary, the length of the Hall period decreases. Consequently, if a parameter (e.g. the freewheel period) were updated on every nth edge of the HALL signal, the interval between each update would gradually decrease. Each parameter would then be updated less frequently at low speeds and more frequently at high speeds. By updating each parameter in response to a zero-crossing in the voltage of the AC supply 4, each parameter is updated at regular intervals irrespective of speed.

If a parameter were updated on every nth edge of the HALL signal while operating in single-switch mode, the parameter would update at different points within the cycle of the AC supply 4. This in turn could potentially increase the harmonic content of the current waveform drawn from the AC supply 4. Additionally, when the motor system 1 is operating at constant average speed, the instantaneous speed of the rotor 5 nevertheless varies over each half-cycle of the AC supply 4 owing to the sinusoidal increase and decrease in the DC link voltage. If a parameter were updated on every nth edge of the HALL signal, a different value for the parameter might be selected in spite of the fact that the average speed of the motor system 1 had not changed. Again, this may result in increased harmonics within the current waveform drawn from the AC supply 4. By updating each parameter in response to a zero-crossing in the AC supply 4, the same reference point in the cycle of the AC supply 4 is used. Consequently, a more stable current waveform is achieved. Furthermore, by updating the parameters only once every half-cycle of the AC supply 4, the instructions executed by the controller 16 are kept relatively simple and thus a simpler and cheaper microcontroller may be used. Of course, if one so desired, the various parameters may be updated less frequently by updating on every nth edge of the Z_CROSS signal.

Motor Operation

The operation of the motor system 1 as it accelerates from stationary to running speed will now be described. As can be seen from FIG. 8, the controller 16 has six operating modes:

Initialization, Stationary, Low-Speed Acceleration, High-Speed Acceleration, Running, and Fault. Within the various operating modes, the controller 16 controls the motor 2 through the use of one or more of the following four parameters: freewheel period, advance period, overrun period, and timeout period.

Initialization Mode

On powering up, the controller 16 enables the peripherals 19 and samples the DC_SMOOTH signal and the TEMP signal in order to obtain a measure of RMS voltage of the AC supply 4 and the temperature within the motor system 1. If the RMS voltage is less than an under-voltage threshold, V_MIN, or greater than an over-voltage threshold, V_MAX, the controller 16 writes an 'Under Voltage' or 'Over Voltage' error to the memory device 18 and enters Fault Mode. Similarly, if the temperature is less than an under-temperature threshold, TEMP_MIN, or greater than an over-temperature threshold, TEMP_MAX, the controller 16 writes an 'Under Temperature' or 'Over Temperature' error to the memory device 18 and enters Fault Mode.

If the RMS voltage and the temperature lie within the operating thresholds, the controller 16 determines whether the speed of the rotor 5 exceeds a stationary threshold, SPEED_STATIONARY. As noted above, the speed of the rotor 5 is obtained from the interval between two successive edges of the HALL signal, i.e. the Hall period. If the controller 16 fails to detect two edges of the HALL signal within a period of time corresponding to SPEED_STATIONARY, the controller 16 enters Stationary Mode. Otherwise, the controller 16 enters Low Speed Acceleration Mode.

Stationary Mode ($\omega$<SPEED_STATIONARY)

The controller 16 drives the motor 2 in reverse for a predetermined reverse-drive time, T_RD. For the purposes of the present description, it will be assumed that the motor 2 is driven forwards in response to driving the phase winding 7 from left-to-right when the HALL signal is logically low and from right-to-left when the HALL signal is logically high. The motor 2 is therefore driven in reverse in response to driving the phase winding 7 from right-to-left when the HALL signal is logically low and from left-to-right when the HALL signal is logically high, as detailed in FIG. 9.

Momentarily driving the motor 2 in reverse should cause the rotor 5 to either rotate in a forward direction or adopt a particular angular position relative to the stator 6. Whether the rotor 5 rotates forward or aligns with the stator 6 will depend on the starting position of the rotor 5. The rotor 5 is therefore either moving in a forward direction or is in a position ready for acceleration in a forward direction.

After momentarily driving the motor 2 in reverse, the controller 16 commutates the phase winding 7 so as to drive the motor 2 forward. The forward drive should cause the rotor 5 to rotate in a forward direction. If the rotor 5 is rotating as expected, an edge of the HALL signal should occur within a predetermined time, T_FD. If no edge is detected within the predetermined time, T_FD, the controller writes a 'Fail to Start' error to the memory device 18 and enters Fault Mode. Otherwise, the controller 16 commutates the phase winding 7 in response to the edge of the HALL signal so as to continue driving the motor 2 forward. A second edge of the HALL signal should then occur within a period of time corresponding to SPEED_STATIONARY. If the second edge is detected within the predetermined time, the controller 16 enters Low-Speed Acceleration Mode. Otherwise, the controller writes a 'Fail to Start' error to the memory device 18 and enters Fault Mode.

Low-Speed Acceleration Mode (SPEED_STATIONARY$\leq\omega$<SPEED_ADV)

Figure 10:
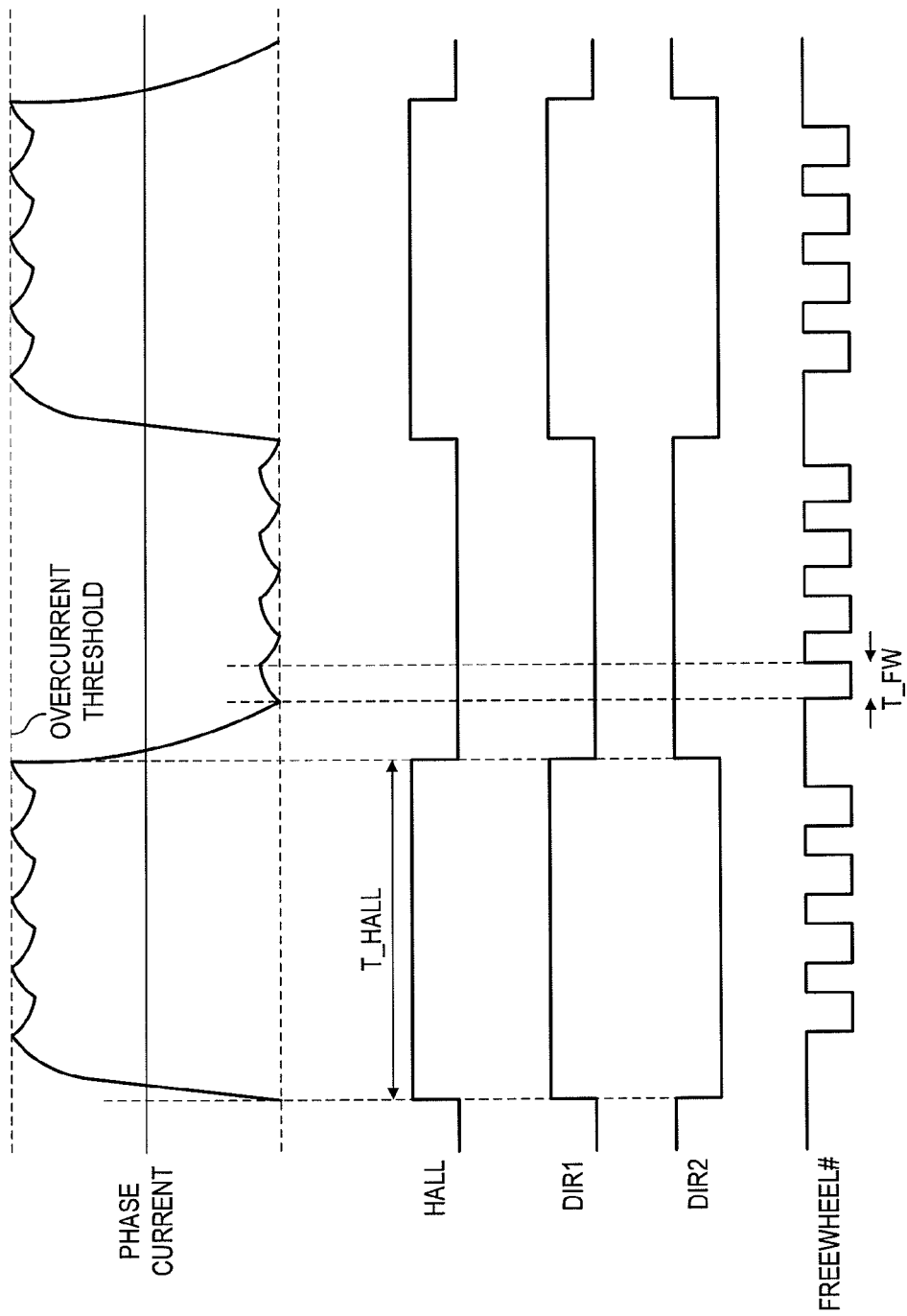
FIG. 10 illustrates various waveforms of the motor system when operating in Low-Speed Acceleration Mode.

When operating in Low-Speed Acceleration Mode, the controller 16 drives the motor 2 in synchronous commutation, multi-switch mode. FIG. 10 illustrates the waveforms of the HALL signal, the control signals, and the phase current over a few Hall periods.

In response to each edge of the HALL signal, the controller 16 immediately commutates the phase winding 7 (i.e. by reversing DIR1 and DIR2, and by setting FREEWHEEL#). The controller 16 then determines the speed of the rotor 5 on the basis of the Hall period, T_HALL. The controller 16 then polls a zero-cross flag, which is set in response to an edge of the Z_CROSS signal. If the zero-cross flag is set and the speed of the rotor 5 is greater than or equal to SPEED_ADV, the controller 16 enters High-Speed Acceleration Mode. If, on the other hand, the zero-cross flag is set but the rotor speed is less than SPEED_ADV, the controller 16 updates the freewheel period, T_FW, and the timeout period, T_TO, and clears the zero-cross flag. The freewheel and timeout periods are updated by indexing the freewheel and timeout lookup tables using the rotor speed.

After polling the zero-cross flag, and if necessary updating the freewheel and timeout periods, the controller 16 performs one of the three steps used to sample the DC_SMOOTH and TEMP signals. If the predetermined number of samples has been collected, the controller 16 determines the average of the samples to obtain a measure of the RMS voltage of the AC supply 4 or the temperature within the motor system 1. If the RMS voltage is less than V_MIN or greater than V_MAX, or if the temperature is less than TEMP_MIN or greater than TEMP_MAX, the controller 16 writes a corresponding error to the memory device 18 and enters Fault Mode.

Following commutation, the controller 16 continues to excite the phase winding 7 until either an overcurrent event occurs or the timeout period, T_TO, expires. In response to either of these two events, the controller 16 freewheels the phase winding 7 (i.e. by clearing FREEWHEEL#) for the freewheel period, T_FW. If, at the end of the freewheel period, current in the phase winding 7 exceeds the overcurrent threshold, the controller 16 again freewheels the phase winding 7 for the freewheel period, T_FW. Otherwise, at the end of the freewheel period, the controller 16 resumes excitation of the phase winding 7 (i.e. by setting FREEWHEEL#).

The controller 16 therefore commutates the phase winding 7 in synchrony with the edges of the HALL signal, and updates the freewheel period and the timeout period in response to edges of the Z_CROSS signal. The controller 16 continues to drive the motor 2 in synchronous commutation, multi-switch mode until such time as the speed of the rotor 5 reaches SPEED_ADV. On reaching SPEED_ADV, the controller 16 enters High-Speed Acceleration Mode in response to the next edge of the Z_CROSS signal.

High-Speed Acceleration Mode (SPEED_ADV$\leq\omega$<SPEED_SINGLE)

Figure 11:
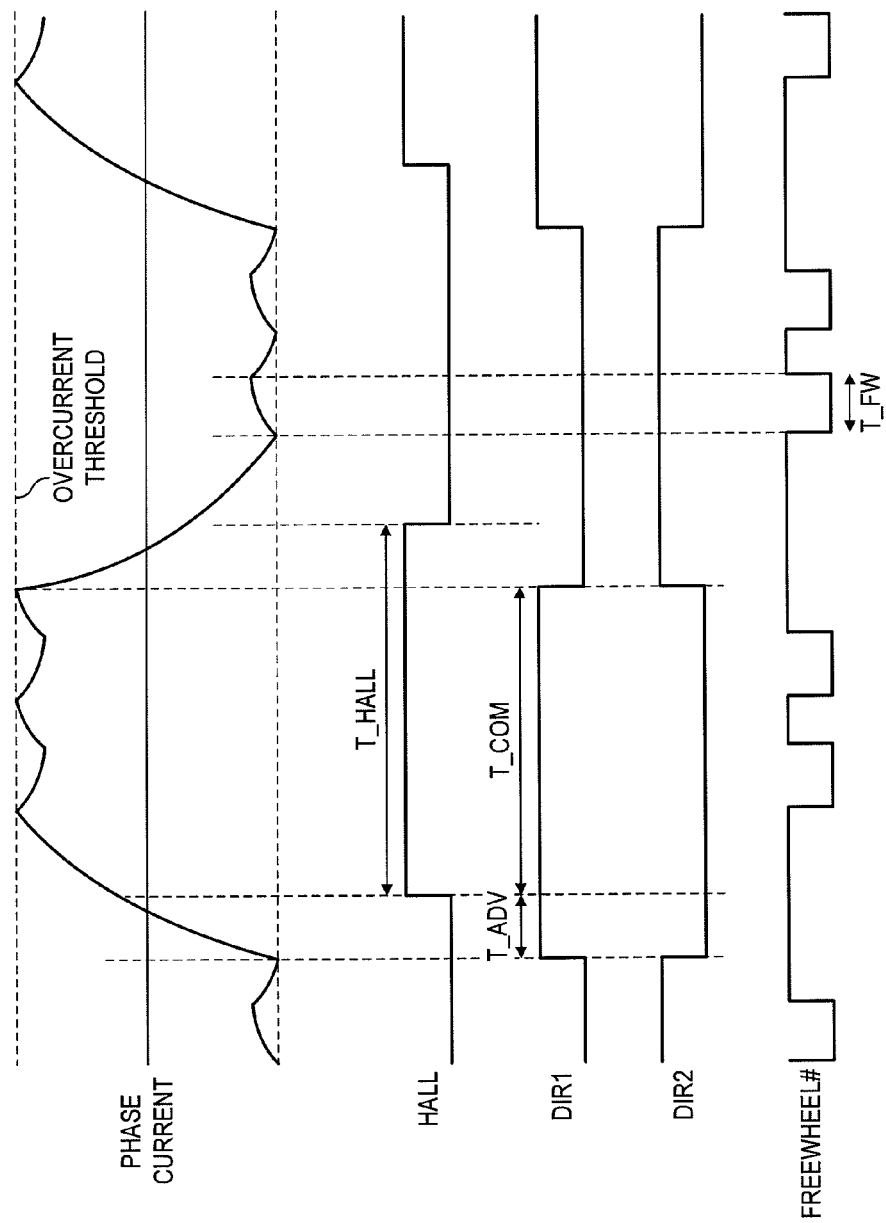
FIG. 11 illustrates various waveforms of the motor system when operating in High-Speed Acceleration Mode.

When operating in High-Speed Acceleration Mode, the controller 16 drives the motor 2 in advanced commutation, multi-switch mode. FIG. 11 illustrates the waveforms of the HALL signal, the control signals, and the phase current over a few Hall periods.

In response to each edge of the HALL signal, the controller 16 determines the speed of the rotor 5 on the basis of the Hall period, T_HALL. The controller 16 then polls the zero-cross flag that is set in response to an edge of the Z_CROSS signal. If the zero-cross flag is set and the speed of the rotor 5 is greater than or equal to SPEED_SINGLE, the controller 16 enters Running Mode. If, on the other hand, the zero-cross flag is set and the rotor speed is less than SPEED_SINGLE, the controller 16 updates the advance period, T_ADV, the freewheel period, T_FW, and the timeout period, T_TO, and clears the zero-cross flag. The advance, freewheel and timeout periods are updated by indexing the corresponding lookup tables using the rotor speed.

After polling the zero-cross flag, and if necessary updating the advance, freewheel and timeout periods, the controller 16 calculates the commutation period, T_COM, by subtracting the advance period, T_ADV, from the Hall period, T_HALL. The controller 16 then loads the commutation period, T_COM, into a timer.

After calculating the commutation period, the controller 16 performs one of the three steps used to sample the DC_SMOOTH and TEMP signals. If the predetermined number of samples has been collected, the controller 16 determines the average of the samples to obtain a measure of the RMS voltage of the AC supply 4 or the temperature within the motor system 1. If the RMS voltage is less than V_MIN or greater than V_MAX, or if the temperature is less than TEMP_MIN or greater than TEMP_MAX, the controller 16 writes a corresponding error to the memory device 18 and enters Fault Mode.

The controller 16 subsequently commutates the phase winding 7 (i.e. by reversing DIR1 and DIR2, and by setting FREEWHEEL#) after the timer has counted for the commutation period, T_COM. As a result, the controller 16 commutates the phase winding 7 in advance of the next edge of the HALL signal by the advance period, T_ADV. Following commutation, the controller 16 excites the phase winding 7 until either an overcurrent event occurs or the timeout period, T_TO, expires. In response to either of these two events, the controller 16 freewheels the phase winding 7 (i.e. by clearing FREEWHEEL#) for the freewheel period, T_FW. If, at the end of the freewheel period, current in the phase winding 7 exceeds the overcurrent threshold, the controller 16 again freewheels the phase winding 7 for the freewheel period, T_FW. Otherwise, at the end of the freewheel period, the controller 16 resumes excitation of the phase winding 7 (i.e. by setting FREEWHEEL#).

The controller 16 therefore commutates the phase winding 7 in advance of the edges of the HALL signal, and updates the advance period, the freewheel period and the timeout period in response to edges of the Z_CROSS signal. The controller 16 continues to drive the motor 2 in advanced commutation, multi-switch mode until such time as the speed of the rotor 5 reaches SPEED_SINGLE. On reaching SPEED_SINGLE, the controller 16 enters Running Mode in response to the next edge of the Z_CROSS signal.

Running Mode (SPEED_SINGLE≦ω)

Figure 12:
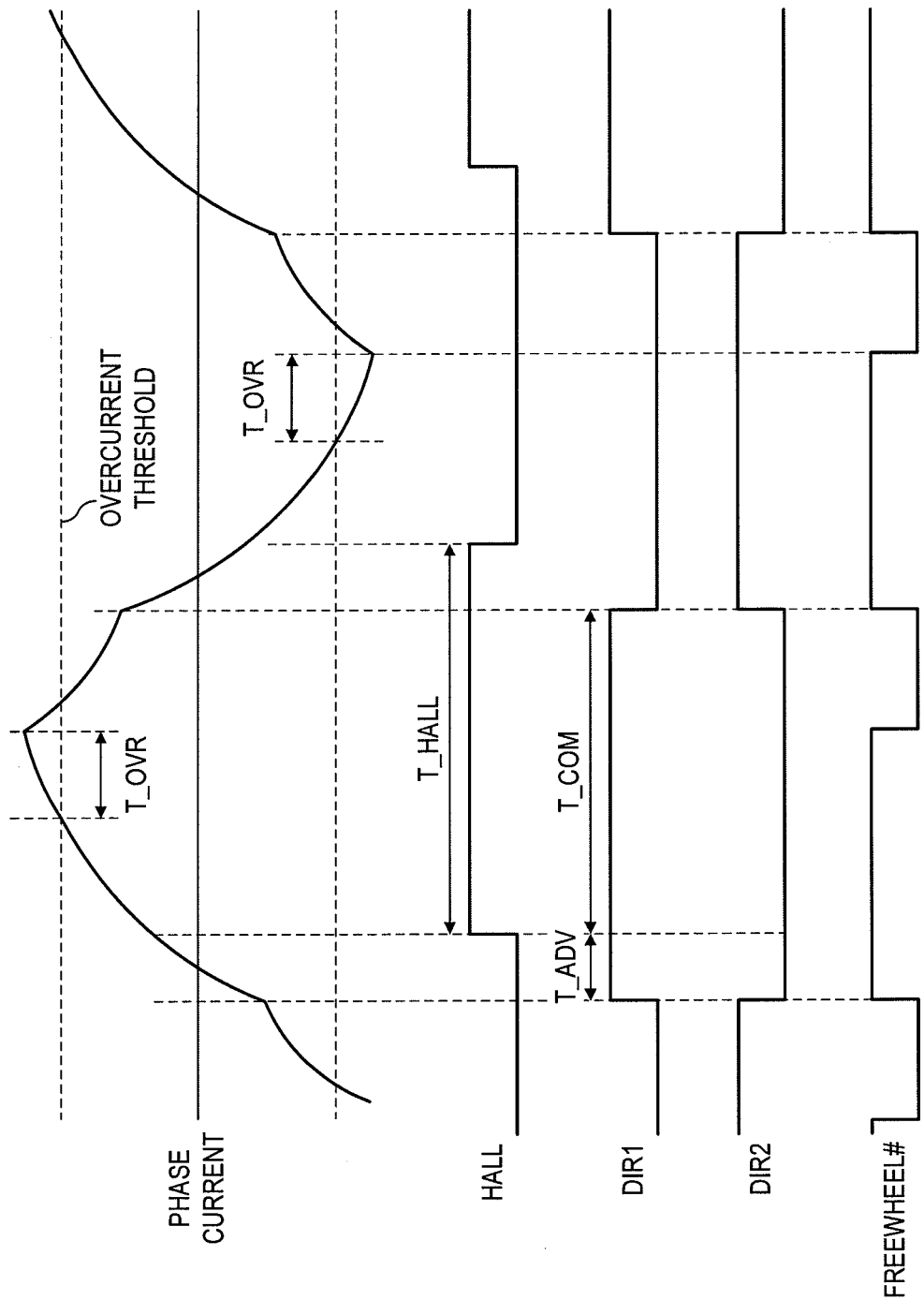
FIG. 12 illustrates various waveforms of the motor system when operating in Running Mode.

When operating in Running Mode, the controller 16 drives the motor 2 in advanced commutation, single-switch mode. FIG. 12 illustrates the waveforms of the HALL signal, the control signals, and the phase current over a few Hall periods.

In response to each edge of the HALL signal, the controller 16 determines the speed of the rotor 5 on the basis of the Hall period, T_HALL. The speed of the rotor 5 is expected to remain within a speed range bounded by SPEED_MIN and SPEED_MAX. The controller 16 will, however, permit transient speeds outside of this range. Accordingly, if the speed of the rotor 5 drops below SPEED_MIN for a period of time longer than T_US, the controller 16 writes an 'Under Speed' error to the memory device 18 and enters Fault Mode. Similarly, if the speed of the rotor 5 exceeds SPEED_MAX for a period of time longer than T_OS, the controller 16 writes an 'Over Speed' error to the memory device 18 and enters Fault Mode. However, should the speed of the rotor 5 exceed SPEED_TRIP, the controller 16 immediately writes a 'Speed Trip' error to the memory device 18 and enters Fault Mode. At speeds in excess of SPEED_TRIP, the likelihood of mechanical and/or electrical failure significantly increases.

The controller 16 then polls the zero-cross flag that is set in response to an edge of the Z_CROSS signal. If the zero-cross flag is set, the controller 16 updates the advance period, T_ADV, and the overrun offset value, T_OVR_OFFSET. Each value is updated by indexing the relevant lookup table using the rotor speed and the measured RMS voltage of the AC supply 4. After updating the advance period and the overrun offset value, the controller 16 clears the zero-cross flag, and starts a zero-cross timer.

After polling the zero-cross flag, and if necessary updating the advance period and the overrun offset value, the controller 16 calculates the commutation period, T_COM, by subtracting the advance period, T_ADV, from the Hall period, T_HALL. The controller 16 then loads the commutation period, T_COM, into a timer. After determining the commutation period, the controller 16 indexes the overrun sine lookup table using the time stored by the zero-cross timer, t, to select an overrun sine value, T_OVR_SINE. The controller 16 then sums the overrun offset value, T_OVR_OFFSET, and the overrun sine value, T_OVR_SINE, to obtain the overrun period, T_OVR.

After determining the commutation and overrun periods, the controller 16 performs one of the three steps used to sample the DC_SMOOTH and TEMP signals. If the predetermined number of samples has been collected, the controller 16 determines the average of the samples to obtain a measure of the RMS voltage of the AC supply 4 or the temperature within the motor system 1. If the RMS voltage is less than V_MIN or greater than V_MAX, or if the temperature is less than T_MIN or greater than T_MAX, the controller 16 writes a corresponding error to the memory device 18 and enters Fault Mode.

The controller 16 subsequently commutates the phase winding 7 (i.e. by reversing DIR1 and DIR2, and by setting FREEWHEEL#) after the timer has counted for the commutation period, T_COM. As a result, the controller 16 commutates the phase winding 7 in advance of the next edge of the HALL signal by the advance period, T_ADV. Following commutation, the controller 16 excites the phase winding 7 until an overcurrent event occurs. In response to the overcurrent event, the controller 16 continues to excite the phase winding 7 for the overrun period, T_OVR. After the overrun period has elapsed, the controller 16 freewheels the phase winding 7 (i.e. by clearing FREEWHEEL#). Freewheeling then continues indefinitely until such time as the controller 16 next commutates the phase winding 7. The controller 16 therefore commutates the phase winding 7 in advance of each edge of the HALL signal, updates the overrun period in response to each edge of the HALL signal, and updates the advance period and the overrun offset value in response to each edge of the Z_CROSS signal.

When operating in Running Mode, the magnitude of back EMF induced in the phase winding 7 by the rotor 5 is of sufficient magnitude that current in the phase winding 7 is unlikely to rise to an excessive level, even in the absence of an overcurrent event. As a result, no timeout period is employed by the controller 16 when operating in Running Mode. This then reduces the number of instructions executed by the controller 16.

The controller 16 drives the motor 2 over an operating speed range bounded by SPEED_MIN and SPEED_MAX, the speed varying in response to changes in load. Within this speed range, the controller 16 selects control values that ensure that constant average power is achieved between SPEED_CP_MIN and SPEED_CP_MAX. Consequently, constant average power is achieved for different loading. The controller 16 also drives the motor 2 over a voltage range bounded by V_MIN and V_MAX. Within this voltage range, the controller 16 selects control values that ensure that constant average power is achieved between V_CP_MIN and V_CP_MAX. Consequently, the same power and performance is achieved irrespective of variances in the voltage of the AC supply 4.

Fault Mode

The controller 16 enters Fault Mode in response to an error, with the intention of preventing or limiting damage to the motor system 1. The controller 16 therefore disables the motor 2 by clearing DIR1 and DIR2 on entering Fault Mode. The controller 16 may require that power to the motor system 1 be turned off before the motor system 1 can be reused. Alternatively, the controller 16 may prevent any further use of the motor system 1; this may depend on the type of fault that has occurred.

Benefits

For a conventional permanent-magnet motor that is driven by an AC supply, the back EMF induced in the phase winding makes it difficult to accurately control the amount of current drawn from the AC supply. As a result, the waveform of current drawn from the AC supply will typically have a high harmonic content, resulting in a poor power factor. In order to address this problem, conventional permanent-magnet motors generally include an active power factor correction (PFC) circuit. The active PFC circuit outputs a regular DC voltage for use in exciting the phase windings while ensuring that current drawn from the AC supply is substantially sinusoidal. As a result, a relatively high power factor can be achieved. However, the inclusion of an active PFC circuit increases the cost of the motor system. Additionally, the PFC circuit requires a high-capacitance DC link capacitor in order that the DC link voltage sampled by the PFC circuit is stable. Without a stable DC link voltage, the PFC circuit would estimate incorrect current demand levels, resulting in poor current harmonics. However, a high-capacitance DC link capacitor is both physically large and expensive.

With the motor system 1 of the present invention, the controller 16 employs an overcurrent threshold that is directly proportional to the DC link voltage and an overrun period that varies across each half-cycle of the AC supply 4. The net result is that the controller 16 excites the phase winding 7, during each electrical half-cycle of the motor 2, for a conduction period that varies across each half-cycle of the AC supply 4. In particular, the length of the conduction period varies substantially as a half-sinusoid over each half-cycle of the AC supply 4. As a result, the waveform of current drawn from the AC supply 4 approaches that of a sinusoid. A relatively high power factor and low harmonic content are therefore achieved without the need for a PFC circuit or high-capacitance link capacitor.

Figure 13:
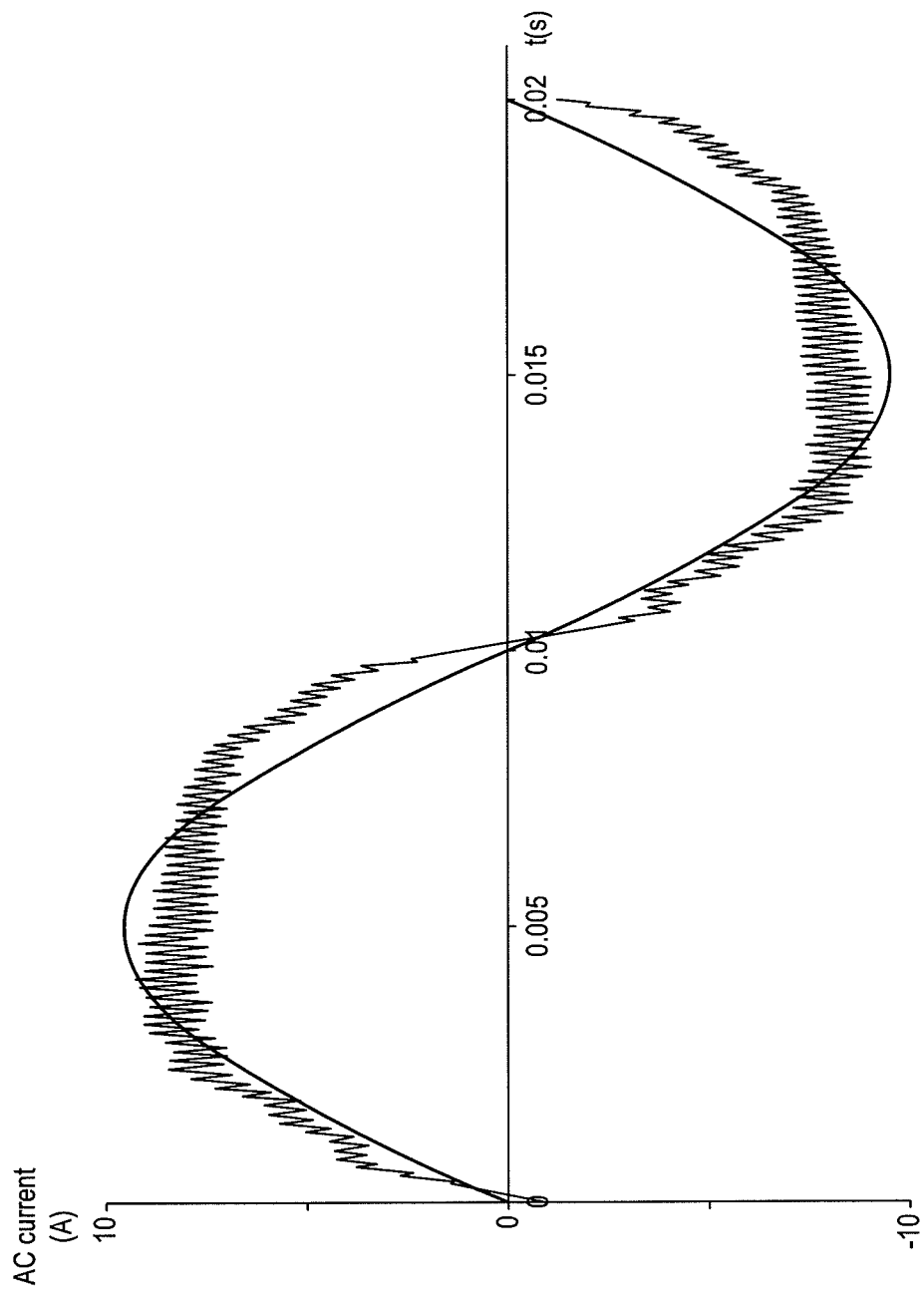
FIG. 13 illustrates the current waveform drawn from the power supply of the motor system when operating in Running Mode.

FIG. 13 illustrates the current waveform that is achievable with the motor system 1 of the present invention. The current waveform is overlaid with a perfect sinusoid for the purposes of comparison. By employing a conduction period that varies across each half-cycle of the AC supply 4, a current waveform may be realized for which the amplitude of low-order harmonics is relatively small. The high-frequency ripple that can be seen in the current waveform of FIG. 13 arises from inverter switching.

A power factor of unity is achieved for a current waveform having no harmonic content. As the harmonic content increases, the power factor decreases. The motor system 1 of the present invention is therefore able to achieve a relatively high power factor. Indeed, with the motor system 1 of the present invention, a power factor of at least 0.95 is achievable. As a result, the motor system 1 is able to achieve a relatively high average input power for a given peak current. In contrast, a motor system having relatively large low-order harmonics will suffer from a poor power factor. As a result, a lower average input power is achieved for the same peak current. In order to remedy this, the level of peak current might be increased. However, as the peak current increases, the efficiency of the system decreases due to increased power losses. Additionally, excessive peak currents may damage the switches of the inverter and/or demagnetize the rotor.

Many countries have regulations that impose strict limits on the magnitude of the current harmonics that may be drawn from the mains power supply, e.g. IEC61000-3-2. By employing suitable values for the advance period, the overrun offset, and the overrun amplitude, the motor system 1 is able to comply with the harmonic standards across the full operating speed and voltage ranges of the motor system 1. Indeed, the current waveform of FIG. 13, while not perfectly sinusoidal, complies with harmonic standards set out in IEC61000-3-2.

In contrast to conventional motor systems, the motor system 1 of the present invention achieves a current waveform having relatively small low-order harmonics without the need for an active PFC circuit or a high-capacitance link capacitor. The link capacitor C1 of the control system 3 is employed only to smooth the relatively high-frequency ripple that results from inverter switching. The link capacitor C1 is not required to smooth the DC link voltage at the fundamental frequency. As such, a link capacitor may be used that results in ripple in the DC link voltage of 50% or more at the fundamental frequency, i.e. $Vr=(Vmax-Vmin)/Vmax \geq 0.5$. The controller 16 nevertheless ensures that, even at this level of ripple, low-order harmonics are kept relatively small and thus a good power factor can be achieved at relatively high average input power. Indeed, the current waveform of FIG. 13 is achieved with a voltage ripple of 100%. Since the link capacitor C1 is required only to filter high-frequency switching ripple, a relatively low capacitance link capacitor may be used, thus significantly reducing the cost and size of the motor system 1.

Owing to the relatively high power factor that is achievable with the motor system 1, a relatively high average input power can be achieved in spite of the ripple in the DC link voltage. The achievable average input power will naturally depend on the RMS voltage of the AC supply 4. However, for an RMS voltage of 100 V, a constant average input power in excess of 1000 W is achievable irrespective of ripple in the DC link voltage. Consequently, when used with a mains power supply, the motor system 1 is able to achieve a constant average input power of at least 1000 W.

By selecting appropriate values for the advance period, T_ADV, the overrun offset, T_OVR_OFFSET, and the overrun amplitude, T_OVR_AMP, a desired average input or output power may be achieved for the motor system 1. Moreover, appropriate values may be selected such that the efficiency of the motor system 1 at each operating point (i.e. speed and voltage) is optimized for the desired input or output power. That is to say that various sets of values for T_ADV, T_OVR_OFFSET, and T_OVR_AMP may result in the same desired average input or output power. However, from these various sets of values, a single set may be selected that provides the best efficiency.

One or more of the advance period, the overrun offset, and the overrun amplitude may be adjusted in response to changes in rotor speed and/or RMS voltage of the AC supply 4 such that a particular profile for the average input or output power is achieved over a speed range and/or voltage range. In particular, by adjusting at least the advance period and the overrun offset in response to changes in rotor speed and/or RMS voltage, the same average input or output power may be achieved.

For a single motor system, appropriate values may be selected such that the variance in average power (input or output) does not exceed ±1% over a speed range spanning at least 10 krpm and/or a voltage range spanning at least 10 V. However, if the same values are used in a plurality of mass-produced motor systems, the variance in average power for each motor system increases owing to component and manufacturing tolerances. Nevertheless, appropriate values may be selected such that the variance in average power does not exceed ±5% for a mass-produced motor system over the aforementioned speed and voltage ranges. Constant average power (i.e. within ±5%) may also be achieved at relatively high speeds. In particular, constant average power may be achieved over a speed range having a minimum greater than 60 kpm and a maximum greater than 80 krpm. Indeed, constant average power may be achieved at speeds in excess of 100 krpm. In addition to achieving constant average power over a speed and/or voltage range, appropriate values may be selected such that an efficiency of at least 80% is maintained over the speed and/or voltage range.

The present invention therefore provides a high-power motor system 1 that is able to comply with existing harmonic standards without the need for an active PFC circuit or high-capacitance link capacitor. Moreover, the motor system 1 is able to achieve a relatively high efficiency (i.e. at least 80%) as well as constant average power (i.e. within ±5%) over a range of rotor speeds and RMS voltages.

Event Clashing

The controller 16 executes different software routines in response to different events. For example, the controller 16 executes a particular routine in response to an edge of the HALL signal. The controller 16 executes a different routine in response to an overcurrent event, and so on.

A relatively simple microcontroller typically includes a single-threaded processor. Consequently, when the processor executes a routine in response to a particular event, the processor is unable to respond to other events until such time as it has finished executing the routine. Accordingly, when two events clash, the execution of one of the event routines will be delayed.

When operating at relatively low rotor speeds, any delay to the execution of a particular routine will be relatively small in comparison to the overall Hall period. Consequently, the delay is unlikely to adversely affect the performance of the motor system 1. Moreover, the time spent at speeds below SPEED_SINGLE is expected to be relatively short, and thus any effect that event clashing may have on the performance of the motor system 1 is not regarded as critical at these speeds. However, at speeds at or above SPEED_SINGLE, any delay in the execution of a routine may adversely affect the performance of the motor system 1. In particular, the delay may affect one or more of the input power, output power, efficiency and current harmonics.

For example, when operating in single-switch mode, the controller 16 calculates the commutation period, T_COM, and the overrun period, T_OVR, in response to each edge of the HALL signal. If during this time, an overcurrent event occurs, the overcurrent routine will not be executed until such time as the controller 16 has finished executing the Hall routine. As a result, more current than ideally desired would be driven into the phase winding 7. Alternatively, if an edge of the HALL signal were to occur while the controller 16 is executing the overcurrent routine, the execution of the Hall routine would be delayed. Since the Hall routine is used to calculate the time at which the phase winding 7 is commutated, any delay in the execution of the Hall routine will have the effect of reducing the advance period. In each of these examples, the clash is likely to occur around the zero-crossing in the voltage of the AC supply 4, owing to the small overcurrent threshold. Consequently, in spite of the fact that the amount of current driven into the phase winding 7 is not well controlled, the net effect on power and efficiency is unlikely to be significant. However, the net effect on current harmonics is likely to be significant.

Various measures may be taken in order to minimize the risk of event clashing. In particular, the risk of clashing may be reduced by simplifying the instructions of each routine such that the time required to execute each routine is kept relatively short. It is for this reason that the controller 16 uses lookup tables that store control values in the form of time periods. By using lookup tables that store time periods, the mathematical calculations performed by the controller 16 may be kept relatively simple. In particular, the mathematical calculations can be limited to simple addition (e.g. when calculating the overrun period) and subtraction (e.g. when calculating the commutation period). Nevertheless, in spite of these measures, event clashing may occur with a relatively simple processor at relatively high speeds.

Event clashing may be resolved by having a faster or multi-core processor. However, both options increase the cost of the controller 16. Accordingly, two alternative schemes for driving the motor 2 in single-switch mode will now be described. Both schemes reduce the number of events that occur during each electrical half-cycle of the motor 2 and thus reduce the possibility of event clashing. Before describing the two alternative schemes, consideration will first be made of the events that occur during each electrical half-cycle of the motor 2 for the above-described scheme. For the purposes of clarity, the control scheme described above for single-switch mode shall hereafter be referred to as 'overcurrent single-switch mode'. The two alternative control schemes for single-switch mode will be referred to as 'unlimited-freewheel single-switch mode' and 'limited-freewheel single-switch mode'.

Overcurrent Single-Switch Mode

A common method of event handling is through the use of interrupts. In response to an interrupt, the controller 16 interrupts execution of the main code and services the interrupt by executing an interrupt service routine (ISR).

Figure 14:
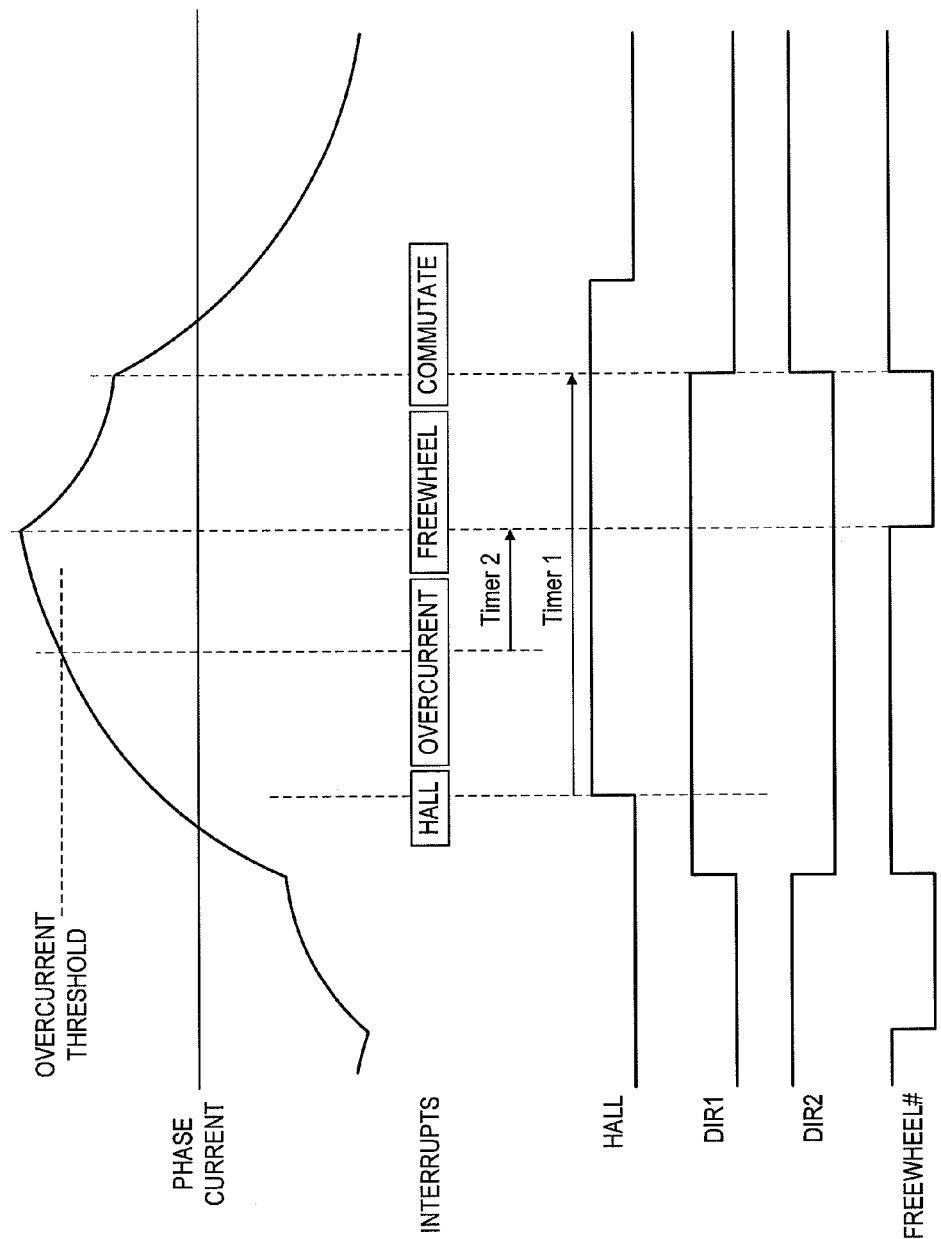
FIG. 14 illustrates various waveforms and interrupts of the motor system when operating in overcurrent single-switch mode.

When operating in overcurrent single-switch mode, the controller 16 employs the following four interrupts: Hall, overcurrent, freewheel and commutate. FIG. 14 illustrates the waveforms of the HALL signal, the control signals and the phase current, as well as the interrupts employed by the controller 16, when operating in overcurrent single-switch mode.

The Hall interrupt is generated in response to an edge of the HALL signal. In servicing the Hall interrupt, the controller 16 first polls the zero-cross flag that is set in response to an edge of the Z_CROSS signal. If the zero-cross flag is set, the controller 16 updates the advance period and the overrun offset value, and clears the zero-cross flag. The Z_CROSS signal is thus used to set a flag rather than generate an interrupt. This then minimizes the total number of interrupts and thus the possibility of interrupt clashing. After polling the zero-cross flag, the controller 16 calculates the commutation period, T_COM, and the overrun period, T_OVR. The controller 16 then loads the commutation period into a first timer, Timer 1. Finally, the controller 16 performs one of the three steps used to sample the DC_SMOOTH and TEMP signals.

The overcurrent interrupt is generated in response to a logically low overcurrent signal output by the current regulator 22. In servicing the overcurrent interrupt, the controller 16 loads the overrun period, T_OVR, into a second timer, Timer2.

The freewheel interrupt is generated by the second timer when the overrun period has elapsed. In servicing the freewheel interrupt, the controller 16 freewheels the phase winding 7.

The commutate interrupt is generated by the first timer when the commutation period has elapsed. In servicing the commutate interrupt, the controller 16 commutates the phase winding 7.

Since the overcurrent ISR is responsible for loading the second timer with the overrun period, it is not possible for the overcurrent and freewheel interrupts to clash. Furthermore, by ensuring that the advance period is longer than the time required to execute the commutate ISR, clashing of the Hall and commutate interrupts can be avoided. Nevertheless, four possible interrupt clashes are still possible, namely Hall and overcurrent, Hall and freewheel, commutate and overcurrent, and commutate and freewheel.

Unlimited-Freewheel Single-Switch Mode

When operating in unlimited-freewheel single-switch mode, the overcurrent interrupt is disabled, i.e. the controller 16 ignores the overcurrent signal output by the current regulator 22. In response to an edge of the HALL signal, the controller 16 calculates a conduction period, T_CD, in addition to the commutation period, T_COM. The controller 16 commutates the phase winding 7 at a time, T_COM, after the edge of the HALL signal. Following commutation, the controller 16 excites the phase winding 7 for the conduction period, T_CD, after which the controller 16 freewheels the phase winding 7.

The conduction period resembles the overrun period employed in overcurrent single-switch mode. In particular, the conduction period comprises an offset value and a sine value. However, unlike the overrun period, the waveform of the conduction period includes a phase shift relative to the voltage cycle of the AC supply 4.

In overcurrent single-switch mode, the controller 16 initially excites the phase winding 7 until current in the phase winding 7 reaches an overcurrent threshold. Thereafter, the controller 16 excites the phase winding 7 for the overrun period, T_OVR. The total conduction period over which the phase winding 7 is excited is therefore the sum of the initial excitation period and the overrun period. Current in the phase winding 7 is sensed by monitoring the voltage across each of the shunt resistors R1,R2. More specifically, the voltage across each shunt resistors R1,R2 is output to the controller 16 as a current sense signal, I_SENSE_1 and I_SENSE_2. As illustrated in FIG. 2, each current sense signal is filtered by an RC filter R8,C3 and R9,C4, which acts to remove high-frequency noise. The time constant of the RC filter introduces a time delay between the measured current and the actual current in the phase winding 7. The net result is that the waveform of the conduction period is phase-shifted relative to the cycle of the AC supply 4. This phase shift helps reduce the magnitude of low-order current harmonics.

In unlimited freewheel single-switch mode, the overcurrent interrupt is disabled. The RC filters R8,C3 and R9,C4 do not therefore influence the waveform of the conduction period. Accordingly, in order to replicate the phase shift that exists in overcurrent single-switch mode, the waveform of the conduction period includes a phase shift relative to the cycle of the AC supply 4. The conduction period, T_CD, is therefore defined by the equation:

$$T\_CD = T\_CD\_OFFSET + T\_CD\_AMP * abs\{\sin(\theta + A\_CD\_PHASE)\}$$

where T_CD_OFFSET is an offset value and $T\_CD\_AMP * abs\{\sin(\theta + A\_CD\_PHASE)\}$ is a rectified sine wave having an amplitude defined by T_CD_AMP. θ is the angle in the voltage cycle of the AC supply 4 and A_CD_PHASE is a phase angle.

Both the angle θ and the conduction phase angle, A_CD_PHASE, may be expressed as time intervals:

$$\theta \text{ (deg)} = t \text{ (sec)} * f \text{(Hz)} * 360 \text{ (deg)}$$

$$A\_CD\_PHASE \text{ (deg)} = T\_CD\_PHASE \text{ (sec)} * f \text{(Hz)} * 360 \text{ (deg)}$$

Consequently, the conduction period may be defined as:

$$T\_CD = T\_CD\_OFFSET + T\_CD\_AMP * abs\{\sin(\{t + T\_CD\_PHASE\} * f * 360 \text{ deg})\}$$

More simply, the conduction period, T_CD, may be regarded as:

$$T\_CD = T\_CD\_OFFSET + T\_CD\_SINE$$

where T_CD_OFFSET is a conduction offset value that is independent of time, and T_CD_SINE is a conduction sine value that is dependent on time.

T_CD_SINE is stored by the controller 16 as a conduction sine lookup table, which comprises a conduction sine value, T_CD_SINE, for each of a plurality of times.

In overcurrent single-switch mode, the controller 16 adjusts the advance period and the overrun offset value in response to changes in rotor speed and voltage of the AC supply 4 so as to maintain constant average power. Likewise, in unlimited freewheel single-switch mode, the controller 16 adjusts the advance period, T_ADV, and the conduction offset value, T_CD_OFFSET, in response to changes in rotor speed and voltage in order to maintain constant average power. The controller 16 therefore stores an advance lookup table and a conduction offset lookup table, each of which is indexed by rotor speed and voltage:

$$T\_ADV = T\_ADV\_TABLE[\text{speed,voltage}]$$

$$T\_CD\_OFFSET = T\_CD\_OFFSET\_TABLE[\text{speed, voltage}]$$

In overcurrent single-switch mode, the controller 16 initially excites the phase winding 7 until current in the phase winding 7 reaches an overcurrent threshold. The overcurrent threshold is proportional to the DC link voltage, and thus the length of this initial excitation period is sensitive to changes in the voltage of the AC supply 4. The length of the initial excitation period is also sensitive to changes in the magnitude of the back EMF induced the phase winding 7 by the rotor 5. Consequently, the initial excitation period is sensitive to changes in both the rotor speed and the voltage of the AC supply 4. Owing to the RC filter that operates on each of the current sense signals, this initial excitation period introduces a phase delay in the waveform of the conduction period, which helps reduce the magnitude of low-order current harmonics. In unlimited-freewheel single-switch mode, the phase delay is replicated by phase shifting the waveform of the conduction period relative to the voltage waveform of the AC supply 4. Since the phase delay is sensitive to changes in the rotor speed and the voltage of the AC supply 4, the controller 16 adjusts the phase of the conduction period waveform in response to changes in rotor speed and voltage. The controller 16 therefore comprises a conduction phase-shift lookup table that stores a phase-shift value, T_CD_

PHASE_SHIFT, for each of a plurality of rotor speeds and a plurality of voltages. The conduction period may thus be defined as:

$$T\_CD = T\_CD\_OFFSET\_TABLE[speed,voltage] + T\_CD\_SINE\_TABLE[t+T\_CD\_PHASE\_SHIFT[speed,voltage]]$$

The advance period, T_ADV, the conduction offset value, TCD_OFFSET, and the conduction phase-shift value, T_CD_PHASE_SHIFT, are each updated in response to edges of the Z_CROSS signal. The values are thus updated only when the voltage of the AC supply 4 crosses zero and remain constant over each half-cycle of the AC supply 4.

In response to an edge of the HALL signal, the controller 16 determines the period of time, t, that has elapsed since the last edge of the Z_CROSS signal. The controller 16 then indexes the conduction sine lookup table using the sum of the elapsed time, t, and the conduction phase shift value, T_CD_PHASE_SHIFT, in order to select a conduction sine value, T_CD_SINE. The controller 16 then sums the conduction offset value, T_CD_OFFSET, and the conduction sine value, T_CD_SINE, to obtain the conduction period, T_CD.

Figure 15:
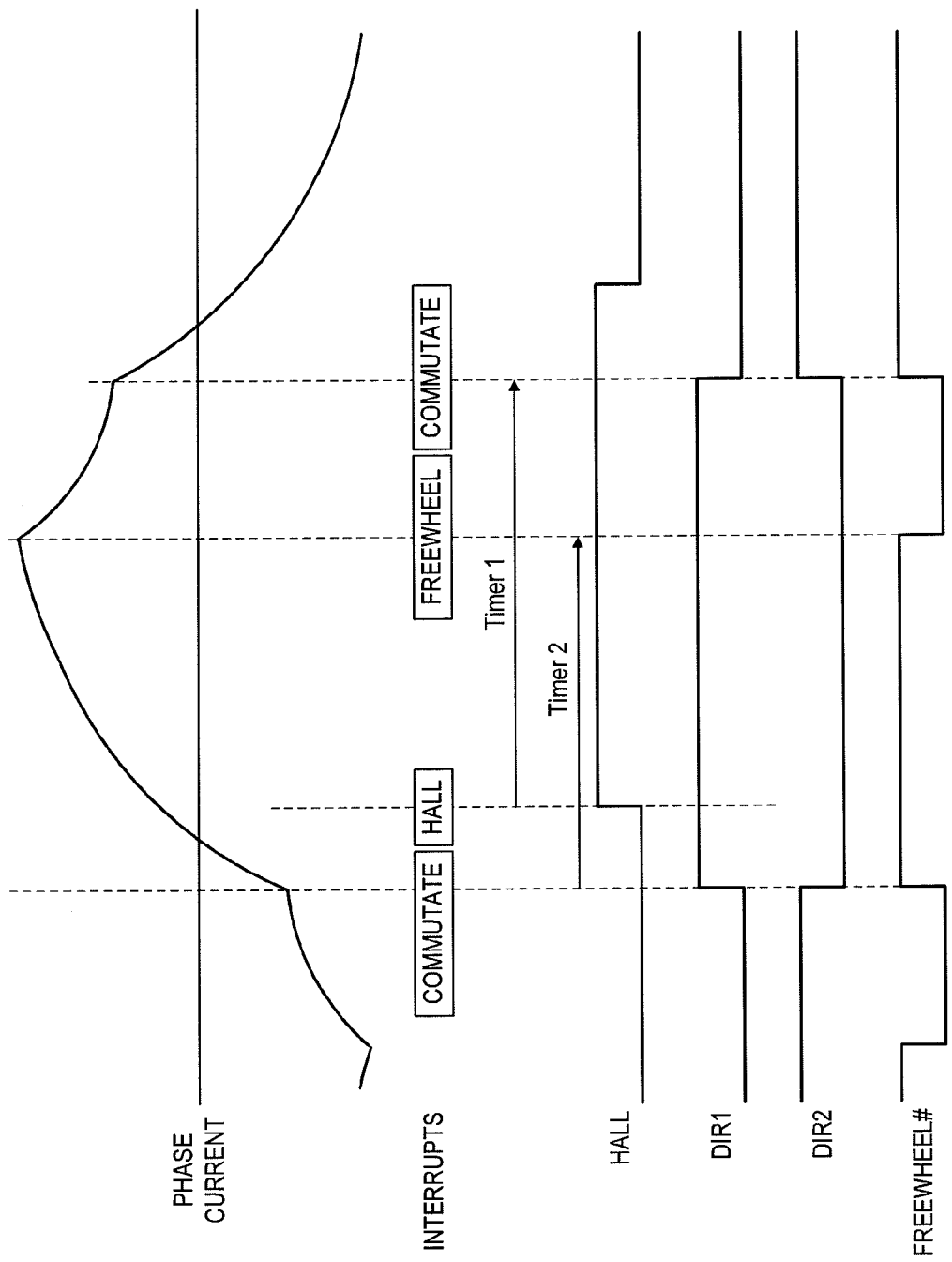
FIG. 15 illustrates various waveforms and interrupts of the motor system when operating in unlimited-freewheel single-switch mode.

The controller 16 employs three interrupts when operating in unlimited-freewheel single-switch mode: Hall, freewheel and commutate. FIG. 15 illustrates the waveforms of the HALL signal, the control signals and the phase current, as well as the interrupts employed by the controller 16, when operating in unlimited-freewheel single switch mode.

The Hall interrupt is generated in response to an edge of the HALL signal. In servicing the Hall interrupt, the controller 16 polls the zero-cross flag that is set in response to an edge of the Z_CROSS signal. If the zero-cross flag is set, the controller 16 updates the advance period, the conduction offset value and the conduction phase-shift value, and clears the zero-cross flag. After polling the zero-cross flag, the controller 16 calculates the commutation period, T_COM, and the conduction period, T_CD. The controller 16 then loads the commutation period into a first timer, Timer1. Finally, the controller 16 performs one of the three steps used to sample the DC_SMOOTH and TEMP signals.

The commutate interrupt is generated by the first timer when the commutation period has elapsed. In servicing the commutate interrupt, the controller 16 commutates the phase winding 7 and loads the conduction period into a second timer, Timer2.

The freewheel interrupt is generated by the second timer when the conduction period has elapsed. In servicing the freewheel interrupt, the controller 16 freewheels the phase winding 7.

In comparison to overcurrent single-switch mode, the controller 16 employs one less interrupt. Moreover, since the commutate ISR is responsible for loading the second timer with the conduction period, it is not possible for the commutation and freewheel interrupts to clash. Consequently, the risk of interrupt clashing is significantly reduced.

By ensuring that the advance period is greater than the time required to service the commutate interrupt (T_COM_ISR) and smaller than the Hall period minus the time required to service the Hall interrupt (T_HALL_ISR), clashing of the Hall and commutate interrupts can be avoided, i.e.

$$T\_COM\_ISR < T\_ADV < T\_HALL - T\_HALL\_ISR$$

Nevertheless, it is still possible for the freewheel interrupt to clash with the Hall interrupt. However, as will now be described, the controller 16 may be configured such that freewheeling is started at the end of the conduction period without the need to generate an interrupt.

Microcontrollers having a timer that is able to operate in output compare mode are known. In output compare mode, a comparator compares the counter register of the timer against an output compare register. When the values of the two registers correspond, the comparator generates an interrupt or sets/clears/toggles an output pin of the microcontroller. The particular action undertaken by the comparator is typically set by means of a register bit.

Figure 16:
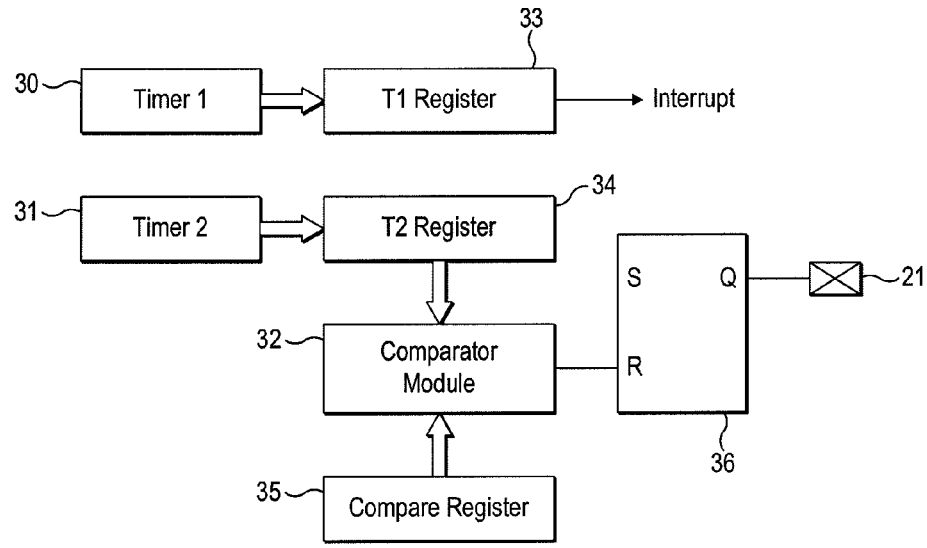
FIG. 16 is a schematic diagram of a timer and comparator module arranged to generate a control signal.

In one embodiment, output compare mode is exploited by the controller 16 to clear the FREEWHEEL# signal without generating an interrupt. As illustrated in FIG. 16, the peripherals 19 of the controller 16 comprise two timers 30,31 and a comparator module 32. The memory device 18 comprises a timer register 33,34 for each of the timers 30,31, and a compare register 35. The first timer 30 is used to time the commutation period, T_COM, and the second timer 31 is used to time the conduction period, T_CD. The second timer 31 is configured to operate in output compare mode. Consequently, when servicing the commutate interrupt generated by the first timer 30, the controller 16 commutates the phase winding 7, loads the conduction period into the compare register 35, and resets the second timer 31. The comparator module 32 then compares the second timer register 34 and the compare register 35. When the two registers 34,35 correspond (which occurs when the conduction period has elapsed), the comparator module 32 resets an SR latch 36, which in turn clears an output pin 21 of the controller 16. This output pin 21 is then used by the controller 16 for the FREEWHEEL# signal.

Accordingly, when the conduction period elapses, FREEWHEEL# is cleared without an interrupt being generated. Since the output pin is latched, FREEWHEEL# continues to cleared until such time as the controller 16 sets the latch 36 when servicing the commutate interrupt.

The controller 16 is therefore able to operate in unlimited freewheel single-switch mode using only two interrupts, namely Hall and commutate. However, as noted above, clashing of the Hall and commutate interrupts may be avoided by ensuring that the advance period is kept within particular limits. Consequently, interrupt clashing may be avoided altogether.

Depending on the type of microcontroller that is used for the controller 16, it may not be possible to use output compare mode to time the conduction period and clear the output pin used for FREEWHEEL#. For example, the microcontroller may not have any timers capable of operating in output compare mode. Alternatively, the microcontroller may have an 8-bit timer and a 16-bit timer, and only the 16-bit timer is capable of operating in output compare mode. However, since the commutation period is typically longer than the conduction period, it may be necessary to use the 16-bit timer for the commutation period. In those instances for which output compare mode is unavailable for clearing FREEWHEEL#, a PWM module may instead be used to clear FREEWHEEL# without recourse to an interrupt, as will now be described.

Figure 17:
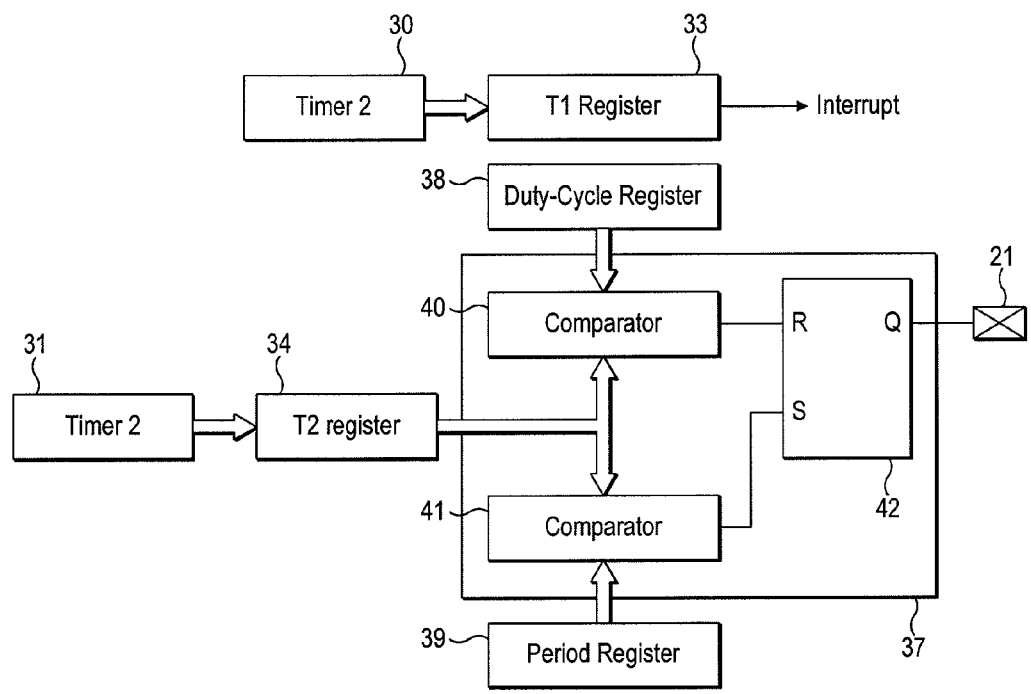
FIG. 17 is a schematic diagram of a timer and PWM module arranged to generate a control signal.

FIG. 17 illustrates an alternative embodiment in which the peripherals 19 of the controller 16 comprise two timers 30,31 and a PWM module 37. The memory device 18 comprises a timer register 33,34 for each of the timers 30,31, a duty-cycle register 38 and a period register 39. The first timer 30 is again used to time the commutation period, T_COM. The second timer 31, however, is used as a clock signal for the PWM module 37. The PWM module 37 comprises a pair of comparators 40,41 and an SR latch 42. A first comparator 40 compares the second timer register 34 and the duty-cycle register 38. When the values of the two registers 34,38 correspond, the first comparator 40 resets the SR latch 42, which in turn clears an output pin 21 of the controller 16. A second comparator 41 compares the second timer register 34 and the period register 39. When the values of these two registers 34,39 correspond, two things happen. First, the second comparator 41 sets the SR latch 42, which in turn sets the output pin 21. Second, the second timer 31 is reset. The output pin 21 of the controller 16 is therefore cleared when the second timer register 34 and the duty-cycle register 38 correspond, and is set when the second timer register 34 and the period register 39 correspond.

The output pin 21 toggled by the PWM module 37 is used by the controller 16 for the FREEWHEEL# signal. When servicing the commutate interrupt, the controller 16 commutates the phase winding 7, loads the conduction period into the duty-cycle register 38, and loads the second timer register 34 with the same value as that of the period register 39. In response, the PWM module 37 sets FREEWHEEL# and the second timer register 34 is reset. The second timer 31 then increments the second timer register 34 until such time as the second timer register 34 and the duty-cycle register 38 correspond. When the two registers 34,38 correspond (which occurs when the conduction period has elapsed), the PWM module 37 clears FREEWHEEL#. The phase winding 7 is therefore freewheeled without the need for an interrupt.

If the period register 39 is set too low, the second timer register 34 and the period register 39 may correspond during the freewheel period. This would then cause the FREEWHEEL# signal to be set prematurely. Accordingly, in order that freewheeling is not terminated prior to commutation, the period register 39 stores a maximum possible value (e.g. an 8-bit period register stores 0xFF).

In each of the above embodiments, a comparator compares the value of the second timer register against a value stored in a compare register. When the second timer register and the compare register correspond, the comparator clears the output pin used for FREEWHEEL#. In the first embodiment the comparator forms part of a comparator module 32, while in the second embodiment the comparator forms part of a PWM module 37. However, any comparator of the controller 16 may be used, so long as the comparator is able to control (either directly or through associated hardware) an output pin of the controller 16 in response to a comparison of a timer register and a compare register.

Limited-Freewheel Single-Switch Mode

As with unlimited-freewheel single-switch mode, the overcurrent interrupt is disabled when operating in limited-freewheel single-switch mode. In response to an edge of the HALL signal, the controller 16 calculates a drive-off period, T_DOFF, in addition to the commutation period, T_COM. The controller 16 then continues to excite the phase winding 7 for the drive-off period, T_DOFF, after which the controller 16 freewheels the phase winding 7. Freewheeling then continues until the controller 16 commutates the phase winding 7.

The drive-off period resembles the conduction period employed in unlimited-freewheel single-switch mode. In particular, the drive-off period, T_DOFF, is defined by the equation:

$$T\_DOFF = T\_DOFF\_OFFSET + T\_DOFF\_AMP * abs\{\sin(\theta + A\_DOFF\_PHASE)\}$$

where T_DOFF_OFFSET is an offset value and T_DOFF_AMP*abs{sin(θ+A_DOFF_PHASE)} is a rectified sine wave having an amplitude defined by T_DOFF_AMP. θ is the angle in the voltage cycle of the AC supply 4 and A_DOFF_PHASE is a phase angle.

Both the angle θ and the drive-off phase angle, A_DOFF_PHASE, may be expressed as time intervals:

$$\theta \text{ (deg)} = t \text{ (sec)} * f \text{ (Hz)} * 360 \text{ (deg)}$$

$$A\_DOFF\_PHASE \text{ (deg)} = T\_DOFF\_PHASE \text{ (sec)} * f \text{ (Hz)} * 360 \text{ (deg)}$$

Consequently, the drive-off period may be defined as:

$$T\_DOFF = T\_DOFF\_OFFSET + T\_DOFFAMP * abs\{\sin(\{t + T\_OVR\_PHASE\} * f * 360 \text{ deg})\}$$

More simply, the drive-off period, T_DOFF, may be regarded as:

$$T\_DOFF = T\_DOFF\_OFFSET + T\_DOFF\_SINE$$

where T_DOFF_OFFSET is a drive-off offset value that is independent of time, and T_DOFF_SINE is an drive-off sine value that is dependent on time.

The drive-off period, T_DOFF, is stored and updated by the controller 16 in the same manner as that described above for the conduction period, T_CD. In particular, the controller 16 stores a drive-off sine lookup table that is indexed by time, and a drive-off offset lookup table and a drive-off phase-shift lookup table that are each indexed by rotor speed and voltage of the AC supply 4. The drive-off period may thus be defined as:

$$T\_DOFF = T\_DOFF\_OFFSET\_TABLE[speed, voltage] + T\_DOFF\_SINE\_TABLE[t + T\_DOFF\_PHASE\_SHIFT[speed, voltage]]$$

The controller 16 employs three interrupts when operating in limited-freewheel single-switch mode: Hall, freewheel and commutate. FIG. 18 illustrates the waveforms of the HALL signal, the control signals and the phase current, as well as the interrupts employed by the controller 16, when operating in limited-freewheel single switch mode.

The Hall interrupt is generated in response to an edge of the HALL signal. In servicing the Hall interrupt, the controller 16 polls the zero-cross flag that is set in response to an edge of the Z_CROSS signal. If the zero-cross flag is set, the controller 16 updates the advance period, the drive-off offset value and the drive-off phase-shift value, and clears the zero-cross flag. After polling the zero-cross flag, the controller 16 calculates the commutation period, T_COM, and the drive-off period, T_DOFF. The controller 16 then loads the commutation period into a first timer, Timer1, and the drive-off period into a second timer, Timer2. Finally, the controller 16 performs one of the three steps used to sample the DC_SMOOTH and TEMP signals.

The freewheel interrupt is generated by the second timer when the drive-off period has elapsed. In servicing the freewheel interrupt, the controller 16 freewheels the phase winding 7.

The commutate interrupt is generated by the first timer when the commutation period has elapsed. In servicing the commutate interrupt, the controller 16 commutates the phase winding 7.

Consequently, as with unlimited-freewheel single-switch mode, the controller 16 employs only three interrupts. This is in contrast to the four interrupts used in overcurrent single-switch mode. Moreover, by ensuring that the advance period is greater than the time required to service the commutate interrupt, clashing of the Hall and commutate interrupts can be avoided.

As described above for unlimited freewheel single-switch mode, the controller 16 may be configured such that freewheeling is started at the end of the drive-off period without the need to generate an interrupt. For example, the second timer may be configured to operate in output compare mode such that the output pin used for FREEWHEEL# is cleared when the drive-off period elapses. Alternatively, the controller 16 may include a PWM module, which is used to toggle the output pin for FREEWHEEL#. For example, when servicing the Hall interrupt, the controller 16 might load the commutation period into the first timer, load the drive-off period into the duty-cycle register, and reset the second timer. When subsequently servicing the commutate interrupt, the controller 16 then commutates the phase winding 7 and loads the counter register of the second timer with the value of the period register.

The controller 16 may therefore be configured to operate in limited freewheel single-switch mode using only two interrupts, namely Hall and commutate. However, as already noted, the clashing of these two interrupts can be avoided by ensuring that the advance period is greater than the time required to service the commutate interrupt. Accordingly, interrupt clashing may be avoided altogether.

In limited-freewheel single-switch mode, the drive-off period is referenced relative to an edge of the HALL signal. As a result, freewheeling of the phase winding 7 cannot commence until after the edge of the HALL signal. In unlimited-freewheel single-switch mode, the conduction period is referenced relative to commutation. Since commutation occurs in advance of the edge of the HALL signal, freewheeling of the phase winding 7 may commence before, on or after the edge of the HALL signal. It is for this reason that the two schemes are referred to as limited-freewheel and unlimited-freewheel.

In comparison to overcurrent single-switch mode, both unlimited-freewheel and limited-freewheel single-switch modes employ a smaller number of interrupts and thus the risk of interrupt clashing is reduced. Indeed, the controller 16 may be configured such that interrupt clashing is avoided altogether. Nevertheless, in spite of the potential for interrupt clashing, overcurrent single-switch mode has the advantage of self-compensating for tolerances and limitations within the motor system 1. For example, the controller 16 employs a zero-cross timer to monitor the time elapsed since a zero-crossing in the AC supply voltage 4. However, the zero-cross timer is started only as part of the Hall routine. There is therefore a variance in the time used to index the sine lookup table. In a further example, there may be a tolerance in the balance of the duty cycle of the HALL signal. Any imbalance in the duty cycle will introduce an error in the Hall period. Tolerances and limitations in the motor system 1 may therefore result in small errors in the timing of certain events (e.g. commutation, freewheeling etc). In overcurrent single-switch mode, the controller 16 initially excites the phase winding 7 until current in the phase winding 7 reaches an overcurrent threshold. The length of this initial excitation period is not timed by the controller 16. As a result, the initial excitation period acts to compensate for certain timing errors. Consequently, a more stable current waveform may be achieved when operating in overcurrent single-switch mode. In addition to self-compensating for tolerances and limitations within the motor system 1, the initial excitation period introduces a phase delay that acts to dampen low-order current harmonics. In limited and unlimited freewheel single-switch modes, this phase delay is replicated through the use of a phase-shift lookup table, which consumes valuable memory resources. A cheaper microcontroller having less memory may therefore be used for the controller 16 when operating in overcurrent single-switch mode. Alternatively, the memory that would otherwise be used for a phase-shift lookup table might be used to improve the resolution of the other lookup tables, e.g. the advance, overrun offset or overrun sine lookup tables.

Conduction Period

In each of the three schemes described above, the controller 16 excites the phase winding 7 for a conduction period, $T\_CD$, over each electrical half-cycle of the motor 2.

In overcurrent single-switch mode, the conduction period, $T\_CD$, may be defined as:

$$T\_CD = T\_OC + T\_OVR$$

where $T\_OC$ is the time taken for current in the phase winding 7 to reach the overcurrent threshold, and $T\_OVR$ is the overrun period. Consequently, the conduction period, $T\_CD$, may be defined as:

$$T\_CD = T\_OC + T\_OVR\_OFFSET + T\_OVR\_SINE$$

The overcurrent threshold is directly proportional to the DC link voltage and thus varies as a rectified sinusoid. Current in the phase winding 7 rises substantially at the same rate irrespective of the level of DC link voltage; the reasons for this behaviour are beyond the scope of this document. Consequently, the time taken for current in the phase winding 7 to reach the overcurrent threshold, $T\_OC$, varies substantially as a half-sinusoid over each half-cycle of the AC supply 4. However, owing to the time constant of the RC filter that acts on each of the current sense signals, the $T\_OC$ waveform is phase-shifted relative to the voltage waveform of the AC supply 4.

The overrun offset, $T\_OVR\_OFFSET$, is constant while the overrun sine value, $T\_OVR\_SINE$, varies as a half-sinusoid over each half-cycle of the AC supply 4. Additionally, the waveform of the overrun sine value is in phase with the voltage waveform of the AC supply 4.

Since the overrun offset is constant over each half-cycle of the AC supply 4, the variation in the conduction period is defined by the sum of two half-sine components, $T\_OC$ and $T\_OVR\_SINE$. The phase difference between the two components, which arises from the RC filter, is relatively small. Additionally, the amplitude of $T\_OC$ is greater than that of $T\_OVR\_SINE$. Consequently, in spite of the phase difference, the sum of the two components resembles a rectified sinusoid having a phase shift relative to the voltage waveform of the AC supply 4.

The length of the conduction period, $T\_CD$, therefore varies as a periodic waveform. The waveform may be defined as the sum of two components: a first component ($T\_OVR\_OFFSET$) that is constant over each cycle of the waveform and a second component that varies ($T\_OC + T\_OVR\_SINE$) over each cycle of the waveform. Each cycle of the waveform repeats with each half-cycle of the AC supply 4. However, the waveform of the conduction period is phase-shifted relative to the voltage waveform of the AC supply 4.

In unlimited-freewheel single-switch mode, the conduction period, $T\_CD$, is defined by:

$$T\_CD = T\_CD\_OFFSET + T\_CD\_SINE$$

The conduction offset value, $T\_CD\_OFFSET$, is constant while the conduction sine value, $T\_CD\_SINE$, varies as a half-sinusoid over each half-cycle of the AC supply 4. Moreover, the waveform of the conduction sine value is phase-shifted relative to the voltage waveform of the AC supply 4. Indeed, the phase shift is intended to replicate the phase shift that arises from the RC filter in overcurrent single-switch mode.

Consequently, as in overcurrent single-switch mode, the length of the conduction period varies as a periodic waveform. The waveform may again be defined as the sum of two components: a first component ($T\_CD\_OFFSET$) that is constant over each cycle of the waveform and a second component (T_CD_SINE) that varies over each cycle of the waveform. Each cycle of the waveform repeats with each half-cycle of the AC supply 4, and the waveform is phase-shifted relative to the voltage waveform of the AC supply 4.

In limited-freewheel single-switch mode, the conduction period, T_CD, may be defined as:

$$T\_CD = T\_ADV + T\_DOFF$$

where T_ADV is the advance period and T_DOFF is the drive-off period. Consequently, the conduction period, T_CD, may be defined as:

$$T\_CD = T\_ADV + T\_DOFF\_OFFSET + T\_DOFF\_SINE$$

The advance period, T_ADV, and the drive-off offset, T_DOFF_OFFSET, are constant while the drive-off sine value, T_DOFF_SINE, varies as a half-sinusoid over each half-cycle of the AC supply 4. Again, in order to reflect the phase shift that arises from the RC filter in overcurrent single-switch mode, the waveform of the drive-off sine value is phase-shifted relative to the voltage waveform of the AC supply 4.

Consequently, as with the other two single-switch modes, the length of the conduction period varies as a periodic waveform. The waveform may be defined by the sum of two components: a first component (T_ADV+A_DOFF_OFFSET) that is constant over each cycle of the waveform and a second component (T_DOFF_SINE) that varies over each cycle of the waveform. Again, each cycle of the waveform repeats with each half-cycle of the AC supply 4, and the waveform of the conduction period is phase-shifted relative to the voltage waveform of the AC supply 4.

In each of the three schemes, the length of the conduction period is defined by a periodic waveform that repeats with each half-cycle of the AC supply 4. More particularly, the waveform varies substantially as a half-sinusoid over each cycle of the waveform. Consequently, the benefits described above in connection with overcurrent single-switch mode apply equally to unlimited and limited single-switch modes.

In each scheme the waveform of the conduction period is adjusted in response to changes in the speed of the rotor 5 and/or the RMS voltage of the AC supply 4 so as to achieve a particular performance. For example, the offset of the waveform is adjusted primarily so that constant average power (or a particular profile for average power) is achieved over a range of speeds and/or voltages. The phase of the waveform is adjusted primarily so that the magnitude of low-order harmonics in the current waveform are kept below predetermined thresholds. The length of the conduction period may be expressed as the sum of two components: a first component that is constant over each cycle of the waveform and a second component that varies over each cycle of the waveform. In response to changes in rotor speed and/or RMS voltage, the first component is adjusted so as to maintain constant average power and the second component is adjusted so as to maintain relatively small low-order harmonics.

Although three different schemes for single-switch mode have been described, the controller 16 is not necessarily limited to just one of these schemes when operating in single-switch mode. Instead, the controller 16 may use one or more of the three schemes when operating in single-switch mode. For example, the controller 16 may initially employ overcurrent single-switch mode when the rotor speed reaches SPEED_SINGLE. As already noted, overcurrent single-switch mode has the benefit of providing a degree of self-compensation. However, as the rotor 5 accelerates, the Hall period shortens and thus the risk of interrupt clashing increases. Consequently, when the rotor speed reaches a predetermined threshold, the controller 16 may switch from overcurrent single-switch mode to unlimited-freewheel single-switch mode.

For each of the three single-switch schemes, values for the advance period, the offset, the amplitude and the phase shift are obtained from simulation. The simulation refines the various values for each operating point (e.g. speed and voltage) so as to obtain the best performance (e.g. best efficiency and/or low-order harmonics) at the desired average input or output power.

Specific Example

Figure 21:
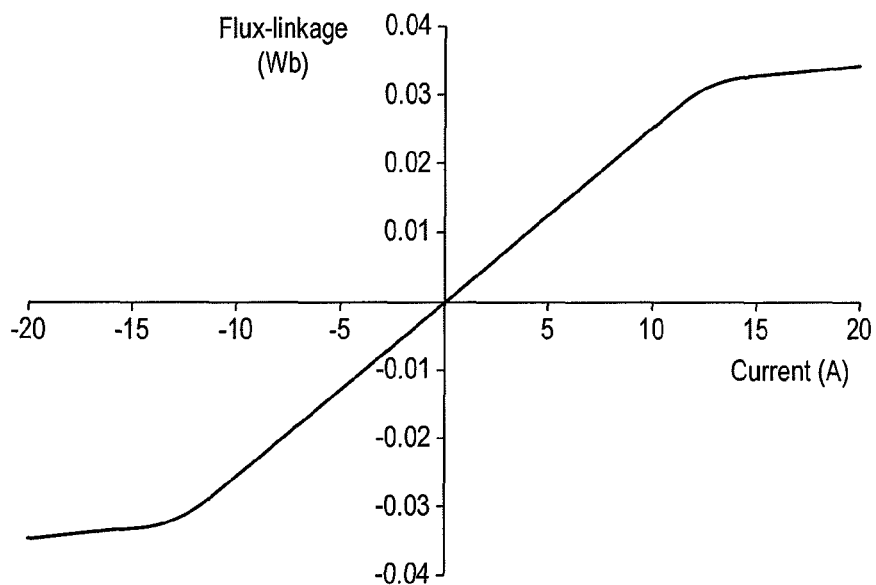
FIG. 21 illustrates the flux-linkage characteristics of a link inductor of the particular motor system.
Figure 22:
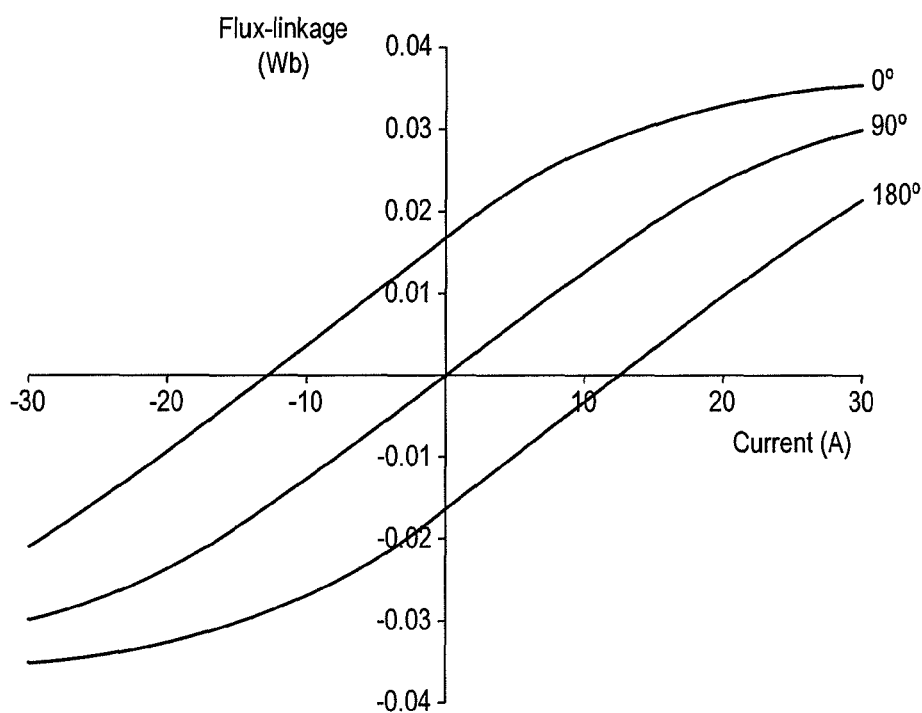
FIG. 22 illustrates the flux-linkage characteristics of the motor of the particular motor system.

A particular embodiment of the motor system 1 will now be described by way of example only. Values for various hardware components of the motor system 1 are detailed in FIG. 19, while FIG. 20 lists various constants and thresholds employed by the controller 16. FIGS. 21 and 22 detail the flux-linkage characteristics of the link inductor L1 and the motor 2.

As illustrated in FIG. 23, the motor system 1 has seven modes of operation: Fault, Initialization, Stationary, Low-Speed Acceleration, Mid-Speed Acceleration, High-Speed Acceleration, and Running. Accordingly, in comparison to that previously described and illustrated in FIG. 8, the motor system 1 has one additional mode of operation.

Fault, Initialization, Stationary and Low-Speed Acceleration Modes are unchanged from that previously described. Mid-Speed Acceleration Mode corresponds to the previously-described High-Speed Acceleration Mode. Consequently, when operating in Mid-Speed Acceleration Mode, the controller 16 drives the motor 2 in advanced commutation, multi-switch mode.

When operating in High-Speed Acceleration Mode, the controller 16 drives the motor 2 in advanced commutation, overcurrent single-switch mode. The length of time spent by the motor system 1 in High-Speed Acceleration Mode is relatively short. Accordingly, in order to conserve memory, the controller 16 does not store an overrun offset lookup table and an overrun sine lookup table. Instead, the controller 16 stores a single overrun lookup table that comprises an overrun period, T_OVR, for each of a plurality of rotor speeds. The controller 16 then updates the overrun period, along with the advance period, in response to edges of the Z_CROSS signal. Consequently, the overrun period employed by the controller 16 is constant over each half-cycle of the AC supply 4. However, the use of a constant overrun period does not adversely affect the performance of the motor system 1 for two reasons. First, the length of time spent in High-Speed Acceleration mode is relatively short. Second, the controller 16 initially excites the phase winding 7 until current in the phase winding 7 exceeds a threshold that is proportional to the DC link voltage. Consequently, in spite of using a constant overrun period over each half-cycle of the AC supply 4, the current waveform continues to approach that of a sinusoid. The advance period and the overrun period are updated in response to changes in rotor speed only and are not updated in response to changes in the RMS voltage of the AC supply 4. This then reduces the size of the lookup tables, thus freeing more memory for the more important tables used in Running Mode. The controller 16 continues to drive the motor 2 in advanced commutation, overcurrent single-switch mode until such time as the rotor speed reaches SPEED_UFW. On reaching SPEED_UFW, the controller 16 enters Running Mode in response to the next edge of the Z_CROSS signal.

Running Mode corresponds to that previously described but with one exception. Rather than employing overcurrent single-switch mode, the controller 16 instead employs unlimited-freewheel single-switch mode. Consequently, in addition to updating the advance period and the offset value, the controller 16 also updates the phase-shift value in response to each edge of the Z_CROSS signal. Otherwise, the operation of the controller 16 is essentially unchanged from that previously described. In particular, the controller 16 drives the motor 2 over an operating speed range bounded by SPEED_MIN and SPEED_MAX. Within this speed range, the controller 16 selects control values that ensure that constant average power is achieved between SPEED_CP_MIN and SPEED_CP_MAX. The controller 16 also drives the motor 2 over a voltage range bounded by V_MIN and V_MAX. Within this voltage range, the controller 16 selects control values that ensure that constant average power is achieved between V_CP_MIN and V_CP_MAX.

The controller 16 stores three advance lookup tables. The first lookup table is a one-dimensional table that is indexed by rotor speed when operating in multi-switch mode. The second lookup table is a one-dimensional table that is indexed by rotor speed when operating in overcurrent single-switch mode. The third lookup table is a two-dimensional table that is indexed by rotor speed and voltage when operating in unlimited-freewheel single-switch mode.

The freewheel lookup table, the timeout lookup table, and the advance lookup table used in multi-switch mode are stored collectively by the controller 16 as a single multi-switch map. FIG. 24 details the multi-switch map employed by the controller 16. The map stores a freewheel period, T_FW, a timeout period, T_TO, and an advance period, T_ADV, for each of a plurality of speeds. Electrical angles corresponding to the various periods are also listed. However, the angles do not form part of the map stored by the controller 16 and are provided merely to illustrate the behaviour of the angles with rotor speed. For example, it can be seen that a fixed timeout period, T_TO, of 70 μs is used throughout Mid-Speed Acceleration. However, the corresponding timeout angle, A_TO, increases from 8.4 degrees at 10 krpm to 42.0 degrees at 55 krpm.

The advance and overrun lookup tables used in overcurrent single-switch mode are similarly stored as a single map. A portion of the map is detailed in FIG. 25. Again, the corresponding electrical angles are provided for the purposes of illustration.

The advance, conduction offset and conduction phase-shift lookup tables used in unlimited-freewheel single-switch mode are also stored as a single map. That is to say that the same speed and voltage resolution are used for each of the three lookup tables. Consequently, each element of the map stores an advance period, a conduction offset value and a conduction phase-shift value. However, for the purposes of clarity, a portion of each lookup table is illustrated in FIGS. 26-28; the unit for all three lookup tables μs. Rather than storing absolute values, the advance lookup table and the conduction offset lookup table store difference values. The controller 16 then stores a reference advance period of 56.2 us and a reference conduction offset value of 48.8 μs, which correspond to a speed of 94 krpm and an RMS voltage of 230 V.

FIG. 29 details a section of the conduction sine lookup table that is stored and used by the controller 16 in unlimited-freewheel single switch mode. Since the frequency of the AC supply is 50 Hz, the lookup table spans 0 to 0.01 seconds, which corresponds to a half-cycle of the AC supply 4. The resolution of the lookup table is 51.2 usec, and the conduction amplitude, T_CD_AMP, and the conduction phase angle, T_CD_PHASE are respectively 83.2 us and 320 μs. The conduction phase angle, T_CD_PHASE, is effectively a reference phase-shift for a speed of 94 krpm and a voltage of 230 V.

The motor system 1 has an operating speed range of 81 krpm to 106 krpm, and an operating voltage range of 200 V to 260 V. Within these ranges, an average input power of 1600 W 25 W is maintained at speeds between 85 krpm and 106 krpm and at voltages of between 219 V to 256 V. Moreover, an efficiency of around 85% is achieved over the constant-power speed and voltage range.

The controller 16 is a PIC16F690 microcontroller manufactured by Microchip Technology Inc. This is a relatively simple 8-bit microcontroller having a clock speed of 20 MHz, a single ADC, two comparators, three timers, 4096 words of program memory, and 512 bytes of data memory. Yet even with this relatively simple microcontroller, the controller 16 is capable of driving the motor 2 at speeds in excess of 100 krpm, with an average input power of around 1600 W.

Figure 30:
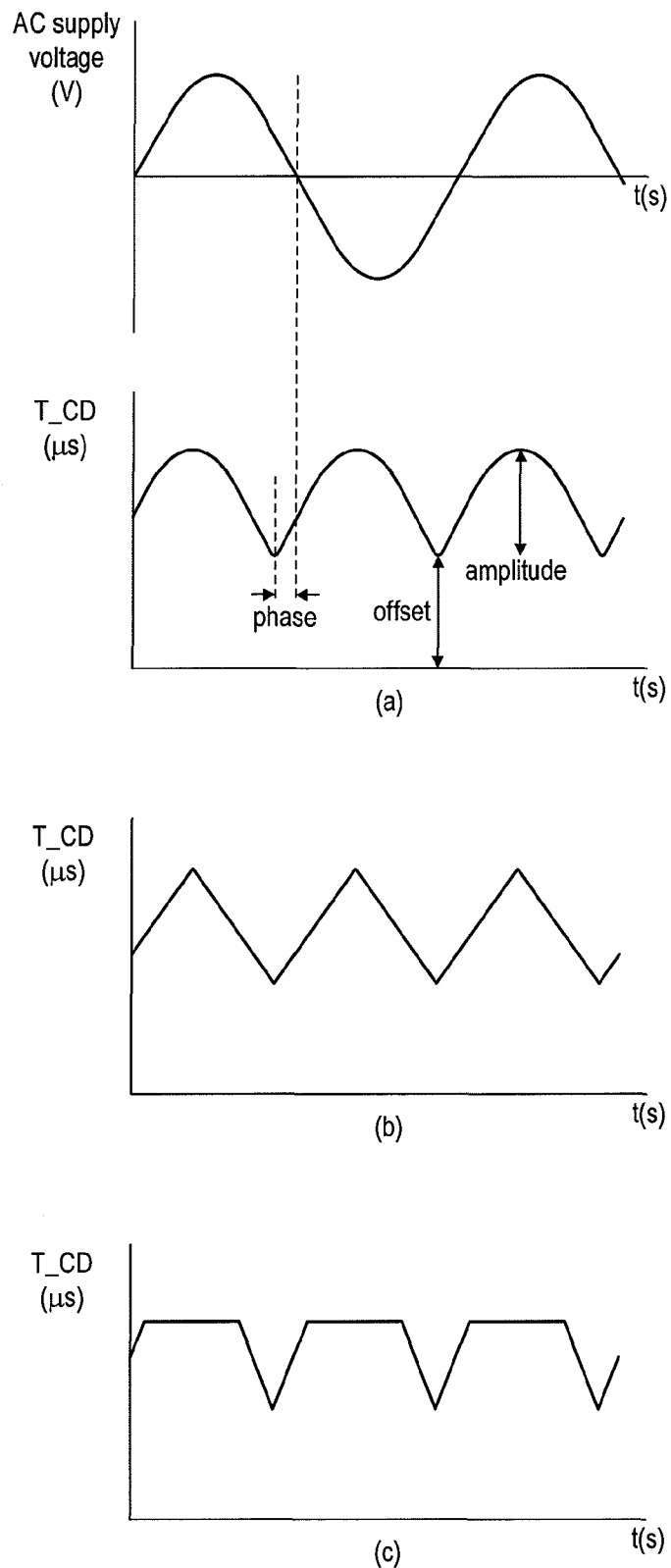
FIG. 30 illustrates possible waveforms for the conduction period used by the controller in single-switch mode.

Reference has thus far been made to a conduction period having a waveform that varies as a half-sinusoid over each cycle of the waveform (and thus over each half-cycle of the AC supply 4). However, other types of periodic waveform may be employed for the conduction period. In particular, waveforms for which the conduction period varies as a triangle or trapezoid over each cycle of the waveform have both been found to work well in obtaining a relatively good power factor. FIG. 30 illustrates the voltage waveform of the AC supply 4 along with the three aforementioned waveforms for the conduction period: (a) half-sinusoid; (b) triangle; and (c) trapezoid. For each of these waveforms, the conduction period increases over the first half of each cycle of the waveform and decreases over the second half of the cycle. Of these three waveforms, the half-sinusoid has thus far been found to give the best results in terms of low-order harmonics. Nevertheless, for a motor system having different characteristics, it is quite possible that improved performance may be obtained using a different waveform.

In the embodiments described above, the advance period is constant over each half-cycle of the AC supply 4. This then simplifies the instructions executed by the controller 16. However, improved performance may be achieved by employing an advance period that varies across each half-cycle of the AC supply 4.

By commutating the phase winding 7 in advance of the edges of the HALL signal, the DC link voltage used to excite the phase winding 7 is boosted by the back EMF. As a result, the direction of current through the phase winding 7 may be more quickly reversed. Additionally, the current in the phase winding 7 may be caused to lead the back EMF, such that more current may be driven into the phase winding 7 during the period of positive torque. As the DC link voltage increases, the time required to reverse the direction of phase current decreases and the rate at which phase current rises increases. Accordingly, a shorter advance period may be employed and any shortfall in the amount of phase current may be made up by increasing the conduction period. Importantly, by decreasing the advance period, the period of negative torque is decreased and thus a more efficient motor system 1 may be realized. The controller 16 may therefore employ an advance period that varies across each half-cycle of the AC supply 4. To this end, the length of the advance period may be defined by a periodic waveform, each cycle of the waveform repeating with each half-cycle of the AC supply 4. The length of the advance period is longer in the region around the zero-crossings in the voltage of the AC supply 4, and is shorter in the region around the peak voltage. Suitable waveforms for the advance period include inverted half-sinusoid, inverted triangle and inverted trapezoid. FIG. 31 illustrates the voltage waveform of the AC supply 4 along with three possible waveforms for the advance period: (a) inverted half-sinusoid; (b) inverted triangle; and (c) inverted trapezoid. The advance period is defined, stored and updated by the controller 16 in much the same manner as that described above for the conduction period. For example, an advance period, T_ADV, that varies as an inverted half-sinusoid may be defined as:

$$T\_ADV = T\_ADV\_OFFSET - T\_ADV\_AMP * abs\{\sin(\{t*f*360 \text{ deg}\})\}$$

The controller 16 then uses the time that had elapsed since a zero-crossing in the voltage of the AC supply 4 to determine an advance period for each electrical half-cycle of the motor 2. The controller 16 may additionally update the waveform of the advance period in response to changes in rotor speed and/or changes in RMS voltage of the AC supply 4. For example, the controller 16 may adjust one or more of the offset, the amplitude and the phase of the waveform in response to changes in rotor speed and/or voltage. Again, as with the conduction period, the advance period may be defined as the sum of two components: a first component that is constant and a second component that varies across each cycle of the advance period waveform. The controller 16 then adjusts one or both components in response to changes in rotor speed and/or RMS voltage.

The parameters (e.g. advance period, conduction offset etc.) employed by the controller 16 are adjusted in response to changes in the RMS voltage of the AC supply 4 only when operating in Running Mode. This then reduces the size of the lookup tables that are used by the controller 16 during acceleration. As a result, more memory is made available for the more important lookup tables used during Running Mode. However, there may be instances for which it is desirable to adjust the one or more parameters during acceleration in response to changes in the RMS voltage of the AC supply 4. For example, without adjusting the control values, the motor system 1 may start with higher power or lower power should the RMS voltage of the AC supply 4 be higher or lower than a nominated voltage. By adjusting the parameters during acceleration, better control over power may be achieved. The controller 16 may therefore store a voltage compensation table for one or more of the parameters used during acceleration, e.g. freewheel period, timeout period, advance period, and overrun period. The voltage compensation table stores a compensation value for each of a plurality of voltages. When updating a particular parameter, the controller 16 indexes the relevant lookup table using the rotor speed to select a control value. Additionally, the controller 16 indexes the relevant voltage compensation table using the RMS voltage of the AC supply 4 to select a compensation value. The controller 16 then sums the control value and the voltage compensation value to obtain the value of the parameter. In this particular example, the voltage compensation table is one dimensional. However, any voltage compensation ideally depends not only on the RMS voltage of the AC supply 4 but also the speed of the rotor 5. Accordingly, rather than storing two one-dimensional lookup tables for each parameter, the controller 16 may instead store a full two-dimensional lookup table for each parameter, as is done for those parameters used during Running Mode (e.g. FIG. 26-28).

However, a full two-dimensional table requires considerably more memory than two one-dimensional tables.

In the embodiments described above, the motor 2 comprises a four-pole rotor 5 and a four-pole stator 6. However, the rotor 5 and stator 6 might have fewer or greater number of poles. As the number of poles increases, the number of electrical cycles per mechanical cycle increases. Consequently, for a given rotor speed, each Hall period is shorter. A faster controller 16 might therefore be needed in order to execute the necessary instructions during each Hall period. Additionally, faster switches for the inverter 10 might be needed. As a result, the number of permissible poles is likely to be limited by the operating speed of the motor 2 and/or the components of the control system 3.

The current controller 22 described above and illustrated in FIG. 5 makes use of the internal peripherals of the PIC16F690 microcontroller. Alternative configurations for the current controller 22 are possible, depending on the particular microcontroller that is used for the controller 16. Moreover, it is not essential that the current regulator 22 forms part of the controller 16. Instead, the current regulator 22 may be formed separately from the controller 16. The controller 16 would then include an input pin 20 coupled to the current regulator 22 for receiving the overcurrent signal.

The position sensor 13 employed by the motor system 1 is a Hall-effect sensor. However, alternative position sensors capable of outputting a signal indicative of the position of the rotor 5 might equally be employed, e.g. optical sensor. Similarly, rather than employing a pair of clamping diodes, other arrangements may be used for the zero-cross detector 12, e.g. Schmitt trigger.

The controller 16 freewheels the phase winding 7 by opening the high-side switches Q1,Q2 of the inverter 10. This then enables current in the phase winding 7 to re-circulate around the low-side loop of the inverter 10. Conceivably, freewheeling might instead occur by opening the low-side switches Q3,Q4 and allowing current to re-circulate around the high-side loop of the inverter 10. However, the shunt resistors R1,R2 of the current sensor 12 would then be required to be located on the upper arms of the inverter 10 in order that current can continue to be sensed during freewheeling. This in turn would lead to higher power losses since the shunt resistors R1,R2 would be subject to higher voltages during excitation. Additionally, the voltage across the shunt resistors R1,R2 would be floating rather than being referenced to neutral and thus measuring the current in the phase winding 7 would be difficult.

In the embodiments described above, the motor system 1 comprises a control system 3 that drives a permanent-magnet motor 2. However, many aspects of the control system 3 might equally be used to drive other types of brushless motor.

The use of a conduction period and/or an advance period that varies periodically with time may be used to excite the phase windings of other types of brushless motor, e.g. reluctance motors. For a reluctance motor, the rotor does not induce a back EMF in the phase windings of the motor. It is therefore possible to obtain a substantially sinusoidal current waveform without the need for a variable conduction period or advance period. However, a conduction period and/or an advance period that varies over each half-cycle of the AC supply 4 may be used to achieve a particular envelope for the magnetic flux density in the motor.

Owing to the ripple in the DC link voltage, the windings of the reluctance motor are excited with a voltage that varies over each half-cycle of the AC supply 4. If a constant conduction period were used over each half-cycle of the AC supply 4, the envelope of the magnetic flux density in the motor would reflect that of the DC link voltage. The controller 16 may therefore employ a conduction period that varies over each half-cycle of the AC supply 4 so as to shape the envelope of the magnetic flux density. In particular, the controller 16 may employ a conduction period that reduces the peak magnetic flux density. By reducing the peak magnetic flux density, a more efficient and/or a smaller motor may be realized. In order to reduce the peak magnetic flux density, the controller 16 employs a conduction period that is longer in the region around the zero-crossings in the voltage of the AC supply 4, and is shorter in the region around the peak voltage. Suitable waveforms for the conduction period include inverted half-sinusoid, inverted triangle and inverted trapezoid.

In order to compensate for the variation in the length of the conduction period, the controller 16 may additionally employ an advance period that varies periodically with time. In particular, as the conduction period decreases, the controller 16 may employ a longer advance period so as to compensate for the shorter conduction period. Accordingly, in contrast to the conduction period, the controller 16 employs an advance period that is short in the region around the zero-crossings in the voltage of the AC supply 4, and is longer in the region around the peak voltage. Suitable waveforms for the advance period include half-sinusoid, triangle and trapezoid.

For the permanent-magnet motor 2, the controller 16 excites the phase winding 7 in advance of zero-crossings of back EMF in the phase winding 7, e.g. as determined from the signal output by the position sensor 13. For a reluctance motor, the controller 16 excites the winding in advance of rising inductance, which may again be determined by means of a position sensor. In both instances, the controller 16 excites the phase winding in advance of predetermined positions of the rotor. More particularly, the controller 16 excites the phase winding in advance of unaligned rotor positions.

While a conduction period and/or an advance period that varies periodically with time may be used with different types of brushless motor, variable conduction and/or advance periods are of particular benefit when used to drive a permanent-magnet motor. As noted above, the back EMF induced in the phase winding 7 by the permanent-magnet rotor 5 makes it difficult to accurately control the amount of current drawn from the AC supply 4. By employing a conduction period that varies periodically with time, a waveform approaching that of a sinusoid may be achieved for current drawn from the AC power supply without the need for an active PFC or high-capacitance link capacitor.

Updating control parameters (e.g. advance period, conduction period, freewheel period and timeout period) in response to zero-crossings in the voltage of an AC supply may be used with other types of brushless motor. As noted above, by updating a control parameter in response to zero-crossings in the AC supply, the control parameter is updated at regular intervals irrespective of motor speed. Moreover, the control parameter is updated regularly without the need for a dedicated timer. The control parameter is also updated in synchrony with the cycle of the AC supply. As a result, the waveform of current drawn from the AC supply is generally more stable.

Interrupt clashing is a potential problem for many types of brushless motor. Consequently, the use of a timer and comparator (e.g. forming part of a dedicated comparator module or as part of a PWM module) to generate a control signal in hardware rather than software may be used with other types of brushless motor so as to reduce the total number of interrupts. Additionally, when the controller is required to sample an analog signal, interrupt clashing may be further reduced by dividing the sampling process into a number of steps, each step being performed in response to a different edge of the position-sensor signal. As a result, the sampling process is spread over a number of electrical half-cycles of the motor, thereby freeing up more time for the controller to execute other routines during each electrical half-cycle.

The invention claimed is:

1. A controller for a brushless motor, the controller comprising a processor, a first timer, a second timer, a compare register, a comparator, an input, and one or more outputs, wherein:
   the processor starts the first timer in response to a signal at the input;
   the first timer generates an interrupt after a first period;
   the processor generates a first control signal at the outputs in response to the interrupt;
   the processor loads the compare register and starts the second timer in response to one of the input signal and the interrupt; and
   the comparator compares the second timer and the compare register and generates a second control signal at the outputs when the second timer and the compare register correspond.

2. The controller of claim 1, wherein one of the control signals is used to excite a winding of the brushless motor, and the other of the control signals is used to freewheel the winding.

3. The controller of claim 1, wherein the processor starts the first timer in response to an edge of the input signal, and the first period is less than an interval between successive edges of the input signal.

4. The controller of claim 3, wherein the sum of the first period and the time required by the processor to service the interrupt and generate the first control signal is less than the interval.

5. The controller of claim 1, wherein the processor starts the first timer in response to edges of the input signal, and the second timer and the compare register correspond at a time when the first timer is counting.

6. The controller of claim 1, wherein the second timer and the compare register correspond after a second period, and the second period is less than the first period.

7. The controller of claim 1, wherein the second timer and the compare register correspond after a second period, and at least one of the first period and the second period varies with time.

8. The controller of claim 1, wherein the processors loads the compare register with a value that varies with time.

9. The controller of claim 1, wherein the input signal generates a further interrupt and the processor starts the first timer in response to the further interrupt.

10. The controller of claim 1, wherein the controller comprises a PWM module, the comparator forms part of the PWM module, and the compare register is a duty-cycle register of the PWM module.

11. A motor system comprising a brushless motor and the controller of claim 1, wherein the brushless motor comprises a winding and the control signals are used to excite and freewheel the winding.

12. The motor system of claim 11, wherein the motor system comprises a position sensor for sensing the position of a rotor of the motor, the position sensor being coupled to the input of the controller and outputting a position-sensor signal.

13. A motor system comprising a control system and a brushless motor, the brushless motor comprising a rotor and a stator having a winding, and the control system comprising a position sensor for sensing the position of the rotor and outputting a position-sensor signal, and a controller for generating a first control signal to excite the winding and a second control signal to freewheel the winding, wherein the controller comprises a processor, a first timer, a second timer, a compare register, a comparator, an input receiving the position-sensor signal, and one or more outputs, wherein:

- the processor starts the first timer in response to an edge of the position-sensor signal;
- the first timer generates an interrupt after a first period;
- the processor generates the first control signal at the outputs in response to the interrupt;
- the processor loads the compare register and starts the second timer in response to one of the edge of the position-sensor signal and the interrupt; and
- the comparator compares the second timer and the compare register and generates the second control signal at the outputs when the second timer and the compare register correspond.

* * * * *